(12) United States Patent
Clerckx et al.

(10) Patent No.: US 8,457,233 B2
(45) Date of Patent: Jun. 4, 2013

(54) CODEBOOK DESIGN METHOD FOR MULTIPLE INPUT MULTIPLE OUTPUT SYSTEM AND METHOD FOR USING THE CODEBOOK

(75) Inventors: Bruno Clerckx, Yongin-si (KR); David Mazzarese, Suwon-si (KR); Ki Il Kim, Seongnam-si (KR); Sung Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 994 days.

(21) Appl. No.: 12/476,275

(22) Filed: Jun. 2, 2009

(65) Prior Publication Data

US 2009/0323841 A1 Dec. 31, 2009

Related U.S. Application Data

(60) Provisional application No. 61/076,179, filed on Jun. 27, 2008.

(30) Foreign Application Priority Data

Aug. 14, 2008 (KR) .......................... 10-2008-0080076
Feb. 27, 2009 (KR) .......................... 10-2009-0017040

(51) Int. Cl.
    *H04L 1/06*   (2006.01)
(52) U.S. Cl.
    USPC ........................................................ 375/267
(58) Field of Classification Search
    USPC ................... 370/210, 329, 338, 344; 375/219,
       375/260, 267, 295, 296, 299, 316, 342, 347,
       375/349; 455/69, 101, 132–141; 704/223,
       704/329
    See application file for complete search history.

(56) References Cited

U.S. PATENT DOCUMENTS

| 7,103,538 | B1 | 9/2006 | Gao |
| 2007/0097856 | A1 | 5/2007 | Wang |
| 2008/0049709 | A1 | 2/2008 | Pan et al. |
| 2008/0298482 | A1* | 12/2008 | Rensburg et al. ............. 375/260 |

FOREIGN PATENT DOCUMENTS

| EP | 1 819 088 A2 | 8/2007 |
| EP | 1919098 | 5/2008 |
| KR | 10-2006-0038812 | 5/2006 |
| KR | 10-2008-0015352 | 2/2008 |
| WO | WO 2007/051208 A2 | 5/2007 |

OTHER PUBLICATIONS

International Search Report and Written Opinion of the International Searching Authority issued Apr. 8, 2011, in counterpart International Application No. PCT/KR2009/003408 (10pp. in English language).

(Continued)

*Primary Examiner* — Sam K Ahn
*Assistant Examiner* — Shawkat M Ali
(74) *Attorney, Agent, or Firm* — NSIP Law

(57) ABSTRACT

A multiple input multiple output (MIMO) communication method using a codebook is provided. The MIMO communication method may use one or more codebooks and the codebooks may change according to a transmission rank, a channel state of a user terminal, and/or a number of feedback bits. The one or more codebooks may be adaptively updated according to a time correlation coefficient of a channel.

17 Claims, 4 Drawing Sheets

OTHER PUBLICATIONS

European Patent Office Extended Search Report for counterpart European patent application No. EP 09770387.0 issued on Apr. 27, 2012.
Samsung: "Way-forward on Codebook for SU-MIMO Precoding," 3GPP Draft; R1-073095, 3rd Generation Partnership Project (3GPP), Mobile Competence Centre, vol. RAN WG1, Jun. 22, 2007 XP050106746, Sophia-Antipolis Cedex, France, retrieved on Jun. 22, 2007.
ZTE: "4Tx Antenna Codebook for SU-MIMO," 3GPP Draft, R1-072913 4TX Antenna Codebook for SU-MIMO, 3rd Generation Partnership Project (3GPP), Mobile Competence Centre vol. RAN WG1, Jun. 20, 2007, XP050106589, Sophia-Antipolis Cedex, France, retrieved on Jun. 20, 2007.
Freescale Semiconductoe Inc, "Results on Zero-forcing MU-MIMO," 3GPP Draft; R1-071511 FSL Zfmumimo_Results, 3rd Generation Partnership Project (3GPP), Mobile Competence Centre vol. RAN WG1, Apr. 3, 2007, XP 050105444, Sophia-Antipolis Cedex, France, retrieved on Apr. 3, 2007.
Samsung: "Way Forward for MU-MIMO Design," 3GPP Draft, R1-073100-MU-MIMO, 3rd Generation Partnership Project (3GPP), Mobile Competence Centre vol. RAN WG1, Jun. 22, 2007, XP050106752, Sophia-Antipolis Cedex, France, retrieved on Jun. 22, 2007.
Tetsushi Abe et al., "Differential Codebook MIMO Precoding Technique," IEEE 2007, pp. 3963-3968.
David Mazzarese et al., "Downlink MIMO Scheme for IEEE 802.16m," IEEE, Submitted on May 5, 2008, 18 pages.
Myoung-won Lee et al., "Precoding Scheme for Dual Spatial Multiplexing Systems with Limited Feedback," The Korea Institute of Electromagnetic Engineering & Science (KEES), Dec. 2006, pp. 1124-1230.
Mohammad Ali Khojastepour et al., "Static and Differential Quantization Codebook Design for MIMO Precoding Systems," IEEE 2007, pp. 1592-1596.

* cited by examiner

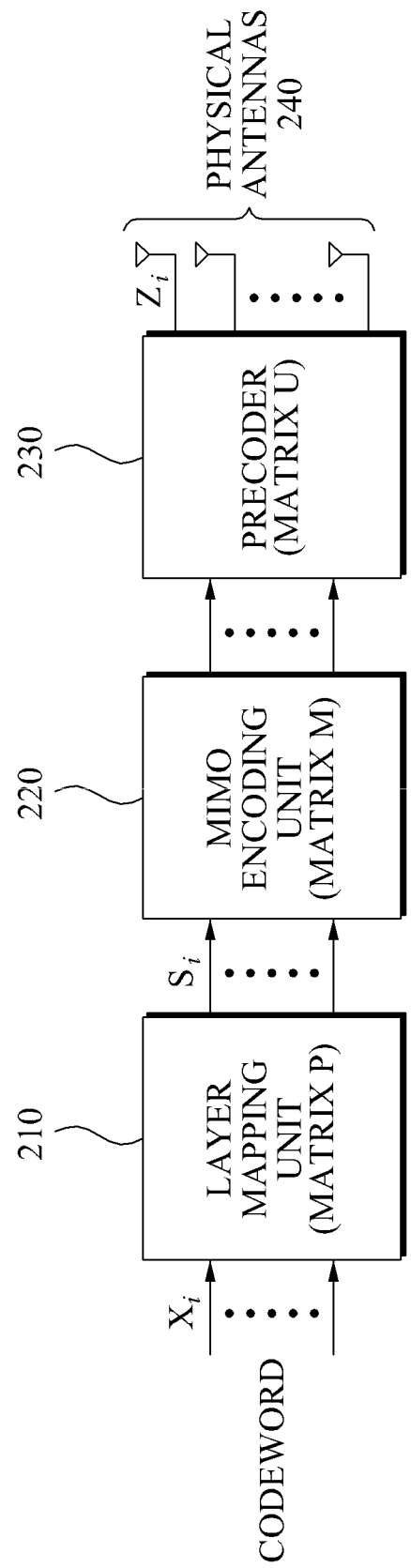

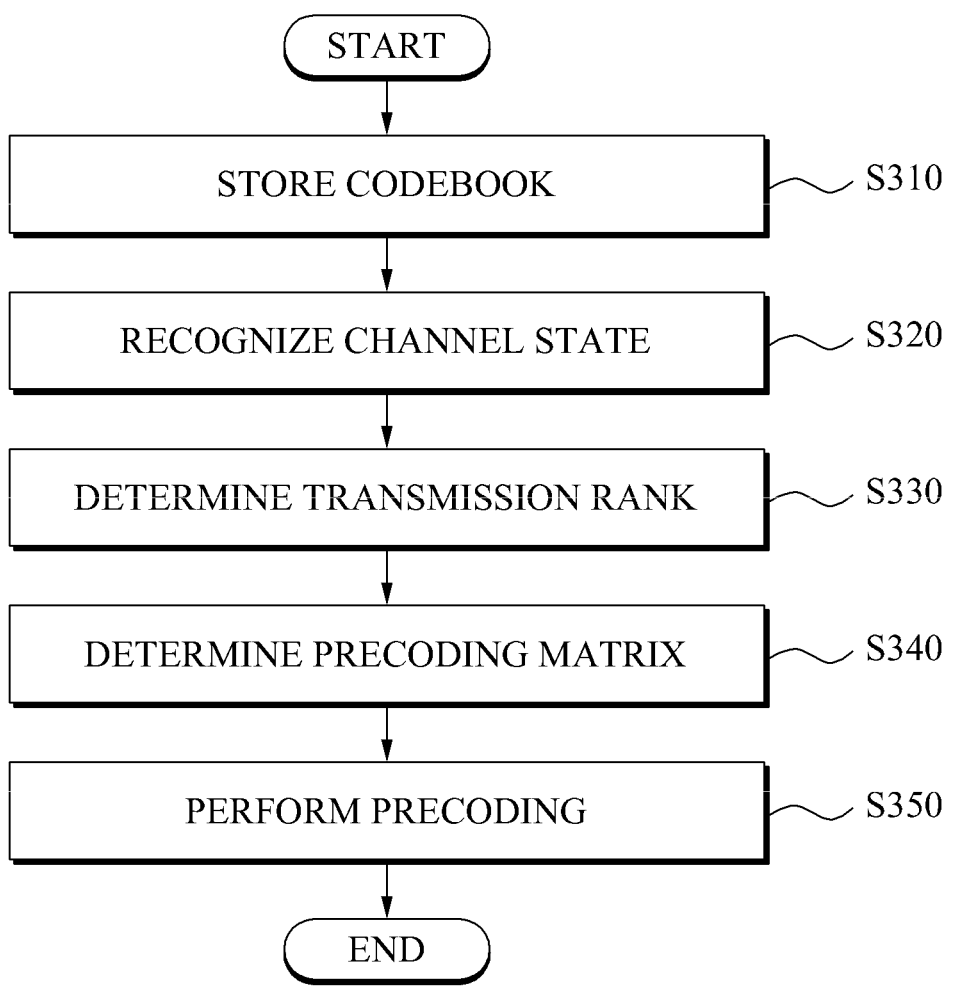

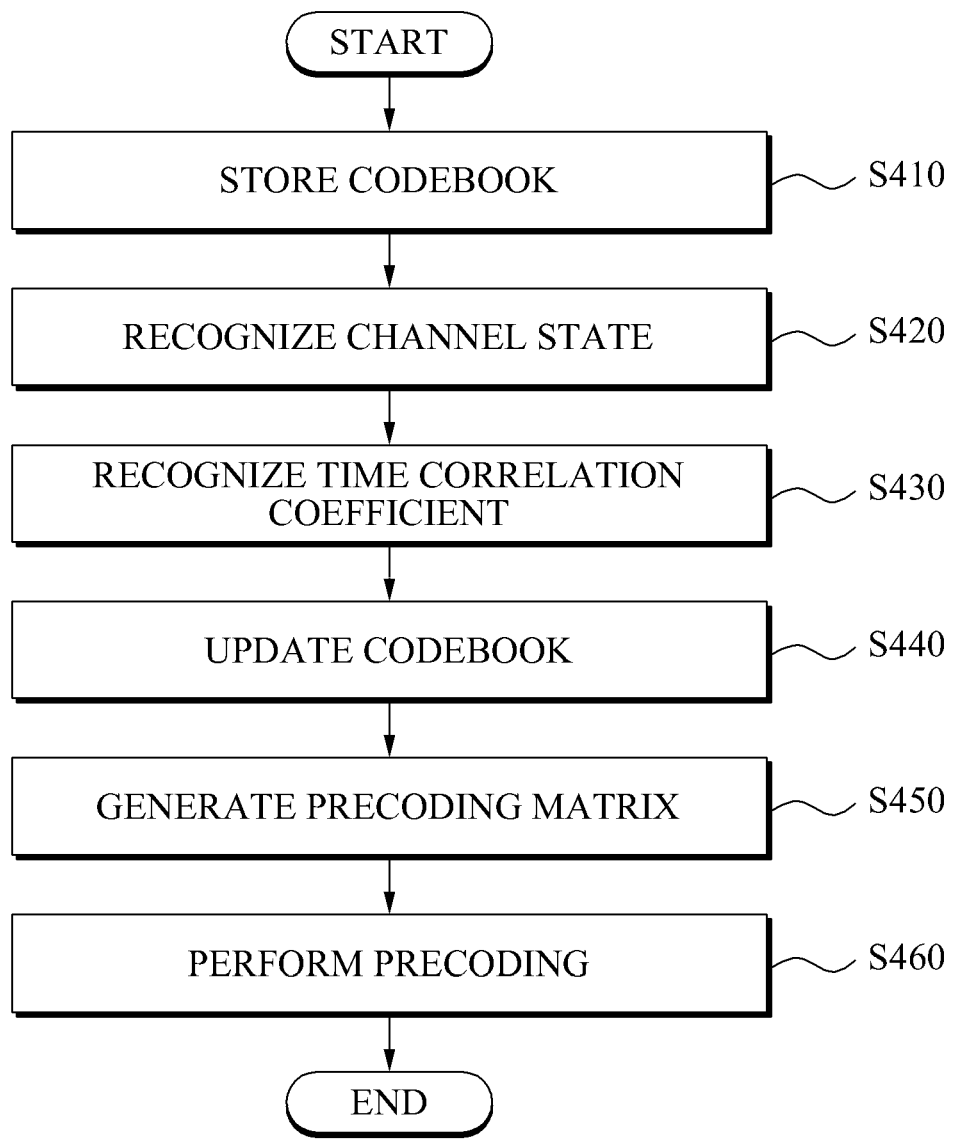

CODEBOOK DESIGN METHOD FOR MULTIPLE INPUT MULTIPLE OUTPUT SYSTEM AND METHOD FOR USING THE CODEBOOK

CROSS-REFERENCE TO RELATED APPLICATIONS

This application claims the benefit under 35 U.S.C. §119(e) of a U.S. Provisional Application No. 61/076,179, filed on Jun. 27, 2008 in the United States Patent and Trademark Office, and the benefit under 35 U.S.C. §119(a) of a Korean Patent Application No. 10-2008-0080076, filed on Aug. 14, 2008, and a Korean Patent Application No. 10-2009-0017040, filed on Feb. 27, 2009, in the Korean Intellectual Property Office, the entire disclosures of which are incorporated herein by reference for all purposes.

BACKGROUND

1. Field

The following description relates to a codebook that is used in a multiple input multiple output (MIMO) communication system.

2. Description of the Related Art

A number of researches are being conducted to provide various types of multimedia services such as voice services and to support high quality and high speed of data transmission in a wireless communication environment. Technologies associated with a multiple input multiple output (MIMO) communication system using multiple channels are in rapid development.

In a MIMO communication system, a base station and terminals may use a codebook in order to appropriately cope with a channel environment. A particular space may be quantized into a plurality of codewords. The plurality of codewords that is generated by quantizing the particular space may be stored in the base station and the terminals. Each of the codewords may be a vector or a matrix according to the dimension of a channel matrix.

For example, each of the terminals may select a matrix or a vector corresponding to channel information from matrices or vectors included in a codebook, based on a channel that is formed between the base station and each of the terminals. The base station may also receive the selected matrix or vector based on the codebook to thereby recognize the channel information. The selected matrix or vector may be used where the base station performs beamforming or transmits a transmission signal via multiple antennas.

Accordingly, there is a need for a well-designed codebook in order to improve a performance of a MIMO communication system.

SUMMARY

In one general aspect, a multiple input multiple output (MIMO) communication method includes storing a codebook that includes at least one matrix or vector, determining a transmission rank corresponding to a number of data streams, generating, using the at least one matrix or vector that is included in the codebook, a precoding matrix according to a channel state of at least one user terminal and the transmission rank, and precoding the data streams using the precoding matrix.

In another general aspect, a MIMO communication method includes storing a codebook that includes at least one matrix or vector, updating the codebook according to a time correlation coefficient ($\rho$) of a channel that is formed between at least one user terminal and a base station, generating a precoding matrix using at least one matrix or vector included in the updated codebook, and precoding the data streams using the precoding matrix.

The updating of the precoding matrix may include updating a previous precoding matrix to a new precoding matrix.

The updating of the codebook may include updating the codebook using the following Equation, $$\tilde{\Theta}_i = \underset{\tilde{\Theta}_i}{\mathrm{argmin}} \|\Psi_i(\rho, \Theta_i) - \tilde{\Theta}_i\|_F.$$

Here, $\Psi_i(\rho, \Theta_i) = \rho I + \sqrt{1-\rho^2}\Theta_i$, $i=1, 2, 3, \ldots, 2^B$, B denotes a number of feedback bits, $\Theta_i$ denotes a unitary matrix or a diagonal matrix as an $i^{th}$ element of the codebook $\{\theta\} = \{\Theta_1, \ldots, \Theta_{2^B}\}$, I denotes an identity matrix, $\|x\|_F$ denotes a Frobenious norm for x, and $\tilde{\Theta}_i$ denotes an $i^{th}$ element of the updated codebook $\{\tilde{\theta}\} = \{\tilde{\Theta}_1, \ldots, \tilde{\Theta}_{2^B}\}$.

Where a singular value decomposition (SVD) is performed for $\Psi_i(\rho, \Theta_i)$, $\Psi_i(\rho, \Theta_i)$ may be expressed as $\Phi_i \Lambda_i B_i^*$. $B_i^*$ denotes a conjugate matrix of $B_i$. The above equation $$\tilde{\Theta}_i = \underset{\tilde{\Theta}_i}{\mathrm{argmin}} \|\Psi_i(\rho, \Theta_i) - \tilde{\Theta}_i\|_F$$

may be optimized to $\tilde{\Theta}_i = \Phi_i B_i^*$. The codebook may be updated using $\tilde{\Theta}_i = \Phi_i B_i^*$.

The updating of the codebook may include updating the codebook using the following Equation, $$\tilde{\Theta}_i = [\Psi_i(\rho,\Theta_i)^* \Psi_i(\rho,\Theta_i)]^{-1/2} \Psi_i(\rho,\Theta_i).$$

Here, $\tilde{\Theta}_i$ denotes an $i^{th}$ element of the updated codebook $\{\tilde{\theta}\} = \{\tilde{\Theta}_1, \ldots, \tilde{\Theta}_{2^B}\}$, $i=1, 2, 3, \ldots 2^B$, $\Psi_i(\rho,\Theta_i) = \rho I + \sqrt{1-\rho^2}\Theta_i$, $\Theta_i$ denotes a unitary matrix or a diagonal matrix as an $i^{th}$ element of the codebook $\{\theta\} = \{\Theta_1, \ldots, \Theta_{2^B}\}$, and I denotes an identity matrix.

In still another general aspect, a base station for a single user multiple input multiple output (MIMO) communication system, includes a memory where a codebook including 4×1 codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1},$ and $C_{16,1}$ is stored, and a precoder to precode a data stream to be transmitted using the codebook, wherein the codeword matrices are defined by the following table:

| $C_{1,1}=$ | 0.5000<br>−0.5000<br>0.5000<br>−0.5000 | $C_{2,1}=$ | −0.5000<br>−0.5000<br>0.5000<br>0.5000 | $C_{3,1}=$ | −0.5000<br>0.5000<br>0.5000<br>−0.5000 | $C_{4,1}=$ | 0.5000<br>0 − 0.5000i<br>0.5000<br>0 − 0.5000i |
|---|---|---|---|---|---|---|---|
| $C_{5,1}=$ | −0.5000<br>0 − 0.5000i<br>0.5000<br>0 + 0.5000i | $C_{6,1}=$ | −0.5000<br>0 + 0.5000i<br>0.5000<br>0 − 0.5000i | $C_{7,1}=$ | 0.5000<br>0.5000<br>0.5000<br>0.5000 | $C_{8,1}=$ | 0.5000<br>0 + 0.5000i<br>0.5000<br>0 + 0.5000i |
| $C_{9,1}=$ | 0.5000<br>0.5000<br>0.5000<br>−0.5000 | $C_{10,1}=$ | 0.5000<br>0 + 0.5000i<br>−0.5000<br>0 + 0.5000i | $C_{11,1}=$ | 0.5000<br>−0.5000<br>0.5000<br>0.5000 | $C_{12,1}=$ | 0.5000<br>0 − 0.5000i<br>−0.5000<br>0 − 0.5000i |
| $C_{13,1}=$ | 0.5000<br>0.3536 + 0.3536i<br>0 + 0.5000i<br>−0.3536 + 0.3536i | $C_{14,1}=$ | 0.5000<br>−0.3536 + 0.3536i<br>0 − 0.5000i<br>0.3536 + 0.3536i | $C_{15,1}=$ | 0.5000<br>−0.3536 − 0.3536i<br>0 + 0.5000i<br>0.3536 − 0.3536i | $C_{16,1}=$ | 0.5000<br>0.3536 − 0.3536i<br>0 − 0.5000i<br>−0.3536 − 0.3536i |

The precoder may calculate a precoding matrix based on at least one codeword matrix among the codeword matrices, and precodes the data stream using the precoding matrix.

The base station may further include an information receiver to receive feedback information from a terminal, wherein the precoder may precode the data stream using the feedback information and the codebook.

The feedback information may include index information of a codeword matrix preferred by the terminal among the codeword matrices.

The base station may further include four transmit antennas, wherein the codebook may be used for transmission rank 1.

In still another general aspect, a base station for a multi-user MIMO communication system, includes a memory where a codebook including 4×1 codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1},$ and $C_{16,1}$ is stored, and a precoder to precode at least one data stream to be transmitted using the codebook, wherein the codeword matrices are defined by the following table:

| $C_{1,1}=$ | 0.5000<br>−0.5000<br>0.5000<br>−0.5000 | $C_{2,1}=$ | −0.5000<br>−0.5000<br>0.5000<br>0.5000 | $C_{3,1}=$ | −0.5000<br>0.5000<br>0.5000<br>−0.5000 | $C_{4,1}=$ | 0.5000<br>0 − 0.5000i<br>0.5000<br>0 − 0.5000i |
|---|---|---|---|---|---|---|---|
| $C_{5,1}=$ | −0.5000<br>0 − 0.5000i<br>0.5000<br>0 + 0.5000i | $C_{6,1}=$ | −0.5000<br>0 + 0.5000i<br>0.5000<br>0 − 0.5000i | $C_{7,1}=$ | 0.5000<br>0.5000<br>0.5000<br>0.5000 | $C_{8,1}=$ | 0.5000<br>0 + 0.5000i<br>0.5000<br>0 + 0.5000i |
| $C_{9,1}=$ | 0.5000<br>0.5000<br>0.5000<br>−0.5000 | $C_{10,1}=$ | 0.5000<br>0 + 0.5000i<br>−0.5000<br>0 + 0.5000i | $C_{11,1}=$ | 0.5000<br>−0.5000<br>0.5000<br>0.5000 | $C_{12,1}=$ | 0.5000<br>0 − 0.5000i<br>−0.5000<br>0 − 0.5000i |
| $C_{13,1}=$ | 0.5000<br>0.3536 + 0.3536i<br>0 + 0.5000i<br>−0.3536 + 0.3536i | $C_{14,1}=$ | 0.5000<br>−0.3536 + 0.3536i<br>0 − 0.5000i<br>0.3536 + 0.3536i | $C_{15,1}=$ | 0.5000<br>−0.3536 − 0.3536i<br>0 + 0.5000i<br>0.3536 − 0.3536i | $C_{16,1}=$ | 0.5000<br>0.3536 − 0.3536i<br>0 − 0.5000i<br>−0.3536 − 0.3536i |

The precoder may calculate a precoding matrix based on a codeword matrix corresponding to the feedback information among the codeword matrices, and precode the data stream using the precoding matrix.

The base station may further include an information receiver to receive feedback information from at least two terminals, wherein the precoder may precode the at least one data stream using at least one of the feedback information received from the at least two terminals, and the codebook.

In still another general aspect, a terminal for a MIMO communication system, includes a memory where a codebook including 4×1 codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1}$, and $C_{16,1}$ is stored, and a feedback unit to feed back, to a base station, feedback information associated with a preferred codeword matrix among the codeword matrices, wherein the codeword matrices are defined by the following table:

In still another general aspect, a precoding method of a base station for a single user MIMO communication system, includes accessing a memory where a codebook including 4×1 codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1}$, and $C_{16,1}$ is stored, and precoding a data stream to be transmitted using the codebook, wherein the codeword matrices are defined by the following table:

| $C_{1,1} =$ | 0.5000<br>−0.5000<br>0.5000<br>−0.5000 | $C_{2,1} =$ | −0.5000<br>−0.5000<br>0.5000<br>0.5000 | $C_{3,1} =$ | −0.5000<br>0.5000<br>0.5000<br>−0.5000 | $C_{4,1} =$ | 0.5000<br>0 − 0.5000i<br>0.5000<br>0 − 0.5000i |
|---|---|---|---|---|---|---|---|
| $C_{5,1} =$ | −0.5000<br>0 − 0.5000i<br>0.5000<br>0 + 0.5000i | $C_{6,1} =$ | −0.5000<br>0 + 0.5000i<br>0.5000<br>0 − 0.5000i | $C_{7,1} =$ | 0.5000<br>0.5000<br>0.5000<br>0.5000 | $C_{8,1} =$ | 0.5000<br>0 + 0.5000i<br>0.5000<br>0 + 0.5000i |
| $C_{9,1} =$ | 0.5000<br>0.5000<br>0.5000<br>−0.5000 | $C_{10,1} =$ | 0.5000<br>0 + 0.5000i<br>−0.5000<br>0 + 0.5000i | $C_{11,1} =$ | 0.5000<br>−0.5000<br>0.5000<br>0.5000 | $C_{12,1} =$ | 0.5000<br>0 − 0.5000i<br>−0.5000<br>0 − 0.5000i |
| $C_{13,1} =$ | 0.5000<br>0.3536 + 0.3536i<br>0 + 0.5000i<br>−0.3536 + 0.3536i | $C_{14,1} =$ | 0.5000<br>−0.3536 + 0.3536i<br>0 − 0.5000i<br>0.3536 + 0.3536i | $C_{15,1} =$ | 0.5000<br>−0.3536 − 0.3536i<br>0 + 0.5000i<br>0.3536 − 0.3536i | $C_{16,1} =$ | 0.5000<br>0.3536 − 0.3536i<br>0 − 0.5000i<br>−0.3536 − 0.3536i |

The terminal may further include a channel estimation unit to estimate a channel between the base station and the terminal, wherein the feedback unit may feed back, to the base station, the feedback information determined based on the estimated channel.

In still another general aspect, a storage medium is provided where a codebook used by a base station and at least one terminal of a MIMO communication system is stored, wherein the codebook includes codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1}$, and $C_{16,1}$, and the codeword matrices are defined by the following table:

| $C_{1,1} =$ | 0.5000<br>−0.5000<br>0.5000<br>−0.5000 | $C_{2,1} =$ | −0.5000<br>−0.5000<br>0.5000<br>0.5000 | $C_{3,1} =$ | −0.5000<br>0.5000<br>0.5000<br>−0.5000 | $C_{4,1} =$ | 0.5000<br>0 − 0.5000i<br>0.5000<br>0 − 0.5000i |
|---|---|---|---|---|---|---|---|
| $C_{5,1} =$ | −0.5000<br>0 − 0.5000i<br>0.5000<br>0 + 0.5000i | $C_{6,1} =$ | −0.5000<br>0 + 0.5000i<br>0.5000<br>0 − 0.5000i | $C_{7,1} =$ | 0.5000<br>0.5000<br>0.5000<br>0.5000 | $C_{8,1} =$ | 0.5000<br>0 + 0.5000i<br>0.5000<br>0 + 0.5000i |
| $C_{9,1} =$ | 0.5000<br>0.5000<br>0.5000<br>−0.5000 | $C_{10,1} =$ | 0.5000<br>0 + 0.5000i<br>−0.5000<br>0 + 0.5000i | $C_{11,1} =$ | 0.5000<br>−0.5000<br>0.5000<br>0.5000 | $C_{12,1} =$ | 0.5000<br>0 − 0.5000i<br>−0.5000<br>0 − 0.5000i |
| $C_{13,1} =$ | 0.5000<br>0.3536 + 0.3536i<br>0 + 0.5000i<br>−0.3536 + 0.3536i | $C_{14,1} =$ | 0.5000<br>−0.3536 + 0.3536i<br>0 − 0.5000i<br>0.3536 + 0.3536i | $C_{15,1} =$ | 0.5000<br>−0.3536 − 0.3536i<br>0 + 0.5000i<br>0.3536 − 0.3536i | $C_{16,1} =$ | 0.5000<br>0.3536 − 0.3536i<br>0 − 0.5000i<br>−0.3536 − 0.3536i |

| $C_{1,1} =$ | 0.5000 | $C_{2,1} =$ | −0.5000 | $C_{3,1} =$ | −0.5000 | $C_{4,1} =$ | 0.5000 |
|---|---|---|---|---|---|---|---|
| | −0.5000 | | −0.5000 | | 0.5000 | | 0 − 0.5000i |
| | 0.5000 | | 0.5000 | | 0.5000 | | 0.5000 |
| | −0.5000 | | 0.5000 | | −0.5000 | | 0 − 0.5000i |
| $C_{5,1} =$ | −0.5000 | $C_{6,1} =$ | −0.5000 | $C_{7,1} =$ | 0.5000 | $C_{8,1} =$ | 0.5000 |
| | 0 − 0.5000i | | 0 + 0.5000i | | 0.5000 | | 0 + 0.5000i |
| | 0.5000 | | 0.5000 | | 0.5000 | | 0.5000 |
| | 0 + 0.5000i | | 0 − 0.5000i | | 0.5000 | | 0 + 0.5000i |
| $C_{9,1} =$ | 0.5000 | $C_{10,1} =$ | 0.5000 | $C_{11,1} =$ | 0.5000 | $C_{12,1} =$ | 0.5000 |
| | 0.5000 | | 0 + 0.5000i | | −0.5000 | | 0 − 0.5000i |
| | 0.5000 | | −0.5000 | | 0.5000 | | −0.5000 |
| | −0.5000 | | 0 + 0.5000i | | 0.5000 | | 0 − 0.5000i |
| $C_{13,1} =$ | 0.5000 | $C_{14,1} =$ | 0.5000 | $C_{15,1} =$ | 0.5000 | $C_{16,1} =$ | 0.5000 |
| | 0.3536 + 0.3536i | | −0.3536 + 0.3536i | | −0.3536 − 0.3536i | | 0.3536 − 0.3536i |
| | 0 + 0.5000i | | 0 − 0.5000i | | 0 + 0.5000i | | 0 − 0.5000i |
| | −0.3536 + 0.3536i | | 0.3536 + 0.3536i | | 0.3536 − 0.3536i | | −0.3536 − 0.3536i |

The precoding may include calculating a precoding matrix based on at least one codeword matrix among the codeword matrices, and precoding the data stream using the precoding matrix.

The method may further include receiving feedback information from a terminal, wherein the precoding may include precoding the data stream using the feedback information and the codebook.

In still another general aspect, a precoding method of a base station for a multi-user MIMO communication system, includes accessing a memory where a codebook including 4×1 codeword matrices $C_{1,1}, C_{2,1}, C_{3,1}, C_{4,1}, C_{5,1}, C_{6,1}, C_{7,1}, C_{8,1}, C_{9,1}, C_{10,0}, C_{11,1}, C_{12,1}, C_{13,1}, C_{14,1}, C_{15,1},$ and $C_{16,1}$ is stored, and precoding at least one data stream to be transmitted using the codebook, wherein the codeword matrices are defined by the following table:

In still another general aspect, an operating method of a terminal for a MIMO communication system, includes accessing a memory where a codebook including 4×1 codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1},$ and $C_{16,1}$ is stored, and feeding back, to a base station, feedback information associated with a preferred codeword matrix among the codeword matrices, wherein the codeword matrices are defined by the following table:

| $C_{1,1} =$ | 0.5000 | $C_{2,1} =$ | −0.5000 | $C_{3,1} =$ | −0.5000 | $C_{4,1} =$ | 0.5000 |
|---|---|---|---|---|---|---|---|
| | −0.5000 | | −0.5000 | | 0.5000 | | 0 − 0.5000i |
| | 0.5000 | | 0.5000 | | 0.5000 | | 0.5000 |
| | −0.5000 | | 0.5000 | | −0.5000 | | 0 − 0.5000i |
| $C_{5,1} =$ | −0.5000 | $C_{6,1} =$ | −0.5000 | $C_{7,1} =$ | 0.5000 | $C_{8,1} =$ | 0.5000 |
| | 0 − 0.5000i | | 0 + 0.5000i | | 0.5000 | | 0 + 0.5000i |
| | 0.5000 | | 0.5000 | | 0.5000 | | 0.5000 |
| | 0 + 0.5000i | | 0 − 0.5000i | | 0.5000 | | 0 + 0.5000i |
| $C_{9,1} =$ | 0.5000 | $C_{10,1} =$ | 0.5000 | $C_{11,1} =$ | 0.5000 | $C_{12,1} =$ | 0.5000 |
| | 0.5000 | | 0 + 0.5000i | | −0.5000 | | 0 − 0.5000i |
| | 0.5000 | | −0.5000 | | 0.5000 | | −0.5000 |
| | −0.5000 | | 0 + 0.5000i | | 0.5000 | | 0 − 0.5000i |
| $C_{13,1} =$ | 0.5000 | $C_{14,1} =$ | 0.5000 | $C_{15,1} =$ | 0.5000 | $C_{16,1} =$ | 0.5000 |
| | 0.3536 + 0.3536i | | −0.3536 + 0.3536i | | −0.3536 − 0.3536i | | 0.3536 − 0.3536i |
| | 0 + 0.5000i | | 0 − 0.5000i | | 0 + 0.5000i | | 0 − 0.5000i |
| | −0.3536 + 0.3536i | | 0.3536 + 0.3536i | | 0.3536 − 0.3536i | | −0.3536 − 0.3536i |

| | | | | | | | |
|---|---|---|---|---|---|---|---|
| $C_{1,1} =$ | 0.5000<br>−0.5000<br>0.5000<br>−0.5000 | $C_{2,1} =$ | −0.5000<br>−0.5000<br>0.5000<br>0.5000 | $C_{3,1} =$ | −0.5000<br>0.5000<br>0.5000<br>−0.5000 | $C_{4,1} =$ | 0.5000<br>0 − 0.5000i<br>0.5000<br>0 − 0.5000i |
| $C_{5,1} =$ | −0.5000<br>0 − 0.5000i<br>0.5000<br>0 + 0.5000i | $C_{6,1} =$ | −0.5000<br>0 + 0.5000i<br>0.5000<br>0 − 0.5000i | $C_{7,1} =$ | 0.5000<br>0.5000<br>0.5000<br>0.5000 | $C_{8,1} =$ | 0.5000<br>0 + 0.5000i<br>0.5000<br>0 + 0.5000i |
| $C_{9,1} =$ | 0.5000<br>0.5000<br>0.5000<br>−0.5000 | $C_{10,1} =$ | 0.5000<br>0 + 0.5000i<br>−0.5000<br>0 + 0.5000i | $C_{11,1} =$ | 0.5000<br>−0.5000<br>0.5000<br>0.5000 | $C_{12,1} =$ | 0.5000<br>0 − 0.5000i<br>−0.5000<br>0 − 0.5000i |
| $C_{13,1} =$ | 0.5000<br>0.3536 + 0.3536i<br>0 + 0.5000i<br>−0.3536 + 0.3536i | $C_{14,1} =$ | 0.5000<br>−0.3536 + 0.3536i<br>0 − 0.5000i<br>0.3536 + 0.3536i | $C_{15,1} =$ | 0.5000<br>−0.3536 − 0.3536i<br>0 + 0.5000i<br>0.3536 − 0.3536i | $C_{16,1} =$ | 0.5000<br>0.3536 − 0.3536i<br>0 − 0.5000i<br>−0.3536 − 0.3536i |

The method may further include estimating a channel between the base station and the terminal, and generating the feedback information based on the estimated channel.

Other features will become apparent to those skilled in the art from the following detailed description, which, taken in conjunction with the attached drawings, discloses exemplary embodiments.

BRIEF DESCRIPTION OF THE DRAWINGS

FIG. 2 is a block diagram illustrating a configuration of a base station according to an exemplary embodiment.

FIG. 3 is a flowchart illustrating a MIMO communication method according to an exemplary embodiment.

FIG. 4 is a flowchart illustrating a MIMO communication method according to another exemplary embodiment.

Throughout the drawings and the detailed description, unless otherwise described, the same drawing reference numerals will be understood to refer to the same elements, features, and structures. The elements may be exaggerated for clarity and convenience.

DETAILED DESCRIPTION

Figure 1:
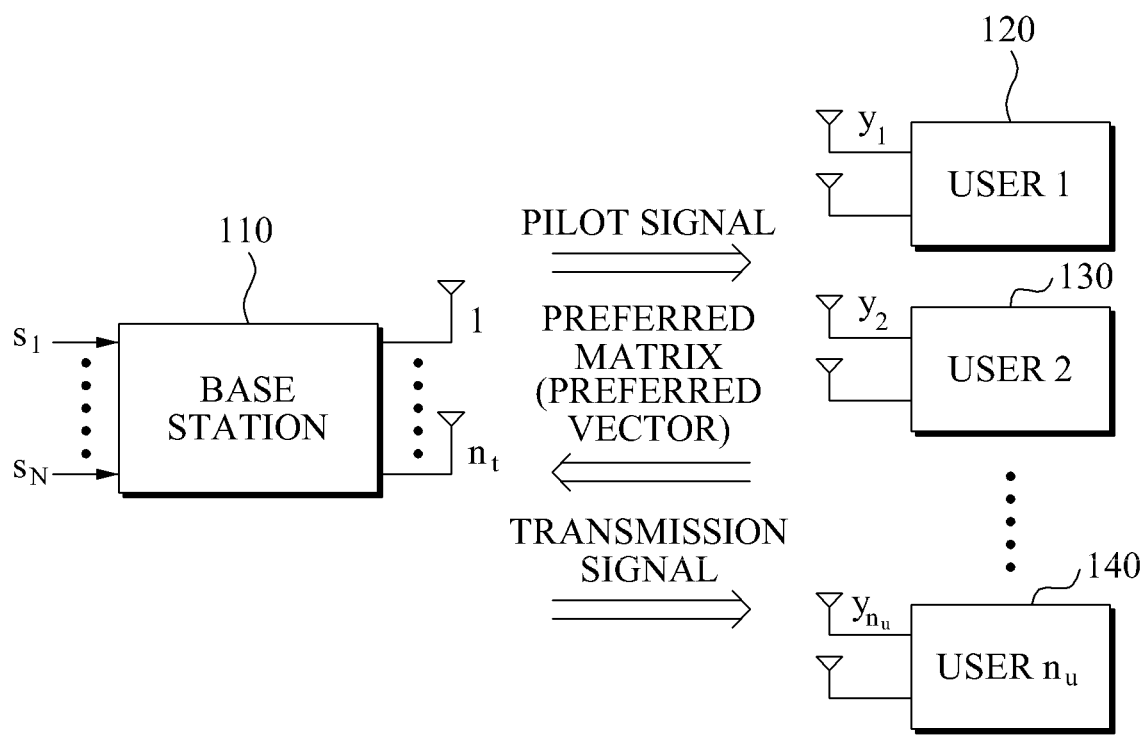
FIG. 1 is a diagram illustrating a multiple input multiple output (MIMO) communication system according to an exemplary embodiment.

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions are omitted to increase clarity and conciseness.

Hereinafter, exemplary embodiments will be described in detail with reference to the accompanying drawings.

FIG. 1 illustrates a multiple input multiple output (MIMO) communication system according to an exemplary embodiment. The MIMO communication system may be a closed loop MIMO communication system.

Referring to FIG. 1, the MIMO communication system includes a base station 110 and a plurality of users (user 1, user 2, user $n_u$) 120, 130, and 140. While FIG. 1 shows an example of a multi-user MIMO communication system, it is understood that the disclosed systems, apparatuses and/or methods may be applicable to a single user MIMO communication system.

Herein, the term "closed-loop" may indicate that the plurality of users (user 1, user 2, user $n_u$) 120, 130, and 140 may feedback, to the base station 110, feedback data containing channel information and the base station 110 may generate a transmission signal based on the feedback data. Also, a codebook according to exemplary embodiments to be described later may be applicable to an open-loop MIMO communication system as well as the closed-loop MIMO communication system. Accordingly, it is understood that exemplary embodiments are not limited to the closed-loop MIMO communication system.

A plurality of antennas may be installed in the base station 110. A single antenna or a plurality of antennas may be installed in each of the users (user 1, user 2, user $n_u$) 120, 130, and 140. A channel may be formed between the base station 110 and each of the users (user 1, user 2, user $n_u$) 120, 130, and 140. Signals may be transmitted and received via each formed channel.

The base station 110 may transmit a single data stream or at least two data streams to the plurality of users (user 1, user 2, user $n_u$) 120, 130, and 140. In this instance, the base station 110 may adopt a spatial division multiplex access (SDMA) scheme or SDM scheme. The base station 110 may select a precoding matrix from matrices included in a codebook and generate a transmission signal using the selected precoding matrix.

For example, the base station 110 may transmit pilot signals to the plurality of users (user 1, user 2, user $n_u$) 120, 130, and 140 via downlink channels, respectively. The pilot signals may be well known to the base station 110 and the plurality of users (user 1, user 2, user $n_u$) 120, 130, and 140.

A terminal corresponding to each of the users (user 1, user 2, user $n_u$) 120, 130, and 140 may perform receiving a well-known signal transmitted from the base station 110, estimating a channel that is formed between the base station 110 and each of the users (user 1, user 2, user $n_u$) 120, 130, and 140 using a pilot signal, selecting at least one matrix or vector from a codebook, and feeding back information associated with the selected at least one matrix or vector. The codebook may be designed according to descriptions that will be made later with reference to FIGS. 2 through 4. The codebook may be updated according to a channel state.

Specifically, each of the users (user 1, user 2, user $n_u$) 120, 130, and 140 may estimate the channel formed between the base station 110 and each of the users (user 1, user 2, user $n_u$) 120, 130, and 140 using the pilot signal. Each of the users (user 1, user 2, user $n_u$) 120, 130, and 140 may select, as a preferred vector, any one vector from vectors that are included in a pre-stored codebook, or may select, as a preferred matrix, any one matrix from matrices that are included in the codebook.

For example, each of the users (user 1, user 2, user $n_u$) 120, 130, and 140 may select, as the preferred vector or the preferred matrix, any one vector or any one matrix from $2^B$ vectors or $2^B$ matrices according to an achievable data transmission rate or a signal-to-interference and noise ratio (SINR). Here, B denotes a number of feedback bits. Each of the users (user 1, user 2, user $n_u$) 120, 130, and 140 may determine its own preferred transmission rank. The transmission rank may correspond to a number of data streams.

Each of the users (user 1, user 2, user $n_u$) 120, 130, and 140 may feedback, to the base station 110, information associated with the selected preferred vector or preferred matrix (hereinafter, referred to as channel information). The channel information used herein may include channel state information, channel quality information, or channel direction information.

The base station 110 may receive channel information of each of the users (user 1, user 2, user $n_u$) 120, 130, and 140 to thereby determine a precoding matrix. The base station 110 may select a portion or all of the users (user 1, user 2, user $n_u$) 120, 130, and 140 according to various types of selection algorithms such as a semi-orthogonal user selection (SUS) algorithm, a greedy user selection (GUS) algorithm, and the like.

The same codebook as the codebook that is stored in the plurality of users (user 1, user 2, user $n_u$) 120, 130, and 140 may be pre-stored in the base station 110. The base station 110 may determine the precoding matrix based on matrices included in the pre-stored codebook using the channel information that is fed back from the plurality of users (user 1, user 2, user $n_u$) 120, 130, and 140. The base station 110 may determine the precoding matrix to maximize a total data transmission rate, that is, a sum rate.

The base station 110 may precode data streams $S_1$ and $S_N$ based on the determined precoding matrix to thereby generate a transmission signal. A process of generating the transmission signal by the base station 110 may be referred to as "beamforming".

A channel environment between the base station 110 and the plurality of users (user 1, user 2, user $n_u$) 120, 130, and 140 may be variable. Where the base station 110 and the plurality of users (user 1, user 2, user $n_u$) 120, 130, and 140 use a fixed codebook, it may be difficult to adaptively cope with the varying channel environment. Although it will be described in detail later, the base station 110 and the plurality of users (user 1, user 2, user $n_u$) 120, 130, and 140 may adaptively cope with the varying channel environment to thereby update the codebook.

The base station 110 may generate a new precoding matrix. In particular, the base station 110 may update a previous precoding matrix to the new precoding matrix using the updated codebook.

FIG. 2 illustrates a configuration of a base station according to an exemplary embodiment.

Referring to FIG. 2, a base station according to an exemplary embodiment includes a layer mapping unit 210, a MIMO encoding unit 220, a precoder 230, and $N_t$ physical antennas 240.

At least one codeword for at least one user may be mapped to at least one layer. Where the dimension of codeword x is $N_C \times 1$, the layer mapping unit 210 may map the codeword x to the at least one layer using a matrix P with the dimension of $N_s \times N_c$. Here, $N_s$ denotes a number of layers or a number of effective antennas. Accordingly, it is possible to acquire the following Equation 1:

$$s = Px \quad (1).$$

The MIMO encoding unit 220 may perform space-time modulation for s using a matrix function M with the dimension of $N_s \times N_s$. The MIMO encoding unit 220 may perform space-frequency block coding, spatial multiplexing, and the like, according to a transmission rank.

The precoder 230 may precode outputs, that is, data streams of the MIMO encoding unit 220 to thereby generate the transmission signal to be transmitted via the physical antennas 240. The dimension or the number of outputs, that is, the data streams of the MIMO encoding unit 220 may indicate the transmission rank. The precoder 230 may generate the transmission signal using a precoding matrix U with the dimension of $N_t \times N_s$. Accordingly, it is possible to acquire the following Equation 2:

$$z = UM(s) \quad (2).$$

Hereinafter, W denotes the precoding matrix and R denotes the transmission rank or the number of effective antennas. Here, the dimension of the precoding matrix W is $N_t \times R$. Where the MIMO encoding unit 220 uses spatial multiplexing, Z may be given by the following Equation 3:

$$z = \overline{WB} = \begin{bmatrix} u_{11} & u_{1R} \\ \vdots & \vdots \\ u_{Nt1} & u_{NtR} \end{bmatrix} \begin{bmatrix} s_1 \\ \vdots \\ s_R \end{bmatrix}. \quad (3)$$

Referring to the above Equation 3, the precoding matrix W may also be referred to as a weighting matrix. The dimension of the precoding matrix W may be determined according to the transmission rank and the number of physical antennas. For example, where the number $N_t$ of physical antennas is four and the transmission rank is 2, the precoding matrix W may be given by the following Equation 4:

$$W = \begin{bmatrix} w_{11} & w_{12} \\ w_{21} & w_{22} \\ w_{31} & w_{32} \\ w_{41} & w_{42} \end{bmatrix}. \quad (4)$$

Codebook Properties

The codebook used in a closed-loop MIMO communication system or an open-loop MIMO communication system may include a plurality of matrices or a plurality of vectors. A precoding matrix or a precoding vector may be determined based on the plurality of matrices or the plurality of vectors included in the codebook. Therefore, it is desirable to design the codebook well.

1) Codebook used in a downlink of a single user MIMO communication system where a number of physical antennas of a base station is two:

For example, where the number of physical antennas of the base station is two, the codebook used in the single user MIMO communication system according to an exemplary embodiment may be designed as given by the following Equation 5:

$$W_1 = \frac{1}{\sqrt{2}} * \begin{bmatrix} 1 & 1 \\ 1 & -1 \end{bmatrix}, \quad (5)$$

$$W_2 = \frac{1}{\sqrt{2}} * \begin{bmatrix} 1 & 1 \\ j & -j \end{bmatrix},$$

-continued $$W_3 = \begin{bmatrix} 1 & 0 \\ 0 & \frac{1+j}{\sqrt{2}} \end{bmatrix} * W_1 = \frac{1}{\sqrt{2}} \begin{bmatrix} 1 & 1 \\ \frac{1+j}{\sqrt{2}} & \frac{-1-j}{\sqrt{2}} \end{bmatrix}, \text{ and}$$

$$W_4 = \begin{bmatrix} 1 & 0 \\ 0 & \frac{1+j}{\sqrt{2}} \end{bmatrix} * W_2 = \frac{1}{\sqrt{2}} \begin{bmatrix} 1 & 1 \\ \frac{-1+j}{\sqrt{2}} & \frac{1-j}{\sqrt{2}} \end{bmatrix}.$$

In this instance, matrices or vectors included in the codebook for the single user MIMO communication system may be determined as given by the following Table 1:

| Transmit Codebook Index | Transmission Rank 1 | Transmission Rank 2 |
| --- | --- | --- |
| 1 | $C_{1,1} = W1(:,1)$ | $C_{1,2} = W1(:,1\ 2)$ |
| 2 | $C_{2,1} = W1(:,2)$ | $C_{2,2} = W2(:,1\ 2)$ |
| 3 | $C_{3,1} = W2(:,1)$ | $C_{3,2} = W3(:,1\ 2)$ |
| 4 | $C_{4,1} = W2(:,2)$ | $C_{4,2} = W4(:,1\ 2)$ |
| 5 | $C_{5,1} = W3(:,1)$ | n/a |
| 6 | $C_{6,1} = W3(:,2)$ | n/a |
| 7 | $C_{7,1} = W4(:,1)$ | n/a |
| 8 | $C_{8,1} = W4(:,2)$ | n/a |

Referring to the above Table 1, $W_k(:,n)$ denotes an $n^{th}$ column vector of $W_k$, and $W_k(:,n\ m)$ denotes a matrix that includes the $n^{th}$ column vector and the $m^{th}$ column vector of $W_k$. Where the transmission rank is 1, the precoding matrix may be any one of $W_1(:,1)$, $W_1(:,2)$, $W_2(:,1)$, $W_2(:,2)$, $W_3(:,1)$, $W_3(:,2)$, $W_4(:,1)$, and $W_4(:,2)$. Where the transmission rank is 2, the precoding matrix may be any one of $W_1(:,1\ 2)$, $W_2(:,1\ 2)$, $W_3(:,1\ 2)$, and $W_4(:,1\ 2)$.

2) Codebook used in a downlink of a multi-user MIMO communication system performing unitary precoding where a number of physical antennas of a base station is two:

For example, where the number of physical antennas of the base station is two, the codebook used in the downlink of the multi-user MIMO communication system according to an exemplary embodiment may be designed as given by the following Equation 6:

$$W_1 = \frac{1}{\sqrt{2}} * \begin{bmatrix} 1 & 1 \\ 1 & -1 \end{bmatrix} \quad (6)$$

$$W_2 = \frac{1}{\sqrt{2}} * \begin{bmatrix} 1 & 1 \\ j & -j \end{bmatrix}.$$

Vectors included in the codebook for the multi-user MIMO communication system performing unitary precoding may be determined as given by the following Table 2:

| Transmit Codebook Index | Codeword used at terminal to quantize the channel directions |
| --- | --- |
| 1 | W1(:,1) |
| 2 | W1(:,2) |
| 3 | W2(:,1) |
| 4 | W2(:,2) |

The vectors used in the above Table 2 may be used at the terminal for channel quantization. The matrices used at the base station for precoding may be given by the above Equation 6.

Referring to the above Table 2, where the transmission rank is 1, the precoding matrix may be constructed by appropriately combining $W_1(:,1)$, $W_1(:,2)$, $W_2(:,1)$, and $W_2(:,2)$. Here, $W_k(:,n)$ denotes the $n^{th}$ column vector of $W_k$.

Where the multi-user MIMO communication system performs non-unitary precoding, the codebook used at the terminal for channel quantization may be the same as rank 1 codebook that is used in the single user MIMO communication system. Accordingly, where the multi-user MIMO communication system performs non-unitary precoding, the codebook may include $W_1(:,1)$, $W_1(:,2)$, $W_2(:,1)$, $W_2(:,2)$, $W_3(:,1)$, $W_3(:,2)$, $W_4(:,1)$, and $W_4(:,2)$ included in the above Equation 5. The base station may use only a subset of the codebook for this rank 1 single user MIMO communication system.

3) A first example of a codebook used in a downlink of a single user MIMO communication system or a multi-user MIMO communication system where a number of physical antennas of a base station is four:

3-1) Codebook used in a downlink of a single user MIMO communication system where a number of physical antennas of a base station is four:

For example, where the number of physical antennas of the base station is four, the codebook used in the downlink of the single user MIMO communication system according to an exemplary embodiment may be designed as given by the following Equation 7:

$$W_1 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & 1 & -1 \end{bmatrix}, \quad (7)$$

$$W_2 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & j & -j \end{bmatrix},$$

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix},$$

$$W_4 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & 1 & -1 \end{bmatrix},$$

$$W_5 = \text{diag}(1, 1, 1, -1) * DFT = 0.5 * \begin{bmatrix} 1 & 1 & 1 & 1 \\ 1 & j & -1 & -j \\ 1 & -1 & 1 & -1 \\ -1 & j & 1 & -j \end{bmatrix},$$

and $$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}.$$

Here, a rotation matrix is $$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix},$$

a quadrature phase shift keying (QPSK) discrete Fourier transform (DFT) matrix is $$DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix},$$

diag(a, b, c, d) is a 4×4 matrix, and diagonal elements of diag(a, b, c, d) are a, b, c, and d, and all the remaining elements are zero.

The matrices included in the codebook for the single user MIMO communication system may be determined according to the transmission rank, as given by the following Table 3:

| Transmit Codebook Index | Transmission Rank 1 | Transmission Rank 2 | Transmission Rank 3 | Transmission Rank 4 |
|---|---|---|---|---|
| 1 | $C_{1,1}$ = W1(:, 2) | $C_{1,2}$ = W1(:, 1 2) | $C_{1,3}$ = W1(:, 1 2 3) | $C_{1,4}$ = W1(:, 1 2 3 4) |
| 2 | $C_{2,1}$ = W1(:, 3) | $C_{2,2}$ = W1(:, 1 3) | $C_{2,3}$ = W1(:, 1 2 4) | $C_{2,4}$ = W2(:, 1 2 3 4) |
| 3 | $C_{3,1}$ = W1(:, 4) | $C_{3,2}$ = W1(:, 1 4) | $C_{3,3}$ = W1(:, 1 3 4) | $C_{3,4}$ = W3(:, 1 2 3 4) |
| 4 | $C_{4,1}$ = W2(:, 2) | $C_{4,2}$ = W1(:, 2 3) | $C_{4,3}$ = W1(:, 2 3 4) | $C_{4,4}$ = W4(:, 1 2 3 4) |
| 5 | $C_{5,1}$ = W2(:, 3) | $C_{5,2}$ = W1(:, 2 4) | $C_{5,3}$ = W2(:, 1 2 3) | $C_{5,4}$ = W5(:, 1 2 3 4) |
| 6 | $C_{6,1}$ = W2(:, 4) | $C_{6,2}$ = W1(:, 3 4) | $C_{6,3}$ = W2(:, 1 2 4) | $C_{6,4}$ = W6(:, 1 2 3 4) |
| 7 | $C_{7,1}$ = W3(:, 1) | $C_{7,2}$ = W2(:, 1 3) | $C_{7,3}$ = W2(:, 1 3 4) | n/a |
| 8 | $C_{8,1}$ = W4(:, 1) | $C_{8,2}$ = W2(:, 1 4) | $C_{8,3}$ = W2(:, 2 3 4) | n/a |
| 9 | $C_{9,1}$ = W5(:, 1) | $C_{9,2}$ = W2(:, 2 3) | $C_{9,3}$ = W3(:, 1 2 3) | n/a |
| 10 | $C_{10,1}$ = W5(:, 2) | $C_{10,2}$ = W2(:, 2 4) | $C_{10,3}$ = W3(:, 1 3 4) | n/a |
| 11 | $C_{11,1}$ = W5(:, 3) | $C_{11,2}$ = W3(:, 1 3) | $C_{11,3}$ = W4(:, 1 2 3) | n/a |
| 12 | $C_{12,1}$ = W5(:, 4) | $C_{12,2}$ = W3(:, 1 4) | $C_{12,3}$ = W4(:, 1 3 4) | n/a |
| 13 | $C_{13,1}$ = W6(:, 1) | $C_{13,2}$ = W4(:, 1 3) | $C_{13,3}$ = W5(:, 1 2 3) | n/a |
| 14 | $C_{14,1}$ = W6(:, 2) | $C_{14,2}$ = W4(:, 1 4) | $C_{14,3}$ = W5(:, 1 3 4) | n/a |
| 15 | $C_{15,1}$ = W6(:, 3) | $C_{15,2}$ = W5(:, 1 3) | $C_{15,3}$ = W6(:, 1 2 4) | n/a |
| 16 | $C_{16,1}$ = W6(:, 4) | $C_{16,2}$ = W6(:, 2 4) | $C_{16,3}$ = W6(:, 2 3 4) | n/a |

Referring to the above Table 3, where the transmission rank is 4, the precoding matrix may be generated based on any one of $W_1(:,1\ 2\ 3\ 4)$, $W_2(:,1\ 2\ 3\ 4)$, $W_3(:,1\ 2\ 3\ 4)$, $W_4(:,1\ 2\ 3\ 4)$, $W_5(:,1\ 2\ 3\ 4)$, and $W_6(:,1\ 2\ 3\ 4)$. Here, $W_k(:,n\ m\ o\ p)$ denotes a matrix that includes the $n^{th}$ column vector, the $m^{th}$ column vector, an $o^{th}$ column vector, and a $p^{th}$ column vector of $W_k$.

Where the transmission rank is 3, the precoding matrix may be generated based on any one of $W_1(:,1\ 2\ 3)$, $W_1(:,1\ 2\ 4)$, $W_1(:,1\ 3\ 4)$, $W_1(:,2\ 3\ 4)$, $W_2(:,1\ 2\ 3)$, $W_2(:,1\ 2\ 4)$, $W_2(:,1\ 3\ 4)$, $W_2(:,2\ 3\ 4)$, $W_3(:,1\ 2\ 3)$, $W_3(:,1\ 3\ 4)$, $W_4(:,1\ 2\ 3)$, $W_4(:,1\ 3\ 4)$, $W_5(:,1\ 2\ 3)$, $W_5(:,1\ 3\ 4)$, $W_6(:,1\ 2\ 4)$, and $W_6(:,2\ 3\ 4)$. Here, $W_k(:,n\ m\ o)$ denotes a matrix that includes the $n^{th}$ column vector, the column vector, and the $o^{th}$ column vector of $W_k$.

Where the transmission rank is 2, the precoding matrix may be generated based on any one of $W_1(:,1\ 2)$, $W_1(:,1\ 3)$, $W_1(:,1\ 4)$, $W_1(:,2\ 3)$, $W_1(:,2\ 4)$, $W_1(:,3\ 4)$, $W_2(:,1\ 3)$, $W_2(:,1\ 4)$, $W_2(:,2\ 3)$, $W_2(:,2\ 4)$, $W_3(:,1\ 3)$, $W_3(:,1\ 4)$, $W_4(:,1\ 3)$, $W_4(:,1\ 4)$, $W_5(:,1\ 3)$, and $W_6(:,2\ 4)$. Here, $W_k(:,n\ m)$ denotes a matrix that includes the $n^{th}$ column vector and the $m^{th}$ column vector of $W_k$.

Where the transmission rank is 1, the precoding matrix may be generated based on any one of $W_1(:,2)$, $W_1(:,3)$, $W_1(:,4)$, $W_2(:,2)$, $W_2(:,3)$, $W_2(:,4)$, $W_3(:,1)$, $W_4(:,1)$, $W_5(:,1)$, $W_5(:,2)$, $W_5(:,3)$, $W_5(:,4)$, $W_6(:,1)$, $W_6(:,2)$, $W_6(:,3)$, and $W_6(:,4)$. Here, $W_k(:,n)$ denotes the $n^{th}$ column vector of $W_k$.

The codewords included in the above Table 3 may be expressed as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{matrix} -0.5000 \\ 0.5000 \\ 0.5000 \\ -0.5000 \end{matrix}$$

-continued $$C_{4,1} = \begin{matrix} 0.5000 \\ 0 - 0.5000i \\ 0.5000 \\ 0 - 0.5000i \end{matrix}$$

$$C_{5,1} = \begin{matrix} -0.5000 \\ 0 - 0.5000i \\ 0.5000 \\ 0 + 0.5000i \end{matrix}$$

$$C_{6,1} = \begin{matrix} -0.5000 \\ 0 + 0.5000i \\ 0.5000 \\ 0 - 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 0.3536 + 0.3536i \\ 0 + 0.5000i \\ -0.3536 + 0.3536i \end{matrix}$$

$$C_{14,1} = \begin{matrix} 0.5000 \\ -0.3536 + 0.3536i \\ 0 - 0.5000i \\ 0.3536 + 0.3536i \end{matrix}$$

$$C_{15,1} = \begin{matrix} 0.5000 \\ -0.3536 - 0.3536i \\ 0 + 0.5000i \\ 0.3536 - 0.3536i \end{matrix}$$

$$C_{16,1} = \begin{matrix} 0.5000 \\ 0.3536 - 0.3536i \\ 0 - 0.5000i \\ -0.3536 - 0.3536i \end{matrix}$$

$$C_{1,2} = \begin{matrix} 0.5000 & 0.5000 \\ 0.5000 & -0.5000 \\ 0.5000 & 0.5000 \\ 0.5000 & -0.5000 \end{matrix}$$

$$C_{2,2} = \begin{matrix} 0.5000 & -0.5000 \\ 0.5000 & -0.5000 \\ 0.5000 & 0.5000 \\ 0.5000 & 0.5000 \end{matrix}$$

$$C_{3,2} = \begin{matrix} 0.5000 & -0.5000 \\ 0.5000 & 0.5000 \\ 0.5000 & 0.5000 \\ 0.5000 & -0.5000 \end{matrix}$$

$$C_{4,2} = \begin{matrix} 0.5000 & -0.5000 \\ -0.5000 & -0.5000 \\ 0.5000 & 0.5000 \\ -0.5000 & 0.5000 \end{matrix}$$

$$C_{5,2} = \begin{matrix} 0.5000 & -0.5000 \\ -0.5000 & 0.5000 \\ 0.5000 & 0.5000 \\ -0.5000 & -0.5000 \end{matrix}$$

$$C_{6,2} = \begin{matrix} -0.5000 & -0.5000 \\ -0.5000 & 0.5000 \\ 0.5000 & 0.5000 \\ 0.5000 & -0.5000 \end{matrix}$$

$$C_{7,2} = \begin{matrix} 0.5000 & -0.5000 \\ 0 + 0.5000i & 0 - 0.5000i \\ 0.5000 & 0.5000 \\ 0 + 0.5000i & 0 + 0.5000i \end{matrix}$$

$$C_{8,2} = \begin{matrix} 0.5000 & -0.5000 \\ 0 + 0.5000i & 0 + 0.5000i \\ 0.5000 & 0.5000 \\ 0 + 0.5000i & 0 - 0.5000i \end{matrix}$$

$$C_{9,2} = \begin{matrix} 0.5000 & -0.5000 \\ 0 - 0.5000i & 0 - 0.5000i \\ 0.5000 & 0.5000 \\ 0 - 0.5000i & 0 + 0.5000i \end{matrix}$$

$$C_{10,2} = \begin{matrix} 0.5000 & -0.5000 \\ 0 - 0.5000i & 0 + 0.5000i \\ 0.5000 & 0.5000 \\ 0 - 0.5000i & 0 - 0.5000i \end{matrix}$$

$$C_{11,2} = \begin{matrix} 0.5000 & 0.5000 \\ 0.5000 & 0 - 0.5000i \\ 0.5000 & 0.5000 \\ 0.5000 & 0 + 0.5000i \end{matrix}$$

$$C_{12,2} = \begin{matrix} 0.5000 & -0.5000 \\ 0.5000 & 0 + 0.5000i \\ 0.5000 & 0.5000 \\ 0.5000 & 0 - 0.5000i \end{matrix}$$

$$C_{13,2} = \begin{matrix} 0.5000 & -0.5000 \\ 0+0.5000i & -0.5000 \\ 0.5000 & 0.5000 \\ 0+0.5000i & 0.5000 \end{matrix}$$

$$C_{14,2} = \begin{matrix} 0.5000 & -0.5000 \\ 0+0.5000i & 0.5000 \\ 0.5000 & 0.5000 \\ 0+0.5000i & -0.5000 \end{matrix}$$

$$C_{15,2} = \begin{matrix} 0.5000 & 0.5000 \\ 0.5000 & -0.5000 \\ 0.5000 & 0.5000 \\ -0.5000 & 0.5000 \end{matrix}$$

$$C_{16,2} = \begin{matrix} 0.5000 & 0.5000 \\ -0.3536+0.3536i & 0.3536-0.3536i \\ 0-0.5000i & 0-0.5000i \\ 0.3536+0.3536i & -0.3536-0.3536i \end{matrix}$$

$$C_{1,3} = \begin{matrix} 0.5000 & 0.5000 & -0.5000 \\ 0.5000 & -0.5000 & -0.5000 \\ 0.5000 & 0.5000 & 0.5000 \\ 0.5000 & -0.5000 & 0.5000 \end{matrix}$$

$$C_{2,3} = \begin{matrix} 0.5000 & 0.5000 & -0.5000 \\ 0.5000 & -0.5000 & 0.5000 \\ 0.5000 & 0.5000 & 0.5000 \\ 0.5000 & -0.5000 & -0.5000 \end{matrix}$$

$$C_{3,3} = \begin{matrix} 0.5000 & -0.5000 & -0.5000 \\ 0.5000 & -0.5000 & 0.5000 \\ 0.5000 & 0.5000 & 0.5000 \\ 0.5000 & 0.5000 & -0.5000 \end{matrix}$$

$$C_{4,3} = \begin{matrix} 0.5000 & -0.5000 & -0.5000 \\ -0.5000 & -0.5000 & 0.5000 \\ 0.5000 & 0.5000 & 0.5000 \\ -0.5000 & 0.5000 & -0.5000 \end{matrix}$$

$$C_{5,3} = \begin{matrix} 0.5000 & 0.5000 & -0.5000 \\ 0+0.5000i & 0-0.5000i & 0-0.5000i \\ 0.5000 & 0.5000 & 0.5000 \\ 0+0.5000i & 0-0.5000i & 0+0.5000i \end{matrix}$$

$$C_{6,3} = \begin{matrix} 0.5000 & 0.5000 & -0.5000 \\ 0+0.5000i & 0-0.5000i & 0+0.5000i \\ 0.5000 & 0.5000 & 0.5000 \\ 0+0.5000i & 0-0.5000i & 0-0.5000i \end{matrix}$$

$$C_{7,3} = \begin{matrix} 0.5000 & -0.5000 & -0.5000 \\ 0+0.5000i & 0-0.5000i & 0+0.5000i \\ 0.5000 & 0.5000 & 0.5000 \\ 0+0.5000i & 0+0.5000i & 0-0.5000i \end{matrix}$$

$$C_{8,3} = \begin{matrix} 0.5000 & -0.5000 & -0.5000 \\ 0-0.5000i & 0-0.5000i & 0+0.5000i \\ 0.5000 & 0.5000 & 0.5000 \\ 0-0.5000i & 0+0.5000i & 0-0.5000i \end{matrix}$$

$$C_{9,3} = \begin{matrix} 0.5000 & 0.5000 & -0.5000 \\ 0.5000 & -0.5000 & 0-0.5000i \\ 0.5000 & 0.5000 & 0.5000 \\ 0.5000 & -0.5000 & 0+0.5000i \end{matrix}$$

$$C_{10,3} = \begin{matrix} 0.5000 & -0.5000 & -0.5000 \\ 0.5000 & 0-0.5000i & 0+0.5000i \\ 0.5000 & 0.5000 & 0.5000 \\ 0.5000 & 0+0.5000i & 0-0.5000i \end{matrix}$$

$$C_{11,3} = \begin{matrix} 0.5000 & 0.5000 & -0.5000 \\ 0+0.5000i & 0-0.5000i & -0.5000 \\ 0.5000 & 0.5000 & 0.5000 \\ 0+0.5000i & 0-0.5000i & 0.5000 \end{matrix}$$

$$C_{12,3} = \begin{matrix} 0.5000 & -0.5000 & -0.5000 \\ 0+0.5000i & -0.5000 & 0.5000 \\ 0.5000 & 0.5000 & 0.5000 \\ 0+0.5000i & 0.5000 & -0.5000 \end{matrix}$$

$$C_{13,3} = \begin{matrix} 0.5000 & 0.5000 & 0.5000 \\ 0.5000 & 0+0.5000i & -0.5000 \\ 0.5000 & -0.5000 & 0.5000 \\ -0.5000 & 0+0.5000i & 0.5000 \end{matrix}$$

$$C_{14,3} = \begin{matrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{matrix}$$

$$C_{15,3} = \begin{matrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536-0.3536i \end{matrix}$$

$$C_{16,3} = \begin{matrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ 0.3536+0.3536i & 0.3536-0.3536i & -0.3536-0.3536i \end{matrix}$$

$$C_{1,4} = \begin{matrix} 0.5000 & 0.5000 & -0.5000 & -0.5000 \\ 0.5000 & -0.5000 & -0.5000 & 0.5000 \\ 0.5000 & 0.5000 & 0.5000 & 0.5000 \\ 0.5000 & -0.5000 & 0.5000 & -0.5000 \end{matrix}$$

$$C_{2,4} = \begin{matrix} 0.5000 & 0.5000 & -0.5000 & -0.5000 \\ 0+0.5000i & 0-0.5000i & 0-0.5000i & 0+0.5000i \\ 0.5000 & 0.5000 & 0.5000 & 0.5000 \\ 0+0.5000i & 0-0.5000i & 0+0.5000i & 0-0.5000i \end{matrix}$$

-continued $$C_{3,4} = \begin{bmatrix} 0.5000 & 0.5000 & -0.5000 & -0.5000 \\ 0.5000 & -0.5000 & 0-0.5000i & 0+0.5000i \\ 0.5000 & 0.5000 & 0.5000 & 0.5000 \\ 0.5000 & -0.5000 & 0+0.5000i & 0-0.5000i \end{bmatrix}$$

$$C_{4,4} = \begin{bmatrix} 0.5000 & 0.5000 & -0.5000 & -0.5000 \\ 0+0.5000i & 0-0.5000i & -0.5000 & 0.5000 \\ 0.5000 & 0.5000 & 0.5000 & 0.5000 \\ 0+0.5000i & 0-0.5000i & 0.5000 & -0.5000 \end{bmatrix}$$

$$C_{5,4} = \begin{bmatrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{bmatrix}$$

$$C_{6,4} = \begin{bmatrix} 0.5000 & 0.5000 & 0.5000 & 0.5000 \\ 0.3536+0.3536i & -0.3536+0.3536i & -0.3536-0.3536i & 0.3536+0.3536i \\ 0+0.5000i & 0-0.5000i & 0+0.5000i & 0-0.5000i \\ -0.3536+0.3536i & 0.3536+0.3536i & 0.3536-0.3536i & -0.3536-0.3536i \end{bmatrix}$$

3-2) Codebook used in a downlink of a multi-user MIMO communication system performing unitary precoding where a number of physical antennas of a base station is four:

For example, where the number of physical antennas of the base station is four, the codebook used in the downlink of the multi-user MIMO communication system according to an exemplary embodiment may be designed using the following Equation 8:

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} \quad (8)$$

and $$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}.$$

The codewords included in the codebook for the multi-user MIMO communication system performing unitary precoding, may be given by the following Table 4:

| Transmit Codebook Index | codeword used at terminal for quantization |
| --- | --- |
| 1 | $M_1 = W3(;,1)$ |
| 2 | $M_2 = W3(;,2)$ |
| 3 | $M_3 = W3(;,3)$ |
| 4 | $M_4 = W3(;,4)$ |
| 5 | $M_5 = W6(;,1)$ |
| 6 | $M_6 = W6(;,2)$ |
| 7 | $M_7 = W6(;,3)$ |
| 8 | $M_8 = W6(;,4)$ |

Referring to the above Table 4, where the transmission rank of each of users is 1, the precoding matrix may be constructed by appropriately combining $W_3(;,1)$, $W_3(;,2)$, $W_3(;,3)$, $W_3(;,4)$, $W_6(;,1)$, $W_6(;,2)$, $W_6(;,3)$, and $W_6(;,4)$. Here, $W_k(;,n)$ denotes the $n^{th}$ column vector of $W_k$.

The codewords included in the above Table 4 may be expressed as follows:

$$M_1 = \begin{bmatrix} 0.5000 \\ 0.5000 \\ 0.5000 \\ 0.5000 \end{bmatrix}$$

$$M_2 = \begin{bmatrix} 0.5000 \\ -0.5000 \\ 0.5000 \\ -0.5000 \end{bmatrix}$$

$$M_3 = \begin{bmatrix} -0.5000 \\ 0-0.5000i \\ 0.5000 \\ 0+0.5000i \end{bmatrix}$$

$$M_4 = \begin{bmatrix} -0.5000 \\ 0+0.5000i \\ 0.5000 \\ 0-0.5000i \end{bmatrix}$$

$$M_5 = \begin{bmatrix} 0.5000 \\ 0.3536+0.3536i \\ 0+0.5000i \\ -0.3536+0.3536i \end{bmatrix}$$

$$M_6 = \begin{matrix} 0.5000 \\ -0.3536 + 0.3536i \\ 0 - 0.5000i \\ 0.3536 + 0.3536i \end{matrix}$$

$$M_7 = \begin{matrix} 0.5000 \\ -0.3536 - 0.3536i \\ 0 + 0.5000i \\ 0.3536 - 0.3536i \end{matrix}$$

$$M_8 = \begin{matrix} 0.5000 \\ 0.3536 - 0.3536i \\ 0 - 0.5000i \\ -0.3536 - 0.3536i \end{matrix}$$

3-3) Codebook used in a downlink of a multi-user MIMO communication system performing non-unitary precoding where a number of physical antennas of a base station is four:

For example, codewords included in the codebook used in the downlink of the multi-user MIMO communication system performing non-unitary precoding may be given by the following Table 5. Here, in the multi-user MIMO communication system, a rank of each of the users is 1:

| Transmit Codebook Index | Rank 1 |
|---|---|
| 1 | $C_{1,1} = W1(:,2)$ |
| 2 | $C_{2,1} = W1(:,3)$ |
| 3 | $C_{3,1} = W1(:,4)$ |
| 4 | $C_{4,1} = W2(:,2)$ |
| 5 | $C_{5,1} = W2(:,3)$ |
| 6 | $C_{6,1} = W2(:,4)$ |
| 7 | $C_{7,1} = W3(:,1)$ |
| 8 | $C_{8,1} = W4(:,1)$ |
| 9 | $C_{9,1} = W5(:,1)$ |
| 10 | $C_{10,1} = W5(:,2)$ |
| 11 | $C_{11,1} = W5(:,3)$ |
| 12 | $C_{12,1} = W5(:,4)$ |
| 13 | $C_{13,1} = W6(:,1)$ |
| 14 | $C_{14,1} = W6(:,2)$ |
| 15 | $C_{15,1} = W6(:,3)$ |
| 16 | $C_{16,1} = W6(:,4)$ |

The codewords included in the above Table 5 may be expressed as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{matrix} -0.5000 \\ 0.5000 \\ 0.5000 \\ -0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} -0.5000 \\ 0 - 0.5000i \\ 0.5000 \\ 0 + 0.5000i \end{matrix}$$

$$C_{6,1} = \begin{matrix} -0.5000 \\ 0 + 0.5000i \\ 0.5000 \\ 0 - 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 0.3536 + 0.3536i \\ 0 + 0.5000i \\ -0.3536 + 0.3536i \end{matrix}$$

$$C_{14,1} = \begin{matrix} 0.5000 \\ -0.3536 + 0.3536i \\ 0 - 0.5000i \\ 0.3536 + 0.3536i \end{matrix}$$

$$C_{15,1} = \begin{matrix} 0.5000 \\ -0.3536 - 0.3536i \\ 0 + 0.5000i \\ 0.3536 - 0.3536i \end{matrix}$$

-continued $$C_{16,1} = \begin{bmatrix} 0.5000 \\ 0.3536 - 0.3536i \\ 0 - 0.5000i \\ -0.3536 - 0.3536i \end{bmatrix}$$

4) A second example of a codebook used in a downlink of a single user MIMO communication system or a multi-user MIMO communication system where a number of physical antennas of a base station is four:

4-1) Codebook used in a downlink of a single user MIMO communication system where a number of physical antennas of a base station is four:

Here, a rotation matrix Urot and a QPSK DFT matrix may be defined as follows.

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix}, \text{ and}$$

$$DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix},$$

diag(a, b, c, d) is a 4×4 matrix, and diagonal elements of diag(a, b, c, d) are a, b, c, and d, and all the remaining elements are zero.

Codewords $W_1$, $W_2$, $W_3$, $W_4$, $W_5$, and $W_6$ may be defined as follows:

$$W_1 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & 1 & -1 \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$W_2 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ j & -j & j & -j \\ 1 & 1 & -1 & -1 \\ j & -j & -j & j \end{bmatrix}$$

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & j & -j \\ 1 & 1 & -1 & -1 \\ 1 & -1 & -j & j \end{bmatrix}$$

$$W_4 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & 1 & -1 \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ j & -j & 1 & -1 \\ 1 & 1 & -1 & -1 \\ j & -j & -1 & 1 \end{bmatrix}$$

$$W_5 = \text{diag}(1, 1, 1, -1) * DFT$$

$$= 0.5 * \begin{bmatrix} 1 & 1 & 1 & 1 \\ 1 & j & -1 & -j \\ 1 & -1 & 1 & -1 \\ -1 & j & 1 & -j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

For example, where the number of physical antennas of the base station is four, the matrices or the codewords included in the codebook used in the downlink of the single user MIMO communication system according to the second example may be given by the following Table 6:

| Transmit Codebook Index | Rank 1 | Rank 2 | Rank 3 | Rank 4 |
|---|---|---|---|---|
| 1 | $C_{1,1} = W1(;, 2)$ | $C_{1,2} = W1(;, 2\ 1)$ | $C_{1,3} = W1(;, 1\ 2\ 3)$ | $C_{1,4} = W1(;, 1\ 2\ 3\ 4)$ |
| 2 | $C_{2,1} = W1(;, 3)$ | $C_{2,2} = W1(;, 3\ 1)$ | $C_{2,3} = W1(;, 1\ 2\ 4)$ | $C_{2,4} = W2(;, 1\ 2\ 3\ 4)$ |
| 3 | $C_{3,1} = W1(;, 4)$ | $C_{3,2} = W1(;, 4\ 1)$ | $C_{3,3} = W1(;, 1\ 3\ 4)$ | $C_{3,4} = W3(;, 1\ 2\ 3\ 4)$ |
| 4 | $C_{4,1} = W2(;, 2)$ | $C_{4,2} = W1(;, 2\ 3)$ | $C_{4,3} = W1(;, 2\ 3\ 4)$ | $C_{4,4} = W4(;, 1\ 2\ 3\ 4)$ |
| 5 | $C_{5,1} = W2(;, 3)$ | $C_{5,2} = W1(;, 2\ 4)$ | $C_{5,3} = W2(;, 1\ 2\ 3)$ | $C_{5,4} = W5(;, 1\ 2\ 3\ 4)$ |
| 6 | $C_{6,1} = W2(;, 4)$ | $C_{6,2} = W1(;, 3\ 4)$ | $C_{6,3} = W2(;, 1\ 2\ 4)$ | $C_{6,4} = W6(;, 1\ 2\ 3\ 4)$ |

-continued

| Transmit Codebook Index | Rank 1 | Rank 2 | Rank 3 | Rank 4 |
|---|---|---|---|---|
| 7 | $C_{7,1} = W3(:, 1)$ | $C_{7,2} = W2(:, 3\ 1)$ | $C_{7,3} = W2(:, 1\ 3\ 4)$ | n/a |
| 8 | $C_{8,1} = W4(:, 1)$ | $C_{8,2} = W2(:, 4\ 1)$ | $C_{8,3} = W2(:, 2\ 3\ 4)$ | n/a |
| 9 | $C_{9,1} = W5(:, 1)$ | $C_{9,2} = W2(:, 2\ 3)$ | $C_{9,3} = W5(:, 1\ 2\ 3)$ | n/a |
| 10 | $C_{10,1} = W5(:, 2)$ | $C_{10,2} = W2(:, 2\ 4)$ | $C_{10,3} = W5(:, 1\ 2\ 4)$ | n/a |
| 11 | $C_{11,1} = W5(:, 3)$ | $C_{11,2} = W3(:, 3\ 1)$ | $C_{11,3} = W5(:, 1\ 3\ 4)$ | n/a |
| 12 | $C_{12,1} = W5(:, 4)$ | $C_{12,2} = W3(:, 4\ 1)$ | $C_{12,3} = W5(:, 2\ 3\ 4)$ | n/a |
| 13 | $C_{13,1} = W6(:, 1)$ | $C_{13,2} = W4(:, 3\ 1)$ | $C_{13,3} = W6(:, 1\ 2\ 3)$ | n/a |
| 14 | $C_{14,1} = W6(:, 2)$ | $C_{14,2} = W4(:, 4\ 1)$ | $C_{14,3} = W6(:, 1\ 2\ 4)$ | n/a |
| 15 | $C_{15,1} = W6(:, 3)$ | $C_{15,2} = W5(:, 1\ 3)$ | $C_{15,3} = W6(:, 1\ 3\ 4)$ | n/a |
| 16 | $C_{16,1} = W6(:, 4)$ | $C_{16,2} = W6(:, 2\ 4)$ | $C_{16,3} = W6(:, 2\ 3\ 4)$ | n/a |

The codewords included in the above Table 6 may be expressed as follows:

$$C_{1,1} = \begin{bmatrix} 0.5000 \\ -0.5000 \\ 0.5000 \\ -0.5000 \end{bmatrix}$$

$$C_{2,1} = \begin{bmatrix} 0.5000 \\ 0.5000 \\ -0.5000 \\ -0.5000 \end{bmatrix}$$

$$C_{3,1} = \begin{bmatrix} 0.5000 \\ -0.5000 \\ -0.5000 \\ 0.5000 \end{bmatrix}$$

$$C_{4,1} = \begin{bmatrix} 0.5000 \\ 0 - 0.5000i \\ 0.5000 \\ 0 - 0.5000i \end{bmatrix}$$

$$C_{5,1} = \begin{bmatrix} 0.5000 \\ 0 + 0.5000i \\ -0.5000 \\ 0 - 0.5000i \end{bmatrix}$$

$$C_{6,1} = \begin{bmatrix} 0.5000 \\ 0 - 0.5000i \\ -0.5000 \\ 0 + 0.5000i \end{bmatrix}$$

$$C_{7,1} = \begin{bmatrix} 0.5000 \\ 0.5000 \\ 0.5000 \\ 0.5000 \end{bmatrix}$$

$$C_{8,1} = \begin{bmatrix} 0.5000 \\ 0 + 0.5000i \\ 0.5000 \\ 0 + 0.5000i \end{bmatrix}$$

$$C_{9,1} = \begin{bmatrix} 0.5000 \\ 0.5000 \\ 0.5000 \\ -0.5000 \end{bmatrix}$$

$$C_{10,1} = \begin{bmatrix} 0.5000 \\ 0 + 0.5000i \\ -0.5000 \\ 0 + 0.5000i \end{bmatrix}$$

$$C_{11,1} = \begin{bmatrix} 0.5000 \\ -0.5000 \\ 0.5000 \\ 0.5000 \end{bmatrix}$$

$$C_{12,1} = \begin{bmatrix} 0.5000 \\ 0 - 0.5000i \\ -0.5000 \\ 0 - 0.5000i \end{bmatrix}$$

$$C_{13,1} = \begin{bmatrix} 0.5000 \\ 0.3536 + 0.3536i \\ 0 + 0.5000i \\ -0.3536 + 0.3536i \end{bmatrix}$$

$$C_{14,1} = \begin{bmatrix} 0.5000 \\ -0.3536 + 0.3536i \\ 0 - 0.5000i \\ 0.3536 + 0.3536i \end{bmatrix}$$

$$C_{15,1} = \begin{bmatrix} 0.5000 \\ -0.3536 + 0.3536i \\ 0 + 0.5000i \\ 0.3536 - 0.3536i \end{bmatrix}$$

$$C_{16,1} = \begin{bmatrix} 0.5000 \\ 0.3536 - 0.3536i \\ 0 - 0.5000i \\ -0.3536 - 0.3536i \end{bmatrix}$$

$$C_{1,2} = \begin{matrix} 0.5000 & 0.5000 \\ -0.5000 & 0.5000 \\ 0.5000 & 0.5000 \\ -0.5000 & 0.5000 \end{matrix}$$

$$C_{2,2} = \begin{matrix} 0.5000 & 0.5000 \\ 0.5000 & 0.5000 \\ -0.5000 & 0.5000 \\ -0.5000 & 0.5000 \end{matrix}$$

$$C_{3,2} = \begin{matrix} 0.5000 & 0.5000 \\ -0.5000 & 0.5000 \\ -0.5000 & 0.5000 \\ 0.5000 & 0.5000 \end{matrix}$$

$$C_{4,2} = \begin{matrix} 0.5000 & 0.5000 \\ -0.5000 & 0.5000 \\ 0.5000 & -0.5000 \\ -0.5000 & -0.5000 \end{matrix}$$

$$C_{5,2} = \begin{matrix} 0.5000 & 0.5000 \\ -0.5000 & -0.5000 \\ 0.5000 & -0.5000 \\ -0.5000 & 0.5000 \end{matrix}$$

$$C_{6,2} = \begin{matrix} 0.5000 & 0.5000 \\ 0.5000 & -0.5000 \\ -0.5000 & -0.5000 \\ -0.5000 & 0.5000 \end{matrix}$$

$$C_{7,2} = \begin{matrix} 0.5000 & 0.5000 \\ 0+0.5000i & 0+0.5000i \\ -0.5000 & 0.5000 \\ 0-0.5000i & 0+0.5000i \end{matrix}$$

$$C_{8,2} = \begin{matrix} 0.5000 & 0.5000 \\ 0-0.5000i & 0+0.5000i \\ -0.5000 & 0.5000 \\ 0+0.5000i & 0+0.5000i \end{matrix}$$

$$C_{9,2} = \begin{matrix} 0.5000 & 0.5000 \\ 0-0.5000i & 0+0.5000i \\ 0.5000 & -0.5000 \\ 0-0.5000i & 0-0.5000i \end{matrix}$$

$$C_{10,2} = \begin{matrix} 0.5000 & 0.5000 \\ 0-0.5000i & 0-0.5000i \\ 0.5000 & -0.5000 \\ 0-0.5000i & 0+0.5000i \end{matrix}$$

$$C_{11,2} = \begin{matrix} 0.5000 & 0.5000 \\ 0+0.5000i & 0.5000 \\ -0.5000 & 0.5000 \\ 0-0.5000i & 0.5000 \end{matrix}$$

$$C_{12,2} = \begin{matrix} 0.5000 & 0.5000 \\ 0-0.5000i & 0.5000 \\ -0.5000 & 0.5000 \\ 0+0.5000i & 0.5000 \end{matrix}$$

$$C_{13,2} = \begin{matrix} 0.5000 & 0.5000 \\ 0.5000 & 0+0.5000i \\ -0.5000 & 0.5000 \\ -0.5000 & 0+0.5000i \end{matrix}$$

$$C_{14,2} = \begin{matrix} 0.5000 & 0.5000 \\ -0.5000 & 0+0.5000i \\ -0.5000 & 0.5000 \\ 0.5000 & 0+0.5000i \end{matrix}$$

$$C_{15,2} = \begin{matrix} 0.5000 & 0.5000 \\ 0.5000 & -0.5000 \\ 0.5000 & 0.5000 \\ -0.5000 & 0.5000 \end{matrix}$$

$$C_{16,2} = \begin{matrix} 0.5000 & 0.5000 \\ -0.3536+0.3536i & 0.3536-0.3536i \\ 0-0.5000i & 0-0.5000i \\ 0.3536+0.3536i & -0.3536-0.3536i \end{matrix}$$

$$C_{1,3} = \begin{matrix} 0.5000 & 0.5000 & 0.5000 \\ 0.5000 & -0.5000 & 0.5000 \\ 0.5000 & 0.5000 & -0.5000 \\ 0.5000 & -0.5000 & -0.5000 \end{matrix}$$

$$C_{2,3} = \begin{matrix} 0.5000 & 0.5000 & 0.5000 \\ 0.5000 & -0.5000 & -0.5000 \\ 0.5000 & 0.5000 & -0.5000 \\ 0.5000 & -0.5000 & 0.5000 \end{matrix}$$

$$C_{3,3} = \begin{matrix} 0.5000 & 0.5000 & 0.5000 \\ 0.5000 & 0.5000 & -0.5000 \\ 0.5000 & -0.5000 & -0.5000 \\ 0.5000 & -0.5000 & 0.5000 \end{matrix}$$

$$C_{4,3} = \begin{matrix} 0.5000 & 0.5000 & 0.5000 \\ -0.5000 & 0.5000 & -0.5000 \\ 0.5000 & -0.5000 & -0.5000 \\ -0.5000 & -0.5000 & 0.5000 \end{matrix}$$

$$C_{5,3} = \begin{matrix} 0.5000 & 0.5000 & 0.5000 \\ 0+0.5000i & 0-0.5000i & 0+0.5000i \\ 0.5000 & 0.5000 & -0.5000 \\ 0+0.5000i & 0-0.5000i & 0-0.5000i \end{matrix}$$

$$C_{6,3} = \begin{matrix} 0.5000 & 0.5000 & 0.5000 \\ 0+0.5000i & 0-0.5000i & 0-0.5000i \\ 0.5000 & 0.5000 & -0.5000 \\ 0+0.5000i & 0-0.5000i & 0+0.5000i \end{matrix}$$

$$C_{7,3} = \begin{matrix} 0.5000 & 0.5000 & 0.5000 \\ 0+0.5000i & 0+0.5000i & 0-0.5000i \\ 0.5000 & -0.5000 & -0.5000 \\ 0+0.5000i & 0-0.5000i & 0+0.5000i \end{matrix}$$

$$C_{8,3} = \begin{matrix} 0.5000 & 0.5000 & 0.5000 \\ 0-0.5000i & 0+0.5000i & 0-0.5000i \\ 0.5000 & -0.5000 & -0.5000 \\ 0-0.5000i & 0-0.5000i & 0+0.5000i \end{matrix}$$

$$C_{9,3} = \begin{matrix} 0.5000 & 0.5000 & 0.5000 \\ 0.5000 & 0+0.5000i & -0.5000 \\ 0.5000 & -0.5000 & 0.5000 \\ -0.5000 & 0+0.5000i & 0.5000 \end{matrix}$$

$$C_{10,3} = \begin{matrix} 0.5000 & 0.5000 & 0.5000 \\ 0.5000 & 0+0.5000i & 0-0.5000i \\ 0.5000 & -0.5000 & -0.5000 \\ -0.5000 & 0+0.5000i & 0-0.5000i \end{matrix}$$

$$C_{11,3} = \begin{matrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{matrix}$$

$$C_{12,3} = \begin{matrix} 0.5000 & 0.5000 & 0.5000 \\ 0+0.5000i & -0.5000 & 0-0.5000i \\ -0.5000 & 0.5000 & -0.5000 \\ 0+0.5000i & 0.5000 & 0-0.5000i \end{matrix}$$

$$C_{15,3} = \begin{matrix} 0.5000 & 0.5000 & 0.5000 \\ 0.3536+0.3536i & -0.3536-0.3536i & 0.3536-0.3536i \\ 0+0.5000i & 0+0.5000i & 0-0.5000i \\ -0.3536+0.3536i & 0.3536-0.3536i & -0.3536-0.3536i \end{matrix}$$

$$C_{16,3} = \begin{matrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ 0.3536+0.3536i & 0.3536-0.3536i & -0.3536-0.3536i \end{matrix}$$

$$C_{1,4} = \begin{matrix} 0.5000 & 0.5000 & 0.5000 & 0.5000 \\ 0.5000 & -0.5000 & 0.5000 & -0.5000 \\ 0.5000 & 0.5000 & -0.5000 & -0.5000 \\ 0.5000 & -0.5000 & -0.5000 & 0.5000 \end{matrix}$$

$$C_{2,4} = \begin{matrix} 0.5000 & 0.5000 & 0.5000 & 0.5000 \\ 0+0.5000i & 0-0.5000i & 0+0.5000i & 0-0.5000i \\ 0.5000 & 0.5000 & -0.5000 & -0.5000 \\ 0+0.5000i & 0-0.5000i & 0-0.5000i & 0+0.5000i \end{matrix}$$

$$C_{3,4} = \begin{matrix} 0.5000 & 0.5000 & 0.5000 & 0.5000 \\ 0.5000 & -0.5000 & 0+0.5000i & 0-0.5000i \\ 0.5000 & 0.5000 & -0.5000 & -0.5000 \\ 0.5000 & -0.5000 & 0-0.5000i & 0+0.5000i \end{matrix}$$

$$C_{4,4} = \begin{matrix} 0.5000 & 0.5000 & 0.5000 & 0.5000 \\ 0+0.5000i & 0-0.5000i & 0.5000 & -0.5000 \\ 0.5000 & 0.5000 & -0.5000 & -0.5000 \\ 0+0.5000i & 0-0.5000i & -0.5000 & 0.5000 \end{matrix}$$

$$C_{5,4} = \begin{matrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{matrix}$$

$$C_{6,4} = \begin{matrix} 0.5000 & 0.5000 & 0.5000 & 0.5000 \\ 0.3536+0.3536i & -0.3536+0.3536i & -0.3536-0.3536i & 0.3536-0.3536i \\ 0+05000i & 0-0.5000i & 0+0.5000i & 0-05000i \\ -0.3536+0.3536i & 0.3536+0.3536i & 0.3536-0.3536i & -0.3536-0.3536i \end{matrix}$$

-continued $$C_{13,3} = \begin{matrix} 0.5000 & 0.5000 & 0.5000 \\ 0.3536+0.3536i & -0.3536+0.3536i & -0.3536-0.3536i \\ 0+0.5000i & 0-0.5000i & 0+0.5000i \\ -0.3536+0.3536i & 0.3536+0.3536i & 0.3536-0.3536i \end{matrix}$$

$$C_{14,3} = \begin{matrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536-0.3536i \end{matrix}$$

4-2) Codebook used in a downlink of a multi-user MIMO communication system performing unitary precoding where a number of physical antennas of a base station is four:

For example, the codebook used in the downlink of the multi-user MIMO communication system according to the second example may be designed by appropriately combining two matrices $W_3$ and $W_6$ as follows:

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix}$$

$$= 0.5 * \begin{bmatrix} 1 & 1 & -1 & -1 \\ 1 & -1 & -j & j \\ 1 & 1 & 1 & 1 \\ 1 & -1 & j & -j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

For example, where the number of physical antennas of the base station is four, the matrices or the codewords included in the codebook used in the downlink of the multi-user MIMO communication system according to the second example may be given by the following Table 7:

| Transmit Codebook Index | Rank 1 |
|---|---|
| 1 | $M_1 = W3(;, 1)$ |
| 2 | $M_2 = W3(;, 2)$ |
| 3 | $M_3 = W3(;, 3)$ |
| 4 | $M_4 = W3(;, 4)$ |
| 5 | $M_5 = W6(;, 1)$ |
| 6 | $M_6 = W6(;, 2)$ |
| 7 | $M_7 = W6(;, 3)$ |
| 8 | $M_8 = W6(;, 4)$ |

The codewords included in the above Table 7 may be expressed as follows:

$$M_1 = \begin{matrix} 0.5000 \\ 0.5000 \\ 0.5000 \\ 0.5000 \end{matrix}$$

$$M_2 = \begin{matrix} 0.5000 \\ -0.5000 \\ 0.5000 \\ -0.5000 \end{matrix}$$

$$M_3 = \begin{matrix} -0.5000 \\ 0 - 0.5000i \\ 0.5000 \\ 0 + 0.5000i \end{matrix}$$

$$M_4 = \begin{matrix} -0.5000 \\ 0 + 0.5000i \\ 0.5000 \\ 0 - 0.5000i \end{matrix}$$

$$M_5 = \begin{matrix} 0.5000 \\ 0.3536 + 0.3536i \\ 0 + 0.5000i \\ -0.3536 + 0.3536i \end{matrix}$$

$$M_6 = \begin{matrix} 0.5000 \\ -0.3536 + 0.3536i \\ 0 - 0.5000i \\ 0.3536 + 0.3536i \end{matrix}$$

$$M_7 = \begin{matrix} 0.5000 \\ -0.3536 - 0.3536i \\ 0 + 0.5000i \\ 0.3536 - 0.3536i \end{matrix}$$

$$M_8 = \begin{matrix} 0.5000 \\ 0.3536 - 0.3536i \\ 0 - 0.5000i \\ -0.3536 - 0.3536i \end{matrix}$$

4-3) Codebook used in a downlink of a multi-user MIMO communication system performing non-unitary precoding where a number of physical antennas of a base station is four:

For example, where the number of physical antennas of the base station is four, the codewords included in the codebook used in the downlink of the multi-user MIMO communication system performing non-unitary precoding may be given by the following Table 8:

| Transmit Codebook Index | Transmission Rank 1 |
|---|---|
| 1 | $C_{1,1} = W1(;, 2)$ |
| 2 | $C_{2,1} = W1(;, 3)$ |
| 3 | $C_{3,1} = W1(;, 4)$ |
| 4 | $C_{4,1} = W2(;, 2)$ |
| 5 | $C_{5,1} = W2(;, 3)$ |
| 6 | $C_{6,1} = W2(;, 4)$ |
| 7 | $C_{7,1} = W3(;, 1)$ |
| 8 | $C_{8,1} = W4(;, 1)$ |
| 9 | $C_{9,1} = W5(;, 1)$ |
| 10 | $C_{10,1} = W5(;, 2)$ |
| 11 | $C_{11,1} = W5(;, 3)$ |
| 12 | $C_{12,1} = W5(;, 4)$ |
| 13 | $C_{13,1} = W6(;, 1)$ |
| 14 | $C_{14,1} = W6(;, 2)$ |
| 15 | $C_{15,1} = W6(;, 3)$ |
| 16 | $C_{16,1} = W6(;, 4)$ |

The codewords included in the above Table 8 may be expressed as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{bmatrix} -0.5000 \\ 0.5000 \\ 0.5000 \\ -0.5000 \end{bmatrix}$$

$$C_{4,1} = \begin{bmatrix} 0.5000 \\ 0 - 0.5000i \\ 0.5000 \\ 0 - 0.5000i \end{bmatrix}$$

$$C_{5,1} = \begin{bmatrix} -0.5000 \\ 0 - 0.5000i \\ 0.5000 \\ 0 + 0.5000i \end{bmatrix}$$

$$C_{6,1} = \begin{bmatrix} -0.5000 \\ 0 + 0.5000i \\ 0.5000 \\ 0 - 0.5000i \end{bmatrix}$$

$$C_{7,1} = \begin{bmatrix} 0.5000 \\ 0.5000 \\ 0.5000 \\ 0.5000 \end{bmatrix}$$

$$C_{8,1} = \begin{bmatrix} 0.5000 \\ 0 + 0.5000i \\ 0.5000 \\ 0 + 0.5000i \end{bmatrix}$$

$$C_{9,1} = \begin{bmatrix} 0.5000 \\ 0.5000 \\ 0.5000 \\ -0.5000 \end{bmatrix}$$

$$C_{10,1} = \begin{bmatrix} 0.5000 \\ 0 + 0.5000i \\ -0.5000 \\ 0 + 0.5000i \end{bmatrix}$$

$$C_{11,1} = \begin{bmatrix} 0.5000 \\ -0.5000 \\ 0.5000 \\ 0.5000 \end{bmatrix}$$

$$C_{12,1} = \begin{bmatrix} 0.5000 \\ 0 - 0.5000i \\ -0.5000 \\ 0 - 0.5000i \end{bmatrix}$$

$$C_{13,1} = \begin{bmatrix} 0.5000 \\ 0.3536 + 0.3536i \\ 0 + 0.5000i \\ -0.3536 + 0.3536i \end{bmatrix}$$

$$C_{14,1} = \begin{bmatrix} 0.5000 \\ -0.3536 + 0.3536i \\ 0 - 0.5000i \\ 0.3536 + 0.3536i \end{bmatrix}$$

$$C_{15,1} = \begin{bmatrix} 0.5000 \\ -0.3536 - 0.3536i \\ 0 + 0.5000i \\ 0.3536 - 0.3536i \end{bmatrix}$$

$$C_{16,1} = \begin{bmatrix} 0.5000 \\ 0.3536 - 0.3536i \\ 0 - 0.5000i \\ -0.3536 - 0.3536i \end{bmatrix}$$

5) A third example of a codebook used in a downlink of a single user MIMO communication system or a multi-user MIMO communication system where a number of physical antennas of a base station is four:

5-1) Codebook used in a downlink of a single user MIMO communication system where a number of physical antennas of a base station is four:

Here, a rotation matrix Urot and a QPSK DFT matrix may be defined as follows.

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix}, \text{ and}$$

$$DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix},$$

diag(a, b, c, d) is a 4×4 matrix, and diagonal elements of diag(a, b, c, d) are a, b, c, and d, and all the remaining elements are zero.

Codewords $W_1$, $W_2$, $W_3$, $W_4$, $W_5$, and $W_6$ may be defined as follows:

$$W_1 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & 1 & -1 \end{bmatrix}$$

$$= 0.5 * \begin{bmatrix} 1 & 1 & -1 & -1 \\ 1 & -1 & -1 & 1 \\ 1 & 1 & 1 & 1 \\ 1 & -1 & 1 & -1 \end{bmatrix}$$

$$W_2 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & j & -j \end{bmatrix}$$

$$= 0.5 * \begin{bmatrix} 1 & 1 & -1 & -1 \\ j & -j & -j & j \\ 1 & 1 & 1 & 1 \\ j & -j & j & -j \end{bmatrix}$$

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix}$$

$$= 0.5 * \begin{bmatrix} 1 & 1 & -1 & -1 \\ 1 & -1 & -j & j \\ 1 & 1 & 1 & 1 \\ 1 & -1 & j & -j \end{bmatrix}$$

$$W_4 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & 1 & -1 \end{bmatrix}$$

$$= 0.5 * \begin{bmatrix} 1 & 1 & -1 & -1 \\ j & -j & -1 & 1 \\ 1 & 1 & 1 & 1 \\ j & -j & 1 & -1 \end{bmatrix}$$

$$W_5 = \text{diag}(1, 1, 1, -1) * DFT$$

$$= 0.5 * \begin{bmatrix} 1 & 1 & 1 & 1 \\ 1 & j & -1 & -j \\ 1 & -1 & 1 & -1 \\ -1 & j & 1 & -j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

For example, where the number of physical antennas of the base station is four, the matrices or the codewords included in the codebook used in the downlink of the single user MIMO communication system according to the third example may be given by the following Table 9:

The codewords included in the above Table 9 may be expressed as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{matrix} -0.5000 \\ 0.5000 \\ 0.5000 \\ -0.5000 \end{matrix}$$

$$C_{4,1} = \begin{matrix} 0.5000 \\ 0 - 05000i \\ 0.5000 \\ 0 - 0.5000i \end{matrix}$$

$$C_{5,1} = \begin{matrix} -0.5000 \\ 0 - 0.5000i \\ 0.5000 \\ 0 + 0.5000i \end{matrix}$$

$$C_{6,1} = \begin{matrix} -0.5000 \\ 0 + 0.5000i \\ 0.5000 \\ 0 - 0.5000i \end{matrix}$$

| Transmit Codebook Index | Rank 1 | Rank 2 | Rank 3 | Rank 4 |
|---|---|---|---|---|
| 1 | $C_{1,1}$ = W1(;, 2) | $C_{1,2}$ = W1(;, 2 1) | $C_{1,3}$ = W1(;, 1 2 3) | $C_{1,4}$ = W1(;, 1 2 3 4) |
| 2 | $C_{2,1}$ = W1(;, 3) | $C_{2,2}$ = W1(;, 3 1) | $C_{2,3}$ = W1(;, 1 2 4) | $C_{2,4}$ = W2(;, 1 2 3 4) |
| 3 | $C_{3,1}$ = W1(;, 4) | $C_{3,2}$ = W1(;, 4 1) | $C_{3,3}$ = W1(;, 1 3 4) | $C_{3,4}$ = W3(;, 1 2 3 4) |
| 4 | $C_{4,1}$ = W2(;, 2) | $C_{4,2}$ = W1(;, 2 3) | $C_{4,3}$ = W1(;, 2 3 4) | $C_{4,4}$ = W4(;, 1 2 3 4) |
| 5 | $C_{5,1}$ = W2(;, 3) | $C_{5,2}$ = W1(;, 2 4) | $C_{5,3}$ = W2(;, 1 2 3) | $C_{5,4}$ = W5(;, 1 2 3 4) |
| 6 | $C_{6,1}$ = W2(;, 4) | $C_{6,2}$ = W1(;, 3 4) | $C_{6,3}$ = W2(;, 1 2 4) | $C_{6,4}$ = W6(;, 1 2 3 4) |
| 7 | $C_{7,1}$ = W3(;, 1) | $C_{7,2}$ = W2(;, 3 1) | $C_{7,3}$ = W2(;, 1 3 4) | n/a |
| 8 | $C_{8,1}$ = W4(;, 1) | $C_{8,2}$ = W2(;, 4 1) | $C_{8,3}$ = W2(;, 2 3 4) | n/a |
| 9 | $C_{9,1}$ = W5(;, 1) | $C_{9,2}$ = W2(;, 2 3) | $C_{9,3}$ = W5(;, 1 2 3) | n/a |
| 10 | $C_{10,1}$ = W5(;, 2) | $C_{10,2}$ = W2(;, 2 4) | $C_{10,3}$ = W5(;, 1 2 4) | n/a |
| 11 | $C_{11,1}$ = W5(;, 3) | $C_{11,2}$ = W3(;, 3 1) | $C_{11,3}$ = W5(;, 1 3 4) | n/a |
| 12 | $C_{12,1}$ = W5(;, 4) | $C_{12,2}$ = W3(;, 4 1) | $C_{12,3}$ = W5(;, 2 3 4) | n/a |
| 13 | $C_{13,1}$ = W6(;, 1) | $C_{13,2}$ = W4(;, 3 1) | $C_{13,3}$ = W6(;, 1 2 3) | n/a |
| 14 | $C_{14,1}$ = W6(;, 2) | $C_{14,2}$ = W4(;, 4 1) | $C_{14,3}$ = W6(;, 1 2 4) | n/a |
| 15 | $C_{15,1}$ = W6(;, 3) | $C_{15,2}$ = W5(;, 1 3) | $C_{15,3}$ = W6(;, 1 3 4) | n/a |
| 16 | $C_{16,1}$ = W6(;, 4) | $C_{16,2}$ = W6(;, 2 4) | $C_{16,3}$ = W6(;, 2 3 4) | n/a |

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0+0.5000i \\ 05000 \\ 0+0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0+0.5000i \\ -0.5000 \\ 0+0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0-0.5000i \\ -0.5000 \\ 0-0.5000i \end{matrix}$$

$$C_{13,1} = \begin{matrix} 0.5000 \\ 0.3536+0.3536i \\ 0+0.5000i \\ -0.3536+0.3536i \end{matrix}$$

$$C_{14,1} = \begin{matrix} 0.5000 \\ -0.3536+0.3536i \\ 0-0.5000i \\ 0.3536+0.3536i \end{matrix}$$

$$C_{15,1} = \begin{matrix} 0.5000 \\ -0.3536-0.3536i \\ 0+0.5000i \\ 0.3536-0.3536i \end{matrix}$$

$$C_{16,1} = \begin{matrix} 0.5000 \\ 0.3536-0.3536i \\ 0-0.5000i \\ -0.3536-0.3536i \end{matrix}$$

$$C_{1,2} = \begin{matrix} 0.5000 & 0.5000 \\ 0.5000 & -0.5000 \\ 0.5000 & 0.5000 \\ 0.5000 & -0.5000 \end{matrix}$$

$$C_{2,2} = \begin{matrix} 0.5000 & -0.5000 \\ 0.5000 & -0.5000 \\ 0.5000 & 0.5000 \\ 0.5000 & 0.5000 \end{matrix}$$

$$C_{3,2} = \begin{matrix} 0.5000 & -0.5000 \\ 0.5000 & 0.5000 \\ 0.5000 & 0.5000 \\ 0.5000 & -0.5000 \end{matrix}$$

$$C_{4,2} = \begin{matrix} 0.5000 & -0.5000 \\ -0.5000 & -0.5000 \\ 0.5000 & 0.5000 \\ -0.5000 & 0.5000 \end{matrix}$$

$$C_{5,2} = \begin{matrix} 0.5000 & -0.5000 \\ -0.5000 & 0.5000 \\ 0.5000 & 0.5000 \\ -0.5000 & -0.5000 \end{matrix}$$

$$C_{6,2} = \begin{matrix} -0.5000 & -0.5000 \\ -0.5000 & 0.5000 \\ 0.5000 & 0.5000 \\ 0.5000 & -0.5000 \end{matrix}$$

$$C_{7,2} = \begin{matrix} 0.5000 & -0.5000 \\ 0+0.5000i & 0-0.5000i \\ 0.5000 & 0.5000 \\ 0+0.5000i & 0+0.5000i \end{matrix}$$

$$C_{8,2} = \begin{matrix} 0.5000 & -0.5000 \\ 0+0.5000i & 0+0.5000i \\ 0.5000 & 0.5000 \\ 0+0.5000i & 0-0.5000i \end{matrix}$$

$$C_{9,2} = \begin{matrix} 0.5000 & -0.5000 \\ 0-0.5000i & 0-0.5000i \\ 0.5000 & 0.5000 \\ 0-0.5000i & 0+0.5000i \end{matrix}$$

$$C_{10,2} = \begin{matrix} 0.5000 & -0.5000 \\ 0-0.5000i & 0+0.5000i \\ 0.5000 & 0.5000 \\ 0-0.5000i & 0-0.5000i \end{matrix}$$

$$C_{11,2} = \begin{matrix} 0.5000 & -0.5000 \\ 0.5000 & 0-0.5000i \\ 0.5000 & 0.5000 \\ 0.5000 & 0+0.5000i \end{matrix}$$

$$C_{12,2} = \begin{matrix} 0.5000 & -0.5000 \\ 0.5000 & 0+0.5000i \\ 0.5000 & 0.5000 \\ 0.5000 & 0-0.5000i \end{matrix}$$

$$C_{13,2} = \begin{pmatrix} 0.5000 & -0.5000 \\ 0+0.5000i & -0.5000 \\ 0.5000 & 0.5000 \\ 0+0.5000i & 0.5000 \end{pmatrix}$$

$$C_{14,2} = \begin{pmatrix} 0.5000 & -0.5000 \\ 0+0.5000i & 0.5000 \\ 0.5000 & 0.5000 \\ 0+0.5000i & -0.5000 \end{pmatrix}$$

$$C_{15,2} = \begin{pmatrix} 0.5000 & 0.5000 \\ 0.5000 & -0.5000 \\ 0.5000 & 0.5000 \\ -0.5000 & 0.5000 \end{pmatrix}$$

$$C_{16,2} = \begin{pmatrix} 0.5000 & 0.5000 \\ -0.3536+0.3536i & 0.3536-0.3536i \\ 0-0.5000i & 0-0.5000i \\ 0.3536+0.3536i & -0.3536-0.3536i \end{pmatrix}$$

$$C_{1,3} = \begin{pmatrix} 0.5000 & 0.5000 & -0.5000 \\ 0.5000 & -0.5000 & -0.5000 \\ 0.5000 & 0.5000 & 0.5000 \\ 0.5000 & -0.5000 & 0.5000 \end{pmatrix}$$

$$C_{2,3} = \begin{pmatrix} 0.5000 & 0.5000 & -0.5000 \\ 0.5000 & -0.5000 & 0.5000 \\ 0.5000 & 0.5000 & 0.5000 \\ 0.5000 & -0.5000 & -0.5000 \end{pmatrix}$$

$$C_{3,3} = \begin{pmatrix} 0.5000 & -0.5000 & -0.5000 \\ 0.5000 & -0.5000 & 0.5000 \\ 0.5000 & 0.5000 & 0.5000 \\ 0.5000 & 0.5000 & -0.5000 \end{pmatrix}$$

$$C_{4,3} = \begin{pmatrix} 0.5000 & -0.5000 & -0.5000 \\ -0.5000 & -0.5000 & 0.5000 \\ 0.5000 & 0.5000 & 0.5000 \\ -0.5000 & 0.5000 & -0.5000 \end{pmatrix}$$

$$C_{5,3} = \begin{pmatrix} 0.5000 & 0.5000 & -0.5000 \\ 0+0.5000i & 0-0.5000i & 0-0.5000i \\ 0.5000 & 0.5000 & 0.5000 \\ 0+0.5000i & 0-0.5000i & 0+0.5000i \end{pmatrix}$$

$$C_{6,3} = \begin{pmatrix} 0.5000 & 0.5000 & -0.5000 \\ 0+0.5000i & 0-0.5000i & 0+0.5000i \\ 0.5000 & 0.5000 & 0.5000 \\ 0+0.5000i & 0-0.5000i & 0-0.5000i \end{pmatrix}$$

$$C_{7,3} = \begin{pmatrix} 0.5000 & -0.5000 & -0.5000 \\ 0+0.5000i & 0-0.5000i & 0+0.5000i \\ 0.5000 & 0.5000 & 0.5000 \\ 0+0.5000i & 0+0.5000i & 0-0.5000i \end{pmatrix}$$

$$C_{8,3} = \begin{pmatrix} 0.5000 & -0.5000 & -0.5000 \\ 0-0.5000i & 0-0.5000i & 0+0.5000i \\ 0.5000 & 0.5000 & 0.5000 \\ 0-0.5000i & 0+0.5000i & 0-0.5000i \end{pmatrix}$$

$$C_{9,3} = \begin{pmatrix} 0.5000 & 0.5000 & 0.5000 \\ 0.5000 & 0-0.5000i & -0.5000 \\ 0.5000 & -0.5000 & 0.5000 \\ -0.5000 & 0+0.5000i & 0.5000 \end{pmatrix}$$

$$C_{10,3} = \begin{pmatrix} 0.5000 & 0.5000 & 0.5000 \\ 0.5000 & 0+0.5000i & 0-0.5000 \\ 0.5000 & -0.5000 & -0.5000 \\ -0.5000 & 0+0.5000i & 0-0.5000i \end{pmatrix}$$

$$C_{11,3} = \begin{pmatrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{pmatrix}$$

$$C_{12,3} = \begin{pmatrix} 0.5000 & 0.5000 & 0.5000 \\ 0+0.5000i & -0.5000 & 0-0.5000i \\ -0.5000 & 0.5000 & -0.5000 \\ 0+0.5000i & 0.5000 & 0-0.5000i \end{pmatrix}$$

$$C_{13,3} = \begin{pmatrix} 0.5000 & 0.5000 & 0.5000 \\ 0.3536+0.3536i & -0.3536+0.3536i & -0.3536-0.3536i \\ 0+0.5000i & 0-0.5000i & 0+0.5000i \\ -0.3536+0.3536i & 0.3536+0.3536i & 0.3536-0.3536i \end{pmatrix}$$

$$C_{14,3} = \begin{pmatrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536+0.3536i \end{pmatrix}$$

$$C_{15,3} = \begin{pmatrix} 0.5000 & 0.5000 & 0.5000 \\ 0.3536+0.3536i & -0.3536-0.3536i & 0.3536-0.3536i \\ 0+0.5000i & 0+0.5000i & 0-0.5000i \\ -0.3536+0.3536i & 0.3536-0.3536i & -0.3536-0.3536i \end{pmatrix}$$

$$C_{16,3} = \begin{pmatrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ -0.3536+0.3536i & 0.3536-0.3536i & -0.3536-0.3536i \end{pmatrix}$$

$$C_{1,4} = \begin{pmatrix} 0.5000 & 0.5000 & -0.5000 \\ 0.5000 & -0.5000 & 0.5000 \\ 0.5000 & 0.5000 & 0.5000 \\ 0.5000 & -0.5000 & -0.5000 \end{pmatrix}$$

$$C_{2,4} = \begin{pmatrix} 0.5000 & 0.5000 & -0.5000 & -0.5000 \\ 0+0.5000i & 0-0.5000i & 0-0.5000i & 0+0.5000 \\ 0.5000 & 0.5000 & 0.5000 & 0.5000 \\ 0+0.5000i & 0-0.5000i & 0+0.5000i & 0-0.5000i \end{pmatrix}$$

-continued $$C_{3,4} = \begin{bmatrix} 0.5000 & 0.5000 & -0.5000 & -0.5000 \\ 0.5000 & -0.5000 & 0-0.5000i & 0+0.5000i \\ 0.5000 & 0.5000 & 0.5000 & 0.5000 \\ 0.5000 & -0.5000 & 0+0.5000i & 0-0.5000i \end{bmatrix}$$

$$C_{4,4} = \begin{bmatrix} 0.5000 & 0.5000 & -0.5000 & -0.5000 \\ 0+0.5000i & 0-0.5000i & -0.5000 & 0.5000 \\ 0.5000 & 0.5000 & 0.5000 & 0.5000 \\ 0+0.5000i & 0-0.5000i & 0.5000 & -0.5000 \end{bmatrix}$$

$$C_{5,4} = \begin{bmatrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{bmatrix}$$

$$C_{6,4} = \begin{bmatrix} 0.5000 & 0.5000 & 0.5000 & 0.5000 \\ 0.3536+0.3536i & -0.3536+0.3536i & -0.3536-0.3536i & 0.3536-0.3536i \\ 0+0.5000i & 0-0.5000i & 0+0.5000i & 0-0.5000i \\ -0.3536+0.3536i & 0.3536+0.3536i & -0.3536-0.3536i & -0.3536-0.3536i \end{bmatrix}$$

5-2) Codebook used in a downlink of a multi-user MIMO communication system performing unitary precoding where a number of physical antennas of a base station is four:

For example, the codebook used in the downlink of the multi-user MIMO communication system according to the third example may be designed by appropriately combining two matrices $W_3$ and $W_6$ as follows:

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} = 0.5 * \begin{bmatrix} 1 & 1 & -1 & -1 \\ 1 & -1 & -j & j \\ 1 & 1 & 1 & 1 \\ 1 & -1 & j & -j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

For example, where the number of physical antennas of the base station is four, the matrices or the codewords included in the codebook used in the downlink of the multi-user MIMO communication system according to the third example may be given by the following Table 10:

| Transmit Codebook Index | Rank 1 |
|---|---|
| 1 | $M_1 = W3(:, 1)$ |
| 2 | $M_2 = W3(:, 2)$ |
| 3 | $M_3 = W3(:, 3)$ |
| 4 | $M_4 = W3(:, 4)$ |
| 5 | $M_5 = W6(:, 1)$ |
| 6 | $M_6 = W6(:, 2)$ |
| 7 | $M_7 = W6(:, 3)$ |
| 8 | $M_8 = W6(:, 4)$ |

The codewords included in the above Table may be expressed as follows:

$$M_1 = \begin{matrix} 0.5000 \\ 0.5000 \\ 0.5000 \\ 0.5000 \end{matrix}$$

$$M_2 = \begin{matrix} 0.5000 \\ -0.5000 \\ 0.5000 \\ -0.5000 \end{matrix}$$

$$M_3 = \begin{matrix} -0.5000 \\ 0-0.5000i \\ 0.5000 \\ 0+0.5000i \end{matrix}$$

$$M_4 = \begin{matrix} -0.5000 \\ 0+0.5000i \\ 0.5000 \\ 0-0.5000i \end{matrix}$$

$$M_5 = \begin{matrix} 0.5000 \\ 0.3536+0.3536i \\ 0+0.5000i \\ -0.3536+0.3536i \end{matrix}$$

$$M_6 = \begin{matrix} -0.5000 \\ -0.3536+0.3536i \\ 0-0.5000i \\ 0.3536+0.3536i \end{matrix}$$

$$M_7 = \begin{matrix} 0.5000 \\ -0.3536+0.3536i \\ 0-0.5000i \\ 0.3536+0.3536i \end{matrix}$$

$$M_8 = \begin{matrix} 0.5000 \\ 0.3536 - 0.3536i \\ 0 - 0.5000i \\ -0.3536 - 0.3536i \end{matrix}$$

5-3) Codebook used in a downlink of a multi-user MIMO communication system performing non-unitary precoding where a number of physical antennas of a base station is four:

For example, where the number of physical antennas of the base station is four, the codewords included in the codebook used in the downlink of the multi-user MIMO communication system performing non-unitary precoding may be given by the following Table 11:

| Transmit Codebook Index | Transmission Rank 1 |
|---|---|
| 1 | $C_{1,1} = W1(:, 2)$ |
| 2 | $C_{2,1} = W1(:, 3)$ |
| 3 | $C_{3,1} = W1(:, 4)$ |
| 4 | $C_{4,1} = W2(:, 2)$ |
| 5 | $C_{5,1} = W2(:, 3)$ |
| 6 | $C_{6,1} = W2(:, 4)$ |
| 7 | $C_{7,1} = W3(:, 1)$ |
| 8 | $C_{8,1} = W4(:, 1)$ |
| 9 | $C_{9,1} = W5(:, 1)$ |
| 10 | $C_{10,1} = W5(:, 2)$ |
| 11 | $C_{11,1} = W5(:, 3)$ |
| 12 | $C_{12,1} = W5(:, 4)$ |
| 13 | $C_{13,1} = W6(:, 1)$ |
| 14 | $C_{14,1} = W6(:, 2)$ |
| 15 | $C_{15,1} = W6(:, 3)$ |
| 16 | $C_{16,1} = W6(:, 4)$ |

The codewords included in the above Table 11 may be expressed as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{matrix} -0.5000 \\ 0.5000 \\ 0.5000 \\ -0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} -0.5000 \\ 0 - 0.5000i \\ 0.5000 \\ 0 + 0.5000i \end{matrix}$$

$$C_{6,1} = \begin{matrix} -0.5000 \\ 0 + 0.5000i \\ 0.5000 \\ 0 - 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{1,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 0.3536 + 0.3536i \\ 0 + 0.5000i \\ -0.3536 + 0.3536i \end{matrix}$$

$$C_{14,1} = \begin{matrix} 0.5000 \\ -0.3536 + 0.3536i \\ 0 - 0.5000i \\ 0.3536 + 0.3536i \end{matrix}$$

$$C_{15,1} = \begin{matrix} 0.5000 \\ -0.3536 - 0.3536i \\ 0 + 0.5000i \\ 0.3536 - 0.3536i \end{matrix}$$

-continued $$C_{16,1} = \begin{matrix} 0.5000 \\ -0.3536 - 0.3536i \\ 0 - 0.5000i \\ -0.3536 - 0.3536i \end{matrix}$$

6) A fourth example of a codebook used in a downlink of a single user MIMO communication system or a multi-user MIMO communication system where a number of physical antennas of a base station is four:

6-1) Codebook used in a downlink of a single user MIMO communication system where a number of physical antennas of a base station is four:

Here, a rotation matrix Urot and a QPSK DFT matrix may be defined as follows.

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \text{ and}$$

$$DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix},$$

diag(a, b, c, d) is a 4×4 matrix, and diagonal elements of diag(a, b, c, d) are a, b, c, and d, and all the remaining elements are zero.

Codewords $W_1$, $W_2$, $W_3$, $W_4$, $W_5$, and $W_6$ may be defined as follows:

$$W_1 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & 1 & -1 \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$W_2 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ j & -j & j & -j \\ 1 & 1 & -1 & -1 \\ j & -j & -j & j \end{bmatrix}$$

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & j & -j \\ 1 & 1 & -1 & -1 \\ 1 & -1 & -j & j \end{bmatrix}$$

$$W_4 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & 1 & -1 \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ j & -j & 1 & -1 \\ 1 & 1 & -1 & -1 \\ j & -j & -1 & 1 \end{bmatrix}$$

$$W_5 = \text{diag}(1, 1, 1, -1) * DFT$$

$$= 0.5 * \begin{bmatrix} 1 & 1 & 1 & 1 \\ 1 & j & -1 & -j \\ 1 & -1 & 1 & -1 \\ -1 & j & 1 & -j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

For example, where the number of physical antennas of the base station is four, the matrices or the codewords included in the codebook used in the downlink of the single user MIMO communication system according to the fourth example may be given by the following

TABLE 12

| Transmit Codebook Index | Transmission Rank 1 | Transmission Rank 2 | Transmission Rank 3 | Transmission Rank 4 |
|---|---|---|---|---|
| 1 | $C_{1,1}$ = W1(:, 2) | $C_{1,2}$ = W1(:, 1 2) | $C_{1,3}$ = W1(:, 1 2 3) | $C_{1,4}$ = W1(:, 1 2 3 4) |
| 2 | $C_{2,1}$ = W1(:, 3) | $C_{2,2}$ = W1(:, 1 3) | $C_{2,3}$ = W1(:, 1 2 4) | $C_{2,4}$ = W2(:, 1 2 3 4) |
| 3 | $C_{3,1}$ = W1(:, 4) | $C_{3,2}$ = W1(:, 1 4) | $C_{3,3}$ = W1(:, 1 3 4) | $C_{3,4}$ = W3(:, 1 2 3 4) |
| 4 | $C_{4,1}$ = W2(:, 2) | $C_{4,2}$ = W1(:, 2 3) | $C_{4,3}$ = W1(:, 2 3 4) | $C_{4,4}$ = W4(:, 1 2 3 4) |
| 5 | $C_{5,1}$ = W2(:, 3) | $C_{5,2}$ = W1(:, 2 4) | $C_{5,3}$ = W2(:, 1 2 3) | $C_{5,4}$ = W5(:, 1 2 3 4) |
| 6 | $C_{6,1}$ = W2(:, 4) | $C_{6,2}$ = W1(:, 3 4) | $C_{6,3}$ = W2(:, 1 2 4) | $C_{6,4}$ = W6(:, 1 2 3 4) |
| 7 | $C_{7,1}$ = W3(:, 1) | $C_{7,2}$ = W2(:, 1 3) | $C_{7,3}$ = W2(:, 1 3 4) | n/a |
| 8 | $C_{8,1}$ = W4(:, 1) | $C_{8,2}$ = W2(:, 1 4) | $C_{8,3}$ = W2(:, 2 3 4) | n/a |
| 9 | $C_{9,1}$ = W5(:, 1) | $C_{9,2}$ = W2(:, 2 3) | $C_{9,3}$ = W3(:, 1 2 3) | n/a |
| 10 | $C_{10,1}$ = W5(:, 2) | $C_{10,2}$ = W2(:, 2 4) | $C_{10,3}$ = W3(:, 1 3 4) | n/a |
| 11 | $C_{11,1}$ = W5(:, 3) | $C_{11,2}$ = W3(:, 1 3) | $C_{11,3}$ = W4(:, 1 2 3) | n/a |
| 12 | $C_{12,1}$ = W5(:, 4) | $C_{12,2}$ = W3(:, 1 4) | $C_{12,3}$ = W4(:, 1 3 4) | n/a |

TABLE 12-continued

| Transmit Codebook Index | Transmission Rank 1 | Transmission Rank 2 | Transmission Rank 3 | Transmission Rank 4 |
|---|---|---|---|---|
| 13 | $C_{13,1} = W6(:,1)$ | $C_{13,2} = W4(:,1\ 3)$ | $C_{13,3} = W5(:,1\ 2\ 3)$ | n/a |
| 14 | $C_{14,1} = W6(:,2)$ | $C_{14,2} = W4(:,1\ 4)$ | $C_{14,3} = W5(:,1\ 3\ 4)$ | n/a |
| 15 | $C_{15,1} = W6(:,3)$ | $C_{15,2} = W5(:,1\ 3)$ | $C_{15,3} = W6(:,1\ 2\ 4)$ | n/a |
| 16 | $C_{16,1} = W6(:,4)$ | $C_{16,2} = W6(:,2\ 4)$ | $C_{16,3} = W6(:,2\ 3\ 4)$ | n/a |

The codewords included in the above Table 12 may be expressed as follows:

$$C_{1,1} = \begin{matrix} 0.5000 \\ -0.5000 \\ 0.5000 \\ -0.5000 \end{matrix}$$

$$C_{2,1} = \begin{matrix} 0.5000 \\ 0.5000 \\ -0.5000 \\ -0.5000 \end{matrix}$$

$$C_{3,1} = \begin{matrix} 0.5000 \\ -0.5000 \\ -0.5000 \\ 0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} 0.5000 \\ 0 + 0.5000i \\ -0.5000 \\ 0 - 0.5000i \end{matrix}$$

$$C_{6,1} = \begin{matrix} 0.5000 \\ 0 - 0.5000i \\ -0.5000 \\ 0 + 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 0.3536 + 0.3536i \\ 0 + 0.5000i \\ -0.3536 + 0.3536i \end{matrix}$$

$$C_{14,1} = \begin{matrix} 0.5000 \\ -0.3536 + 0.3536i \\ 0 - 0.5000i \\ 0.3536 + 0.3536i \end{matrix}$$

$$C_{15,1} = \begin{matrix} 0.5000 \\ -0.3536 - 0.3536i \\ 0 + 0.5000i \\ 0.3536 - 0.3536i \end{matrix}$$

$$C_{16,1} = \begin{matrix} 0.5000 \\ 0.3536 - 0.3536i \\ 0 - 0.5000i \\ -0.3536 - 0.3536i \end{matrix}$$

$$C_{1,2} = \begin{matrix} 0.5000 & 0.5000 \\ -0.5000 & 0.5000 \\ 0.5000 & 0.5000 \\ -0.5000 & 0.5000 \end{matrix}$$

$$C_{2,2} = \begin{matrix} 0.5000 & 0.5000 \\ 0.5000 & 0.5000 \\ -0.5000 & 0.5000 \\ -0.5000 & 0.5000 \end{matrix}$$

-continued $$C_{3,2} = \begin{matrix} 0.5000 & 0.5000 \\ -0.5000 & 0.5000 \\ -0.5000 & 0.5000 \\ 0.5000 & 0.5000 \end{matrix}$$

$$C_{4,2} = \begin{matrix} 0.5000 & 0.5000 \\ -0.5000 & 0.5000 \\ 0.5000 & -0.5000 \\ -0.5000 & -0.5000 \end{matrix}$$

$$C_{5,2} = \begin{matrix} 0.5000 & 0.5000 \\ -0.5000 & -0.5000 \\ 0.5000 & -0.5000 \\ -0.5000 & 0.5000 \end{matrix}$$

$$C_{6,2} = \begin{matrix} 0.5000 & 0.5000 \\ 0.5000 & -0.5000 \\ -0.5000 & -0.5000 \\ -0.5000 & 0.5000 \end{matrix}$$

$$C_{7,2} = \begin{matrix} 0.5000 & 0.5000 \\ 0+0.5000i & 0+0.5000i \\ -0.5000 & 0.5000 \\ 0-0.5000i & 0+0.5000i \end{matrix}$$

$$C_{8,2} = \begin{matrix} 0.5000 & 0.5000 \\ 0-0.5000i & 0+0.5000i \\ -0.5000 & 0.5000 \\ 0+0.5000i & 0+0.5000i \end{matrix}$$

$$C_{9,2} = \begin{matrix} 0.5000 & 0.5000 \\ 0-0.5000i & 0+0.5000i \\ -0.5000 & -0.5000 \\ 0-0.5000i & 0-0.5000i \end{matrix}$$

$$C_{10,2} = \begin{matrix} 0.5000 & 0.5000 \\ 0-0.5000i & 0-0.5000i \\ 0.5000 & -0.5000 \\ 0-0.5000i & 0+0.5000i \end{matrix}$$

$$C_{11,2} = \begin{matrix} 0.5000 & 0.5000 \\ 0+0.5000i & 0.5000 \\ -0.5000 & 0.5000 \\ 0-0.5000i & 0.5000 \end{matrix}$$

$$C_{12,2} = \begin{matrix} 0.5000 & 0.5000 \\ 0-0.5000i & 0.5000 \\ -0.5000 & 0.5000 \\ 0+0.5000i & 0.5000 \end{matrix}$$

$$C_{13,2} = \begin{matrix} 0.5000 & 0.5000 \\ 0.5000 & 0+0.5000i \\ -0.5000 & 0.5000 \\ -0.5000 & 0+0.5000i \end{matrix}$$

$$C_{14,2} = \begin{matrix} 0.5000 & 0.5000 \\ -0.5000 & 0+0.5000i \\ -0.5000 & 0.5000 \\ 0.5000 & 0+0.5000i \end{matrix}$$

$$C_{15,2} = \begin{matrix} 0.5000 & 0.5000 \\ 0.5000 & -0.5000 \\ 0.5000 & 0.5000 \\ -0.5000 & 0.5000 \end{matrix}$$

$$C_{16,2} = \begin{matrix} 0.5000 & 0.5000 \\ -0.3536+0.3536i & 0.3536-0.3536i \\ 0-0.5000i & 0-0.5000i \\ 0.3536+0.3536i & -0.3536-0.3536i \end{matrix}$$

$$C_{1,3} = \begin{matrix} 0.5000 & 0.5000 & 0.5000 \\ 0.5000 & -0.5000 & 0.5000 \\ 0.5000 & 0.5000 & -0.5000 \\ 0.5000 & -0.5000 & -0.5000 \end{matrix}$$

$$C_{2,3} = \begin{matrix} 0.5000 & 0.5000 & 0.5000 \\ 0.5000 & -0.5000 & -0.5000 \\ 0.5000 & 0.5000 & -0.5000 \\ 0.5000 & -0.5000 & 0.5000 \end{matrix}$$

$$C_{3,3} = \begin{matrix} 0.5000 & 0.5000 & 0.5000 \\ 0.5000 & 0.5000 & -0.5000 \\ 0.5000 & -0.5000 & -0.5000 \\ 0.5000 & -0.5000 & 0.5000 \end{matrix}$$

$$C_{4,3} = \begin{matrix} 0.5000 & 0.5000 & 0.5000 \\ -0.5000 & 0.5000 & -0.5000 \\ 0.5000 & -0.5000 & -0.5000 \\ -0.5000 & -0.5000 & 0.5000 \end{matrix}$$

$$C_{5,3} = \begin{matrix} 0.5000 & 0.5000 & 0.5000 \\ 0+.05000i & 0-0.5000i & 0+0.5000i \\ 0.5000 & 0.5000 & -0.5000 \\ 0+0.5000i & 0-0.5000i & 0-0.5000i \end{matrix}$$

$$C_{6,3} = \begin{matrix} 0.5000 & 0.5000 & 0.5000 \\ 0+0.5000i & 0-0.5000i & 0-0.5000i \\ 0.5000 & 0.5000 & -0.5000 \\ 0+0.5000i & 0-0.5000i & 0+0.5000i \end{matrix}$$

$$C_{7,3} = \begin{matrix} 0.5000 & 0.5000 & 0.5000 \\ 0+0.5000i & 0+0.5000i & 0-0.5000i \\ 0.5000 & -0.5000 & -0.5000 \\ 0+0.5000i & 0-0.5000i & 0+0.5000i \end{matrix}$$

$$C_{8,3} = \begin{matrix} 0.5000 & 0.5000 & 0.5000 \\ 0-0.5000i & 0+0.5000i & 0-0.5000i \\ 0.5000 & -0.5000 & -0.5000 \\ 0-0.5000i & 0-0.5000i & 0+0.5000i \end{matrix}$$

$$C_{9,3} = \begin{matrix} 0.5000 & 0.5000 & 0.5000 \\ 0.5000 & -0.5000 & 0+0.5000i \\ 0.5000 & 0.5000 & -0.5000 \\ 0.5000 & -0.5000 & 0-0.5000i \end{matrix}$$

$$C_{10,3} = \begin{matrix} 0.5000 & 0.5000 & 0.5000 \\ 0.5000 & 0+0.5000i & 0-0.5000i \\ 0.5000 & -0.5000 & -0.5000 \\ 0.5000 & 0-0.5000i & 0+0.5000i \end{matrix}$$

$$C_{11,3} = \begin{matrix} 0.5000 & 0.5000 & 0.5000 \\ 0+0.5000i & 0-0.5000i & 0.5000 \\ 0.5000 & 0.5000 & -0.5000 \\ 0+0.5000i & 0-0.5000i & -0.5000 \end{matrix}$$

$$C_{12,3} = \begin{matrix} 0.5000 & 0.5000 & 0.5000 \\ 0+0.5000i & 0.5000 & -0.5000 \\ 0.5000 & -0.5000 & -0.5000 \\ 0+0.5000i & -0.5000 & 0.5000 \end{matrix}$$

$$C_{13,3} = \begin{matrix} 0.5000 & 0.5000 & 0.5000 \\ 0.5000 & 0+0.5000i & -0.5000 \\ 0.5000 & -0.5000 & 0.5000 \\ -0.5000 & 0+0.5000i & 0.5000 \end{matrix}$$

$$C_{1,4} = \begin{matrix} 0.5000 & 0.5000 & 0.5000 & 0.5000 \\ 0.5000 & -0.5000 & 0.5000 & -0.5000 \\ 0.5000 & 0.5000 & -0.5000 & -0.5000 \\ 0.5000 & -0.5000 & -0.5000 & 0.5000 \end{matrix}$$

$$C_{2,4} = \begin{matrix} 0.5000 & 0.5000 & 0.5000 & 0.5000 \\ 0+0.5000i & 0-0.5000i & 0+0.5000i & 0-0.5000i \\ 0.5000 & 0.5000 & -0.5000 & -0.5000 \\ 0+0.5000i & 0-0.5000i & 0-0.5000i & 0+0.5000i \end{matrix}$$

$$C_{3,4} = \begin{matrix} 0.5000 & 0.5000 & 0.5000 & 0.5000 \\ 0.5000 & -0.5000 & 0+0.5000i & 0-0.5000i \\ 0.5000 & 0.5000 & -0.5000 & -0.5000 \\ 0.5000 & -0.5000 & 0-0.5000i & 0+0.5000i \end{matrix}$$

$$C_{4,4} = \begin{matrix} 0.5000 & 0.5000 & 0.5000 & 0.5000 \\ 0+0.5000i & 0-0.5000i & 0.5000 & -0.5000 \\ 0.5000 & 0.5000 & -0.5000 & -0.5000 \\ 0+0.5000i & 0-0.5000i & -0.5000i & 0.5000 \end{matrix}$$

$$C_{5,4} = \begin{matrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000i & 0-0.5000i \end{matrix}$$

$$C_{6,4} = \begin{matrix} 0.5000 & 0.5000 & 0.5000 & 0.5000 \\ 0.3536+0.3536i & -0.3536+0.3536i & -0.3536-0.3536i & 0.3536-0.3536i \\ 0+0.5000i & 0-0.5000i & 0+0.5000i & 0-0.5000i \\ -0.3536+0.3536i & 0.3536+0.3536i & 0.3536-0.3536i & -0.3536-0.3536i \end{matrix}$$

-continued $$C_{14,3} = \begin{matrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{matrix}$$

$$C_{15,3} = \begin{matrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536-0.3536i \end{matrix}$$

$$C_{16,3} = \begin{matrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ 0.3536+0.3536i & 0.3536-0.3536i & -0.3536-0.3536i \end{matrix}$$

6-2) Codebook used in a downlink of a multi-user MIMO communication system performing unitary precoding where a number of physical antennas of a base station is four:

For example, the codebook used in the downlink of the multi-user MIMO communication system according to the fourth example may be designed by appropriately combining subsets of two matrices $W_3$ and $W_6$ as follows:

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & j & -j \\ 1 & 1 & -1 & -1 \\ 1 & -1 & -j & j \end{bmatrix}$$

-continued $$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

For example, where the number of physical antennas of the base station is four, the matrices or the codewords included in the codebook used in the downlink of the multi-user MIMO communication system according to the fourth example may be given by the following Table 13:

| Transmit Codebook Index | codeword used at the mobile station for quantization |
|---|---|
| 1 | $M_1 = W3(;,1)$ |
| 2 | $M_2 = W3(;,2)$ |
| 3 | $M_3 = W3(;,3)$ |
| 4 | $M_4 = W3(;,4)$ |
| 5 | $M_5 = W6(;,1)$ |
| 6 | $M_6 = W6(;,2)$ |
| 7 | $M_7 = W6(;,3)$ |
| 8 | $M_8 = W6(;,4)$ |

The codewords included in the above Table 13 may be expressed as follows:

$$M_1 = \begin{matrix} 0.5000 \\ 0.5000 \\ 0.5000 \\ 0.5000 \end{matrix}$$

$$M_2 = \begin{matrix} 0.5000 \\ -0.5000 \\ 0.5000 \\ -0.5000 \end{matrix}$$

$$M_3 = \begin{matrix} 0.5000 \\ 0 + 0.5000i \\ -0.5000 \\ 0 - 0.5000i \end{matrix}$$

$$M_4 = \begin{matrix} 0.5000 \\ 0 - 0.5000i \\ -0.5000 \\ 0 + 0.5000i \end{matrix}$$

$$M_5 = \begin{matrix} 0.5000 \\ 0.3536 + 0.3536i \\ 0 + 0.5000i \\ -0.3536 + 0.3536i \end{matrix}$$

$$M_6 = \begin{matrix} 0.5000 \\ -0.3536 + 0.3536i \\ 0 - 0.5000i \\ 0.3536 + 0.3536i \end{matrix}$$

$$M_7 = \begin{matrix} 0.5000 \\ -0.3536 - 0.3536i \\ 0 + 0.5000i \\ 0.3536 - 0.3536i \end{matrix}$$

$$M_8 = \begin{matrix} 0.5000 \\ 0.3536 - 0.3536i \\ 0 - 0.5000i \\ -0.3536 - 0.3536i \end{matrix}$$

6-3) Codebook used in a downlink of a multi-user MIMO communication system performing non-unitary precoding where a number of physical antennas of a base station is four:

For example, where the number of physical antennas of the base station is four, the codewords included in the codebook used in the downlink of the multi-user MIMO communication system performing non-unitary precoding may be given by the following Table 14:

| Transmit Codebook Index | Transmission Rank 1 |
|---|---|
| 1 | $C_{1,1} = W1(;,2)$ |
| 2 | $C_{2,1} = W1(;,3)$ |
| 3 | $C_{3,1} = W1(;,4)$ |
| 4 | $C_{4,1} = W2(;,2)$ |
| 5 | $C_{5,1} = W2(;,3)$ |
| 6 | $C_{6,1} = W2(;,4)$ |
| 7 | $C_{7,1} = W3(;,1)$ |
| 8 | $C_{8,1} = W4(;,1)$ |
| 9 | $C_{9,1} = W5(;,1)$ |
| 10 | $C_{10,1} = W5(;,2)$ |
| 11 | $C_{11,1} = W5(;,3)$ |
| 12 | $C_{12,1} = W5(;,4)$ |
| 13 | $C_{13,1} = W6(;,1)$ |
| 14 | $C_{14,1} = W6(;,2)$ |
| 15 | $C_{15,1} = W6(;,3)$ |
| 16 | $C_{16,1} = W6(;,4)$ |

The codewords included in the above Table may be expressed as follows:

$$C_{1,1} = \begin{matrix} 0.5000 \\ -0.5000 \\ 0.5000 \\ -0.5000 \end{matrix}$$

$$C_{2,1} = \begin{matrix} 0.5000 \\ 0.5000 \\ -0.5000 \\ -0.5000 \end{matrix}$$

$$C_{3,1} = \begin{matrix} 0.5000 \\ -0.5000 \\ -0.5000 \\ 0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} 0.5000 \\ 0 + 0.5000i \\ -0.5000 \\ 0 - 0.5000i \end{matrix}$$

$$C_{6,1} = \begin{matrix} 0.5000 \\ 0 - 0.5000i \\ -0.5000 \\ 0 + 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 0.3536 + 0.3536i \\ 0 + 0.5000i \\ -0.3536 + 0.3536i \end{matrix}$$

$$C_{14,1} = \begin{matrix} 0.5000 \\ -0.3536 + 0.3536i \\ 0 - 0.5000i \\ 0.3536 + 0.3536i \end{matrix}$$

$$C_{15,1} = \begin{matrix} 0.5000 \\ -0.3536 - 0.3536i \\ 0 + 0.5000i \\ 0.3536 - 0.3536i \end{matrix}$$

-continued $$C_{16,1} = \begin{matrix} 0.5000 \\ 0.3536 - 0.3536i \\ 0 - 0.5000i \\ -0.3536 - 0.3536i \end{matrix}$$

Various examples of codewords according to a transmission rank and a number of antennas in a downlink of a single user MIMO communication system and a multi-user MIMO communication system have been described above. The aforementioned codewords may be modified using various types of schemes or shapes, and thus are not limited to the aforementioned examples. For example, based on the disclosures and teachings provided herein, one skilled in the art may obtain the substantially same codebook by changing phases of columns of the aforementioned codewords, for example, by multiplying a complex exponential and the columns of the codewords. As another example, one skilled in the art may multiply '−1' and the columns of the codewords.

However, a performance or properties of the codebook may not change by changing the phases of the columns of the codewords. Accordingly, it is understood that a codebook generated by changing the phases of the columns of the codewords is the same or equivalent as a codebook including the original codewords prior to the changing of the phases. Also, it is understood that a codebook generated by swapping columns of the original codewords of a codebook is the same or equivalent as the codebook including the original codewords prior to the swapping. Specific values that are included in the codebook generated by changing the phases of the columns of the original codewords, or in the codebook generated by swapping the columns of the original codewords will be omitted herein for conciseness.

Where the number of antennas of the base station is four, the aforementioned codebooks assume that a MIMO communication system generally uses a 4-bit codebook. However, embodiments are not limited thereto. For example, where a 6-bit codebook includes codewords that are the same as or substantially same as aforementioned codewords included in the 4-bit codebook, it is understood that the 6-bit codebook may be equivalent to exemplary codebooks described above.

7) Codebook used in a downlink of a single user MIMO communication system where a number of physical antennas of a base station is eight:

For example, where the number of physical antennas of the base station is eight, the codebook used in the downlink of the single user MIMO communication system may be designed as given by the following Equation 9:

$$W_0 = \frac{1}{\sqrt{8}} \begin{bmatrix} 1 & 1 & 1 & 1 & 1 & 1 & 1 & 1 \\ 1 & e^{j\pi/4} & e^{j\pi/2} & e^{j3\pi/4} & e^{j\pi} & e^{j5\pi/4} & e^{j3\pi/2} & e^{j7\pi/4} \\ 1 & e^{j\pi/2} & e^{j\pi} & e^{j3\pi/2} & 1 & e^{j\pi/2} & e^{j\pi} & e^{j3\pi/2} \\ 1 & e^{j3\pi/4} & e^{j3\pi/2} & e^{j\pi/4} & e^{j\pi} & e^{j7\pi/4} & e^{j\pi/2} & e^{j5\pi/4} \\ 1 & e^{j\pi} & 1 & e^{j\pi} & 1 & e^{j\pi} & 1 & e^{j\pi} \\ 1 & e^{j5\pi/4} & e^{j\pi/2} & e^{j7\pi/4} & e^{j\pi} & e^{j\pi/4} & e^{j3\pi/2} & e^{j3\pi/4} \\ 1 & e^{j6\pi/4} & e^{j\pi} & e^{j\pi/2} & 1 & e^{j3\pi/2} & e^{j\pi} & e^{j\pi/2} \\ 1 & e^{j7\pi/4} & e^{j3\pi/2} & e^{j5\pi/4} & e^{j\pi} & e^{j3\pi/4} & e^{j\pi/2} & e^{j\pi/4} \end{bmatrix} \quad (9)$$

Matrices included in the codebook for the single user MIMO communication system may be determined as given by the following Table 15:

| Transmit Codebook Index | Transmission Rank 1 | Transmission Rank 2 | Transmission Rank 3 | Transmission Rank 4 |
|---|---|---|---|---|
| 1 | C1, 1 = W0(;, 1) | C1, 2 = W0(;, 1 2) | C1, 3 = W0(;, 1 2 3) | C1, 4 = W0(;, 1 2 3 4) |
| 2 | C2, 1 = W0(;, 2) | C2, 2 = W0(;, 3 4) | C2, 3 = W0(;, 3 4 5) | C2, 4 = W0(;, 3 4 5 6) |
| 3 | C3, 1 = W0(;, 3) | C3, 2 = W0(;, 5 6) | C3, 3 = W0(;, 5 6 7) | C3, 4 = W0(;, 5 6 7 8) |
| 4 | C4, 1 = W0(;, 4) | C4, 2 = W0(;, 7 8) | C4, 3 = W0(;, 7 8 1) | C4, 4 = W0(;, 7 8 1 2) |
| 5 | C5, 1 = W0(;, 5) | C5, 2 = W0(;, 1 3) | C5, 3 = W0(;, 1 3 5) | C5, 4 = W0(;, 1 3 5 7) |
| 6 | C6, 1 = W0(;, 6) | C6, 2 = W0(;, 2 4) | C6, 3 = W0(;, 2 4 6) | C6, 4 = W0(;, 2 4 6 8) |
| 7 | C7, 1 = W0(;, 7) | C7, 2 = W0(;, 5 7) | C7, 3 = W0(;, 5 7 1) | C7, 4 = W0(;, 5 7 1 4) |
| 8 | C8, 1 = W0(;, 8) | C8, 2 = W0(;, 6 8) | C8, 3 = W0(;, 6 8 2) | C8, 4 = W0(;, 6 8 2 3) |

Referring to the above Table 15, where the transmission rank is 4, the precoding matrix may be generated based on any one of $W_0(:,1\ 2\ 3\ 4)$, $W_0(:,3\ 4\ 5\ 6)$, $W_0(:,5\ 6\ 7\ 8)$, $W_0(:,7\ 8\ 1\ 2)$, $W_0(:,1\ 3\ 5\ 7)$, $W_0(:,2\ 4\ 6\ 8)$, $W_0(:,5\ 7\ 1\ 4)$, and $W_0(:,6\ 8\ 2\ 3)$. Here, $W_k(:,n\ m\ o\ p)$ denotes a matrix that includes an $n^{th}$ column vector, an $m^{th}$ column vector, an $o^{th}$ column vector, and a $p^{th}$ column vector of $W_k$.

Where the transmission rank is 3, the precoding matrix may be generated based on any one of $W_0(:,1\ 2\ 3)$, $W_0(:,3\ 4\ 5)$, $W_0(:,5\ 6\ 7)$, $W_0(:,7\ 8\ 1)$, $W_0(:,1\ 3\ 5)$, $W_0(:,2\ 4\ 6)$, $W_0(:,5\ 7\ 1)$, and $W_0(:,6\ 8\ 2)$. Here, $W_k(:,n\ m\ o)$ denotes a matrix that includes the $n^{th}$ column vector, the $m^{th}$ column vector, and the $o^{th}$ column vector of $W_k$.

Where the transmission rank is 2, the precoding matrix may be generated based on any one of $W_0(:,1\ 2)$, $W_0(:,3\ 4)$, $W_0(:,5\ 6)$, $W_0(:,7\ 8)$, $W_0(:,1\ 3)$, $W_0(:,2\ 4)$, $W_0(:,5\ 7)$, and $W_0(:,6\ 8)$. Here, $W_k(:,n\ m)$ denotes a matrix that includes the $n^{th}$ column vector and the $m^{th}$ column vector of $W_k$.

Where the transmission rank is 1, the precoding matrix may be generated based on any one of $W_0(:,1)$, $W_0(:,2)$, $W_0(:,3)$, $W_0(:,4)$, $W_0(:,5)$, $W_0(:,6)$, $W_0(:,7)$, and $W_0(:,8)$. Here, $W_k(:,n)$ denotes the $n^{th}$ column vector of $W_k$.

Updated Codebook

A MIMO communication system according to an exemplary embodiment may update a codebook according to a time correlation coefficient (p) of a channel that is formed between at least one user and a base station.

In an environment where a channel varies over time, it may be inappropriate to use a fixed codebook. The MIMO communication system may detect the change in the channel to thereby adaptively update the codebook.

Generally, the channel may be modeled as given by the following Equation 10:

$$H_\tau = \rho \cdot H_{\tau-1} + \Delta \quad (10),$$

where $H_\tau$ denotes a channel vector or a channel matrix in a $\tau^{th}$ time instance, $\rho$ denotes the time correlation coefficient greater than 0 and less than 1, and $\Delta$ denotes complex noise, and has a normal distribution where the average of $\Delta$ is zero and the variance of $\Delta$ is $1-\rho$.

In a MIMO communication system according to an exemplary embodiment, a terminal may calculate the time correlation coefficient ($\rho$) according to the above Equation 10. The terminal may feed back the calculated time correlation coefficient ($\rho$) to the base station. The base station may adaptively update the codebook based on the fed back time correlation coefficient ($\rho$).

Here, it is assumed that the codebook before the codebook is updated is $\{\Theta\} = \{\Theta_1, \ldots, \Theta_{2^B}\}$ and the updated codebook is $\{\tilde{\Theta}\} = \{\tilde{\Theta}_1, \ldots, \tilde{\Theta}_{2^B}\}$. $\tilde{\Theta}_i$ denotes an $i^{th}$ element of the updated codebook and B denotes a number of feedback bits.

Where a precoding matrix used in a $(\tau-1)^{th}$ time instance is $F_{\tau-1}$, the base station according to an aspect may calculate a new precoding matrix $F_\tau$ using $\tilde{\Theta}_i$. $\tilde{\Theta}_i$ is an element of the updated codebook. $F_0$ corresponding to an initial value of $F_\tau$ may be the aforementioned precoding matrix with respect to two, four, and eight transmit antennas. Specifically, $F_\tau$ may be represented using the previous precoding matrix $F_{\tau-1}$ and the element $\tilde{\Theta}_i$ of the updated codebook, as given by the following Equation 11:

$$F_\tau = \tilde{\Theta}_i F_{\tau-1} \quad (11).$$

In a multi-user MIMO communication system, $F_\tau$ may be a precoding matrix for a single user. Accordingly, $F_\tau$ may be different for each user. The base station may generate the precoding matrix by scheduling active terminals to transmit data and by combining $F_\tau$ corresponding to each user.

1) Design of $\{\Theta\} = \{\Theta_1, \ldots, \Theta_{2^B}\}$:

For example, elements or codewords of $\{\Theta\} = \{\Theta_1, \ldots, \Theta_{2^B}\}$ have the dimension of $N_t \times N_t$. Each of the elements may be a unitary matrix. $\{\Theta\} = \{\Theta_1, \ldots, \Theta_{2^B}\}$ may be equally spaced.

Design schemes of $\{\Theta\} = \{\Theta_1, \ldots, \Theta_{2^B}\}$ may vary, however two exemplary schemes will be described here.

(1) Full unitary matrices $\{\Theta\} = \{\Theta_1, \ldots, \Theta_{2^B}\}$ including full unitary matrices may be proposed according to the following Equation 12:

$$\Theta_l = \Phi^l D,$$

$$l = 1, \ldots, 2^B \quad (12)$$

$$\Phi = \begin{bmatrix} e^{j2\pi\phi_1/2^B} & 0 & \cdots & 0 \\ 0 & e^{j2\pi\phi_2/2^B} & \cdots & 0 \\ \vdots & \vdots & \ddots & 0 \\ 0 & 0 & 0 & e^{j2\pi\phi_{N_t}/2^B} \end{bmatrix}$$

$$\phi_i \in \{1, 2, \ldots, 2^B\},$$

where D denotes a DFT matrix with the dimension of $N_t \times N_t$.

For example, where $N_t = 4$, $[\phi_1, \phi_2, \phi_3, \phi_4]$ with respect to the number of feedback bits B may be determined as given by the following Table 16:

| B | $[\phi_1, \phi_2, \phi_3, \phi_4]$ |
|---|---|
| B = 2 | [1, 2, 3, 4] |
| B = 3 | [2, 4, 5, 6] |
| B = 4 | [1, 3, 4, 8] |
| B = 5 | [11, 18, 22, 23] |

For example, where B=3 and $N_t=2$, $\{\Theta\} = \{\Theta_1, \ldots, \Theta_{2^B}\}$ may be given by the following Table 17:

$\Theta_1$ $\begin{bmatrix} -0.0136+0.6753i & 0.7368-0.0288i \\ -0.7276+0.1198i & -0.1489-0.6588i \end{bmatrix}$ $\Theta_2$ $\begin{bmatrix} -0.6021+0.6871i & 0.0081+0.4065i \\ -0.0729+0.4000i & -0.4847-0.7744i \end{bmatrix}$ $\Theta_3$ $\begin{bmatrix} -0.0877-0.9095i & 0.3790+0.1464i \\ -0.3929-0.1035i & -0.6041+0.6856i \end{bmatrix}$ $\Theta_4$ $\begin{bmatrix} -0.7424+0.3706i & 0.2022-0.5202i \\ 0.3856-0.4035i & 0.0213-0.8295i \end{bmatrix}$ $\Theta_5$ $\begin{bmatrix} -0.2839+0.0675i & -0.7744+0.5614i \\ 0.6104+0.7363i & -0.2582-0.1359i \end{bmatrix}$ $\Theta_6$ $\begin{bmatrix} -0.4786+0.1916i & 0.8547+0.0614i \\ -0.0827+0.8529i & -0.2692+0.4397i \end{bmatrix}$ $\Theta_7$ $\begin{bmatrix} -0.1309-0.8846i & -0.4081-0.1838i \\ 0.1516+0.4211i & -0.8718-0.1992i \end{bmatrix}$ $\Theta_8$ $\begin{bmatrix} -0.0707+0.9650i & -0.0601-0.2455i \\ -0.1422+0.2090i & -0.2711+0.9288i \end{bmatrix}$ (2) Diagonal unitary matrices $\{\theta\}=\{\Theta_1, \ldots, \Theta_{2^B}\}$ including diagonal unitary matrices may be proposed according to the following Equation 13:

$$\Theta_l = \Phi^l, l=1, \ldots, 2^B$$

$$\Phi = \text{diag}[e^{j2\pi\phi_1/2^B} e^{j2\pi\phi_2/2^B} \ldots e^{j\phi N_t/2^B}]$$

$$\phi_i \in \{1, 2, 3, \ldots, 2^B\} \tag{13}$$

Referring to the above Equation 13, $\{\theta\}=\{\Theta_1, \ldots, \Theta_{2^B}\}$ may be designed using diagonal matrices. For example, where $N_t=4$, $[\phi_1, \phi_2, \phi_3, \phi_4]$ with respect to the number of feedback bits B may be determined as given by the following Table 18:

| B | $[\phi_1, \phi_2, \phi_3, \phi_4]$ |
|---|---|
| B = 2 | [1, 2, 3, 4] |
| B = 3 | [2, 4, 5, 6] |
| B = 4 | [1, 3, 4, 8] |
| B = 5 | [11, 18, 22, 23] |

2) Calculation of $\{\tilde{\theta}\}=\{\tilde{\Theta}_1, \ldots, \tilde{\Theta}_{2^B}\}$:

In a MIMO communication system according to an exemplary embodiment, a base station or user terminals may update $\{\theta\}=\{\Theta_1, \ldots, \Theta_{2^B}\}$ according to a time correlation coefficient ($\rho$) of a channel to thereby generate a new codebook $\{\tilde{\theta}\}=\{\tilde{\Theta}_1, \ldots, \tilde{\Theta}_{2^B}\}$.

With respect to i=1, 2, 3 ... $2^B$, $\Psi_i(\rho,\Theta_i)=\rho I+\sqrt{1-\rho^2}\Theta_i$ may be calculated. In this instance, the updated codebook may be provided using various types of schemes. Hereinafter, two exemplary schemes will be described. Here, I denotes an identity matrix.

(1) First Scheme:

In the first scheme, the updated codebook $\{\tilde{\theta}\}=\{\tilde{\Theta}_1, \ldots, \tilde{\Theta}_{2^B}\}$ according to an exemplary embodiment may be calculated using the following Equation 14:

$$\tilde{\Theta}_i = \underset{\tilde{\Theta}_i}{\text{argmin}} \|\Psi_i(\rho, \Theta_i) - \tilde{\Theta}_i\|_F. \tag{14}$$

In the above Equation 14, $\|x\|_F$ denotes a Frobenious norm of x.

Here, it is assumed that where a singular value decomposition (SVD) is performed for $\Psi_i(\rho,\Theta_i)=\rho I+\sqrt{1-\rho^2}\Theta_i$, $\Psi_i(\rho,\Theta_i)=\Phi_i\Lambda_i B_i^*$. In this instance, a solution of the above Equation 14 may be calculated using the following Equation 15:

$$\tilde{\Theta}_i = \Phi_i B_i^* \tag{15}$$

In the first scheme, the updated codebook $\{\theta\}=\{\Theta_1, \ldots, \Theta_{2^B}\}$ may be calculated according to the above Equation 14 or the above equation 15.

(2) Second Scheme:

In the second scheme, the updated codebook $\{\tilde{\theta}\}=\{\tilde{\Theta}_1, \ldots, \tilde{\Theta}_{2^B}\}$ according to an exemplary embodiment may be calculated using the following Equation 16:

$$\tilde{\Theta}_i = [\Psi_i(\rho,\Theta_i)^* \Psi_i(\rho,\Theta_i)]^{-1/2} \Psi_i(\rho,\Theta_i) \tag{16}$$

The updated codebook $\{\tilde{\theta}\}=\{\tilde{\Theta}_1, \ldots, \tilde{\Theta}_{2^B}\}$ calculated according to the first scheme or the second scheme may be dynamically calculated based on the time correlation coefficient.

The time correlation coefficient may be quantized. Updated codebooks corresponding to the quantized values may be stored in a memory. In this instance, the updated codebooks may have no need to be dynamically calculated. Specifically, where the terminal feeds back the time correlation coefficient to the base station, the base station may select any one codebook from a plurality of updated codebooks that are stored in the memory.

Various Examples of the Updated Codebook $\{\tilde{\theta}\}=\{\tilde{\Theta}_1, \ldots, \tilde{\Theta}_{2^B}\}$ As described above, the updated codebook $\{\tilde{\theta}\}=\{\tilde{\Theta}_1, \ldots, \tilde{\Theta}_{2^B}\}$ may be calculated differently according to various parameters. Hereinafter, an example of $\{\theta\}=\{\Theta_1, \ldots, \Theta_{2^B}\}$ depending on the number of feedback bits, $\{\theta\}=\{\Theta_1, \ldots, \Theta_{2^B}\}$, or design schemes will be described.

1) Where $N_t=4$, the number of feedback bits B=4, $\{\theta\}=\{\Theta_1, \ldots, \Theta_{2^B}\}$ includes full unitary matrices, and the first scheme, that is, the above Equation 14 or the above Equation 15 is used, examples of the codebook that $\{\tilde{\theta}\}=\{\tilde{\Theta}_1, \ldots, \tilde{\Theta}_{2^B}\}$ is updated according to the time correlation coefficient may follow as:

(1) Time correlation coefficient=0

$$\tilde{\Theta}_1 = \begin{bmatrix} 0.4619+0.1913i & 0.4619+0.1913i & 0.4619+0.1913i & 0.4619+0.1913i \\ 0.1913+0.4619i & -0.4619+0.1913i & -0.1913-0.4619i & 0.4619-0.1913i \\ 0.0000+0.5000i & -0.0000-0.5000i & 0.0000+0.5000i & -0.0000-0.5000i \\ -0.5000+0.0000i & 0.0000+0.5000i & 0.5000-0.0000i & -0.0000-0.5000i \end{bmatrix}$$

$$\tilde{\Theta}_2 = \begin{matrix} 0.3536+0.3536i & 0.3536+0.3536i & 0.3536+0.3536i & 0.3536+0.3536i \\ -0.3536+0.3536i & -0.3536-0.3536i & 0.3536-0.3536i & 0.3536+0.3536i \\ -0.5000+0.000i & 0.5000-0.0000i & -0.5000+0.0000i & 0.5000-0.0000i \\ 0.5000-0.0000i & -0.0000-0.5000i & -0.5000+0.0000i & 0.0000+0.5000i \end{matrix}$$

$$\tilde{\Theta}_3 = \begin{matrix} 0.1913+0.4619i & 0.1913+0.4619i & 0.1913+0.4619i & 0.1913+0.4619i \\ -0.4619-0.1913i & 0.1913-0.4619i & 0.4619+0.1913i & -0.1913+0.4619i \\ -0.0000-0.5000i & 0.0000+0.5000i & -0.0000-0.5000i & 0.0000+0.5000i \\ -0.5000+0.0000i & 0.0000+0.5000i & 0.5000-0.0000i & -0.0000-0.5000i \end{matrix}$$

$$\tilde{\Theta}_4 = \begin{matrix} -0.0000+0.5000i & -0.0000+0.5000i & -0.0000+0.5000i & -0.0000+0.5000i \\ -0.0000-0.5000i & 0.5000-0.0000i & 0.0000+0.5000i & -0.5000+0.0000i \\ 0.5000-0.0000i & -0.5000+0.0000i & 0.5000-0.0000i & -0.5000+0.0000i \\ 0.5000-0.0000i & -0.0000-0.5000i & -0.5000+0.0000i & 0.0000+0.5000i \end{matrix}$$

$$\tilde{\Theta}_5 = \begin{matrix} -0.1913+0.4619i & -0.1913+0.4619i & -0.1913+0.4619i & -0.1913+0.4619i \\ 0.4619-0.1913i & 0.1913+0.4619i & -0.4619+0.1913i & -0.1913-0.4619i \\ 0.0000+0.5000i & -0.0000-0.5000i & 0.0000+0.5000i & -0.0000-0.5000i \\ -0.5000+0.0000i & 0.0000+0.5000i & 0.5000-0.0000i & -0.0000-0.5000i \end{matrix}$$

$$\tilde{\Theta}_6 = \begin{matrix} -0.3536+0.3536i & -0.3536+0.3536i & -0.3536+0.3536i & -0.3536+0.3536i \\ 0.3536+0.3536i & -0.3536+0.3536i & -0.3536-0.3536i & 0.3536-0.3536i \\ -0.5000+0.0000i & 0.5000-0.0000i & -0.5000+0.000i & 0.5000-0.0000i \\ 0.5000-0.0000i & -0.0000-0.5000i & -0.5000+0.0000i & 0.0000+0.5000i \end{matrix}$$

$$\tilde{\Theta}_7 = \begin{matrix} -0.4619+0.1913i & -0.4619+0.1913i & -0.4619+0.1913i & -0.4619+0.1913i \\ -0.1913+0.4619i & -0.4619-0.1913i & 0.1913-0.4619i & 0.4619+0.1913i \\ -0.0000-0.5000i & 0.0000+0.5000i & -0.0000-0.5000i & 0.0000+0.5000i \\ -0.5000+0.0000i & 0.0000+0.5000i & 0.5000-0.0000i & -0.0000-0.5000i \end{matrix}$$

$$\tilde{\Theta}_8 = \begin{matrix} -0.5000-0.0000i & -0.5000-0.0000i & -0.5000-0.0000i & -0.5000-0.0000i \\ -0.5000+0.0000i & -0.0000-0.5000i & 0.5000-0.0000i & 0.0000+0.5000i \\ 0.5000-0.0000i & -0.5000+0.0000i & 0.5000-0.0000i & -0.5000+0.0000i \\ 0.5000-0.0000i & -0.0000-0.5000i & -0.5000+0.0000i & 0.0000+0.5000i \end{matrix}$$

$$\tilde{\Theta}_9 = \begin{matrix} -0.4619-0.1913i & -0.4619-0.1913i & -0.4619-0.1913i & -0.4619-0.1913i \\ -0.1913-0.4619i & 0.4619-0.1913i & 0.1913+0.4619i & -0.4619+0.1913i \\ 0.0000+0.5000i & -0.0000-0.5000i & 0.0000+0.5000i & -0.0000-0.5000i \\ -0.5000+0.0000i & 0.0000+0.5000i & 0.5000-0.0000i & -0.0000-0.5000i \end{matrix}$$

$$\tilde{\Theta}_{10} = \begin{matrix} -0.3536-0.3536i & -0.3536-0.3536i & -0.3536-0.3536i & -0.3536-0.3536i \\ 0.3536-0.3536i & 0.3536+0.3536i & -0.3536+0.3536i & -0.3536-0.3536i \\ -0.5000+0.0000i & 0.5000-0.0000i & -0.5000+0.0000i & 0.5000-0.0000i \\ 0.5000-0.0000i & -0.0000-0.5000i & -0.5000+0.0000i & 0.0000+0.5000i \end{matrix}$$

$$\tilde{\Theta}_{11} = \begin{matrix} -0.1913-0.4619i & -0.1913-0.4619i & -0.1913-0.4619i & -0.1913-0.4619i \\ 0.4619+0.1913i & -0.1913+0.4619i & -0.4619-0.1913i & 0.1913-0.4619i \\ -0.0000-0.5000i & 0.0000+0.5000i & -0.0000-0.5000i & 0.0000+0.5000i \\ -0.5000+0.000i & 0.0000+0.5000i & 0.5000-0.0000i & -0.0000-0.5000i \end{matrix}$$

$$\tilde{\Theta}_{12} = \begin{matrix} 0.000-0.5000i & 0.0000-0.5000i & 0.0000-0.5000i & 0.0000-0.5000i \\ 0.0000+0.5000i & -0.5000+0.0000i & -0.0000-0.5000i & 0.5000-0.0000i \\ 0.5000-0.0000i & -0.5000+0.0000i & 0.5000-0.0000i & -0.5000+0.0000i \\ 0.5000-0.0000i & -0.0000-0.5000i & -0.5000+0.0000i & 0.0000+0.5000i \end{matrix}$$

$$\tilde{\Theta}_{13} = \begin{matrix} 0.1913 - 0.4619i & 0.1913 - 0.4619i & 0.1913 - 0.4619i & 0.1913 - 0.4619i \\ -0.4619 + 0.1913i & -0.1913 - 0.4619i & 0.4619 - 0.1913i & 0.1913 + 0.4619i \\ 0.0000 + 0.5000i & -0.0000 - 0.5000i & 0.0000 + 0.5000i & -0.0000 - 0.5000i \\ -0.5000 + 0.0000i & 0.0000 + 0.5000i & 0.5000 - 0.0000i & -0.0000 - 0.5000i \end{matrix}$$

$$\tilde{\Theta}_{14} = \begin{matrix} 0.3536 - 0.3536i & 0.3536 - 0.356i & 0.3536 - 0.3536i & 0.3536 - 0.3536i \\ -0.3536 - 0.3536i & 0.3536 - 0.3536i & 0.3536 + 0.3536i & -0.3536 + 0.3536i \\ -0.5000 + 0.0000i & 0.5000 - 0.0000i & -0.5000 + 0.0000i & 0.5000 - 0.0000i \\ 0.5000 - 0.0000i & -0.0000 - 0.5000i & -0.5000 + 0.0000i & 0.0000 + 0.5000i \end{matrix}$$

$$\tilde{\Theta}_{15} = \begin{matrix} 0.4619 - 0.1913i & 0.4619 - 0.1913i & 0.4619 - 0.1913i & 0.4619 - 0.1913i \\ 0.1913 - 0.4619i & 0.4619 + 0.1913i & -0.1913 + 0.4619i & -0.4619 - 0.1913i \\ -0.0000 - 0.5000i & 0.0000 + 0.5000i & -0.0000 - 0.5000i & 0.0000 + 0.5000i \\ -0.5000 + 0.0000i & 0.0000 + 0.5000i & 0.5000 - 0.0000i & -0.000 - 0.5000i \end{matrix}$$

$$\tilde{\Theta}_{16} = \begin{matrix} 0.5000 + 0.0000i & 0.5000 + 0.0000i & 0.5000 + 0.0000i & 0.5000 + 0.0000i \\ 0.5000 - 0.0000i & 0.0000 + 0.5000i & -0.5000 + 0.0000i & -0.0000 - 0.5000i \\ 0.5000 - 0.0000i & -0.5000 + 0.0000i & 0.5000 - 0.0000i & -0.5000 + 0.0000i \\ 0.5000 - 0.0000i & -0.0000 - 0.5000i & -0.5000 + 0.0000i & 0.0000 + 0.5000i \end{matrix}$$

(2) Time correlation coefficient=0.7

$$\tilde{\Theta}_1 = \begin{matrix} 0.8240 + 0.0189i & 0.2994 + 0.2817i & 0.2696 + 0.1981i & 0.1678 + 0.1077i \\ 0.0126 + 0.4109i & 0.4062 - 0.2560i & -0.2069 - 0.5350i & 0.5164 + 0.0693i \\ -0.0798 + 0.3249i & 0.0136 - 0.5734i & 0.6644 + 0.2768i & 0.0282 - 0.2007i \\ -0.1963 - 0.0353i & -0.2616 + 0.4506i & 0.2007 + 0.0282i & 0.6376 - 0.4911i \end{matrix}$$

$$\tilde{\Theta}_2 = \begin{matrix} 0.7988 + 0.2608i & 0.2153 + 0.2412i & 0.3405 + 0.2145i & 0.1516 + 0.0666i \\ -0.2412 + 0.2153i & 0.2857 - 0.6645i & 0.5114 + 0.1398i & 0.0769 + 0.2920i \\ -0.3925 + 0.0891i & 0.2627 + 0.4605i & 0.2717 - 0.2708i & 0.6304 - 0.1112i \\ 0.1543 - 0.0601i & 0.1521 - 0.2609i & -0.6304 + 0.1112i & 0.6077 + 0.3198i \end{matrix}$$

$$\tilde{\Theta}_3 = \begin{matrix} 0.7348 + 0.4182i & 0.2456 + 0.2255i & 0.0941 + 0.1479i & 0.2562 + 0.2788i \\ -0.3331 + 0.0142i & 0.7508 - 0.2853i & 0.2798 + 0.2541i & -0.1102 + 0.2979i \\ -0.0303 - 0.1726i & -0.1277 + 0.3558i & 0.6625 - 0.4782i & -0.1775 + 0.3567i \\ -0.3557 + 0.1300i & 0.0122 + 0.3174i & 0.3567 + 0.1775i & 0.6808 - 0.3653i \end{matrix}$$

$$\tilde{\Theta}_4 = \begin{matrix} 0.5441 + 0.0085i & -0.2136 + 0.2732i & -0.1350 + 0.4619i & -0.1789 + 0.5657i \\ 0.2136 - 0.2732i & 0.7635 - 0.1612i & -0.1287 + 0.1506i & -0.4619 - 0.1350i \\ 0.4619 + 0.1350i & -0.1506 - 0.1287i & 0.7635 - 0.1612i & -0.2737 - 0.2136i \\ 0.5657 + 0.1789i & 0.1350 - 0.4619i & -0.2732 - 0.2136i & 0.5441 + 0.0085i \end{matrix}$$

$$\tilde{\Theta}_5 = \begin{matrix} 0.4414 + 0.5844i & 0.1239 + 0.2899i & 0.0638 + 0.2469i & -0.0778 + 0.5415i \\ 0.1174 - 0.2926i & 0.5415 + 0.4973i & -0.1298 + 0.2643i & -0.4031 - 0.3331i \\ 0.1535 + 0.2037i & -0.1945 - 0.2210i & 0.5783 + 0.5124i & -0.0782 - 0.4951i \\ -0.5300 + 0.1353i & 0.2449 + 0.4620i & 0.4951 - 0.0782i & 0.4191 + 0.0201i \end{matrix}$$

$$\tilde{\Theta}_6 = \begin{matrix} 0.4758 + 0.5513i & -0.2076 + 0.2408i & -0.0712 + 0.5514i & -0.1783 + 0.1662i \\ 0.2408 + 0.2076i & 0.5396 + 0.4524i & -0.3868 - 0.2803i & 0.2279 - 0.3505i \\ -0.4402 + 0.3396i & 0.4717 - 0.0753i & 0.3841 + 0.4175i & 0.3750 + 0.0139i \\ 0.2436 + 0.0086i & -0.0867 - 0.4090i & -0.3750 - 0.0139i & 0.6905 + 0.3849i \end{matrix}$$

-continued $$\tilde{\Theta}_7 = \begin{matrix} 0.4042+0.4158i & -0.3971+0.5424i & -0.3672-0.0638i & -0.1717+0.2082i \\ 0.1028+0.6644i & 0.4264-0.1701i & 0.2303-0.1613i & 0.3462+0.3721i \\ 0.1995-0.3148i & -0.1510+0.2371i & 0.6448-0.5523i & -0.0875+0.2314i \\ -0.2383+0.1267i & -0.2113+0.4622i & 0.2314+0.0875i & 0.6554-0.4221i \end{matrix}$$

$$\tilde{\Theta}_8 = \begin{matrix} 0.4041-0.2684i & -0.2633-0.3293i & -0.4370+0.0141i & -0.6264+0.0574i \\ -0.2633-0.3293i & 0.6101-0.5655i & 0.2477+0.0292i & -0.1400+0.2200i \\ 0.4370-0.0141i & -0.2477-0.0292i & 0.8442+0.0116i & -0.1768+0.0493i \\ 0.6264-0.0574i & 0.1400-0.2200i & -0.1768+0.0493i & 0.6383+0.3086i \end{matrix}$$

$$\tilde{\Theta}_9 = \begin{matrix} 0.3810-0.5349i & -0.3185-0.3493i & -0.3206+0.0369i & -0.1642-0.4627i \\ 0.0218-0.4722i & 0.8072-0.1391i & 0.1984+0.1319i & -0.2124+0.0617i \\ 0.1568+0.2821i & -0.1328-0.1978i & 0.6503+0.5464i & -0.1313-0.3167i \\ -0.3288-0.3647i & -0.0242+0.2198i & 0.3167-0.1313i & 0.6245-0.4500i \end{matrix}$$

$$\tilde{\Theta}_{10} = \begin{matrix} 0.4747-0.5481i & -0.1729-0.2064i & -0.0676-0.5598i & -0.2185-0.1898i \\ 0.2064-0.1729i & 0.8108+0.1633i & -0.3141+0.2256i & -0.1773-0.2500i \\ -0.4437-0.3480i & 0.3816+0.0626i & 0.3891-0.3976i & 0.4714-0.0288i \\ 0.2887-0.0203i & 0.0514-0.3021i & -0.4714+0.0288i & 0.6901+0.3508i \end{matrix}$$

$$\tilde{\Theta}_{11} = \begin{matrix} 0.5936-0.3846i & -0.3426-0.2840i & -0.0888-0.3966i & 0.0617-0.3642i \\ 0.4431-0.0414i & 0.5668+0.5554i & -0.3627+0.0575i & 0.1153-0.1550i \\ 0.0698-0.4004i & 0.1919+0.3131i & 0.6732-0.3571i & -0.1491+0.3114i \\ -0.3128-0.1964i & -0.0472+0.1874i & 0.3114+0.1491i & 0.6509-0.5323i \end{matrix}$$

$$\tilde{\Theta}_{12} = \begin{matrix} 0.5830-0.5182i & 0.4165-0.3063i & 0.0851-0.1869i & -0.0688-0.2782i \\ -0.4165+0.3063i & 0.3110-0.4163i & 0.2059-0.48840i & 0.3694-0.2226i \\ 0.1869+0.0851i & -0.4840-0.2059i & 0.7985-0.0734i & -0.1812+0.0736i \\ 0.2782-0.0688i & -0.2226-0.3694i & -0.1812+0.0736i & 0.6517+0.5186i \end{matrix}$$

$$\tilde{\Theta}_{13} = \begin{matrix} 0.7342-0.4210i & 0.2750-0.2455i & 0.0978-0.1472i & 0.2285-0.2536i \\ -0.3680-0.0208i & 0.6070-0.3975i & 0.3063-0.2895i & 0.0993+0.3876i \\ -0.0341+0.1734i & -0.1503-0.3937i & 0.6631+0.4741i & -0.1501-0.3228i \\ -0.3218-0.1140i & -0.0566+0.3960i & 0.3228-0.1501i & 0.6838-0.3593i \end{matrix}$$

$$\tilde{\Theta}_{14} = \begin{matrix} 0.7953-0.2408i & 0.1812-0.1376i & 0.3861-0.2588i & 0.1125-0.1704i \\ -0.1376-0.1812i & 0.7724-0.3493i & 0.0589+0.3942i & -0.2518+0.0856i \\ -0.4561-0.0900i & 0.3204+0.2371i & 0.4276-0.2914i & 0.5958-0.0473i \\ 0.2000-0.0409i & 0.1176-0.2386i & -0.5958+0.0473i & 0.6547+0.3190i \end{matrix}$$

$$\tilde{\Theta}_{15} = \begin{matrix} 0.8388-0.0681i & 0.2026-0.2099i & 0.2129-0.1422i & 0.3609-0.1043i \\ -0.0052-0.2917i & 0.8336+0.1865i & -0.1005+0.3624i & -0.2077-0.0248i \\ -0.0499-0.2511i & 0.0458+0.3733i & 0.6797-0.3936i & -0.1876+0.3753i \\ -0.3734-0.0417i & 0.0565+0.2013i & 0.3753+0.1876i & 0.6730-0.4314i \end{matrix}$$

-continued $$\tilde{\Theta}_{16} = \begin{bmatrix} 0.5000+0.0000i & 0.5000-0.0000i & 0.5000-0.0000i & 0.5000-0.0000i \\ 0.5000-0.0000i & 0.3500+0.3571i & -0.5000+0.0000i & -0.3500-0.3571i \\ 0.5000-0.0000i & -0.5000+0.0000i & 0.5000+0.0000i & -0.5000+0.0000i \\ 0.5000-0.0000i & -0.3500-0.3571i & -0.5000+0.0000i & 0.3500+0.3571i \end{bmatrix}$$

(3) Time correlation coefficient=0.75

$$\tilde{\Theta}_1 = \begin{bmatrix} 0.8690+0.0214i & 0.2188+0.2754i & 0.2210+0.1977i & 0.1689+0.0650i \\ -0.0401+0.3494i & 0.6156-0.2142i & -0.1296-0.4964i & 0.4124+0.1349i \\ -0.0981+0.2799i & 0.0702-0.5082i & 0.7459+0.2616i & -0.0157-0.1546i \\ -0.1809+0.0046i & -0.2824+0.3294i & 0.1546-0.0157i & 0.7464-0.4447i \end{bmatrix}$$

$$\tilde{\Theta}_2 = \begin{bmatrix} 0.8359+0.2414i & 0.2181+0.2150i & 0.3079+0.1975i & 0.1146+0.0485i \\ -0.2150+0.2181i & 0.8518-0.4014i & -0.0143+0.1187i & 0.0719+0.0049i \\ -0.3574+0.0780i & -0.0941+0.0738i & 0.7736-0.0724i & 0.4889+0.0959i \\ 0.1153-0.0467i & -0.0474-0.0543i & -0.4889-0.0959i & 0.7826+0.3443i \end{bmatrix}$$

$$\tilde{\Theta}_3 = \begin{bmatrix} 0.7851+0.3865i & 0.2318+0.1968i & 0.0834+0.1175i & 0.2421+0.2497i \\ -0.3030+0.0247i & 0.7946-0.2645i & 0.2495+0.2409i & -0.0922+0.2782i \\ -0.0320-0.1405i & -0.1271+0.3227i & 0.7299-0.4414i & -0.1761+0.3168i \\ -0.3233+0.1282i & 0.0213+0.2923i & 0.3168+0.1761i & 0.7399-0.3380i \end{bmatrix}$$

$$\tilde{\Theta}_4 = \begin{bmatrix} 0.8392+0.0971i & -0.1312+0.0624i & -0.2104+0.2486i & -0.2774+0.2867i \\ 0.1312-0.0624i & 0.9258-0.0994i & 0.0168+0.0746i & -0.2486-0.2104i \\ 0.2486+0.2104i & -0.0746+0.0168i & 0.9258-0.0994i & -0.0624-0.1312i \\ 0.2867+0.2774i & 0.2104-0.2486i & -0.0624-0.1312i & 0.8392+0.0971i \end{bmatrix}$$

$$\tilde{\Theta}_5 = \begin{bmatrix} 0.8073+0.4105i & -0.1364+0.0270i & -0.1749+0.2852i & 0.1428+0.1674i \\ 0.1155+0.0774i & 0.9269+0.3117i & -0.0698-0.0265i & -0.1307+0.0420i \\ -0.0525+0.3304i & 0.0512-0.0543i & 0.8138+0.3954i & -0.1867-0.1703i \\ -0.1000+0.1961i & 0.1369+0.0112i & 0.1703-0.1867i & 0.9156-0.1746i \end{bmatrix}$$

$$\tilde{\Theta}_6 = \begin{bmatrix} 0.6506+0.4917i & -0.2158+0.2078i & 0.0451+0.4404i & -0.1767+0.1340i \\ 0.2078+0.2158i & 0.6392+0.4148i & -0.3692-0.2118i & 0.2015-0.3284i \\ -0.2795+0.3433i & 0.4108-0.1113i & 0.6123+0.3594i & 0.3446-0.0010i \\ 0.2197+0.0302i & -0.0897-0.3747i & -0.3446+0.0010i & 0.7463+0.3558i \end{bmatrix}$$

$$\tilde{\Theta}_7 = \begin{bmatrix} 0.5863+0.3742i & -0.3179+0.5101i & -0.3244-0.0767i & -0.1087+0.1791i \\ 0.1360+0.5855i & 0.5870-0.1596i & 0.2021-0.1067i & 0.3167+0.3408i \\ 0.1950-0.2703i & -0.1458+0.1759i & 0.7256-0.5082i & -0.0862+0.2110i \\ -0.1690+0.1238i & -0.1937+0.4230i & 0.2110+0.0862i & 0.7312-0.3912i \end{bmatrix}$$

$$\tilde{\Theta}_8 = \begin{bmatrix} 0.6000-0.2303i & -0.1410-0.2886i & -0.4007-0.0035i & -0.5686+0.0001i \\ -0.1410-0.2886i & 0.7408-0.5103i & 0.2329+0.0072i & -0.1207+0.1373i \\ 0.4007+0.0035i & -0.2329-0.0072i & 0.8746+0.0112i & -0.1337+0.0471i \\ 0.5686-0.0001i & 0.1207-0.1373i & -0.1337+0.0471i & 0.7338+0.2912i \end{bmatrix}$$

$$\tilde{\Theta}_9 = \begin{bmatrix} 0.6029-0.4728i & -0.2392-0.3363i & -0.2845+0.0504i & -0.0609-0.3942i \\ 0.0686-0.4070i & 0.8593-0.1259i & 0.1782+0.1000i & -0.1608+0.0880i \\ 0.1555+0.2435i & -0.1263-0.1606i & 0.7248+0.5036i & -0.1354-0.2783i \\ -0.2071-0.3409i & 0.0198+0.1823i & 0.2783-0.1354i & 0.7385-0.4076i \end{bmatrix}$$

$$\tilde{\Theta}_{10} = \begin{bmatrix} 0.6506 - 0.4888i & -0.1775 - 0.1796i & 0.0470 - 0.4493i & -0.2186 - 0.1485i \\ 0.1796 - 0.1775i & 0.8443 + 0.1525i & -0.2983 + 0.1797i & -0.1531 - 0.2353i \\ -0.2845 - 0.3510i & 0.3380 + 0.0838i & 0.6092 - 0.3430i & 0.4310 + 0.0001i \\ 0.2596 - 0.0496i & 0.0582 - 0.2747i & -0.4310 - 0.0001i & 0.7479 + 0.3259i \end{bmatrix}$$

$$\tilde{\Theta}_{11} = \begin{bmatrix} 0.6775 - 0.3558i & -0.3232 - 0.2420i & -0.0886 - 0.3653i & 0.0747 - 0.3231i \\ 0.3997 - 0.0574i & 0.6662 + 0.5107i & -0.3204 + 0.0728i & 0.1017 - 0.1186i \\ 0.0580 - 0.3714i & 0.1899 + 0.2681i & 0.7362 - 0.3312i & -0.1466 + 0.2785i \\ -0.2699 - 0.1927i & -0.0486 + 0.1485i & 0.2785 + 0.1466i & 0.7250 - 0.4908i \end{bmatrix}$$

$$\tilde{\Theta}_{12} = \begin{bmatrix} 0.7791 - 0.4435i & 0.3342 - 0.0845i & -0.0087 - 0.1186i & -0.0987 - 0.2315i \\ -0.3342 + 0.0845i & 0.6693 - 0.3162i & 0.2554 - 0.3374i & 0.3444 - 0.1886i \\ 0.1186 - 0.0087i & -0.3374 - 0.2554i & 0.8842 - 0.0536i & -0.1304 + 0.0715i \\ 0.2315 - 0.0987i & -0.1886 - 0.3444i & -0.1304 + 0.0715i & 0.7284 + 0.4794i \end{bmatrix}$$

$$\tilde{\Theta}_{13} = \begin{bmatrix} 0.7850 - 0.3891i & 0.2597 - 0.2125i & 0.0868 - 0.1169i & 0.2156 - 0.2283i \\ -0.3339 - 0.0334i & 0.6826 - 0.3675i & 0.2731 - 0.2737i & 0.0922 + 0.3584i \\ -0.0345 + 0.1412i & -0.1484 - 0.3571i & 0.7300 + 0.4377i & -0.1498 - 0.2870i \\ -0.2934 - 0.1119i & -0.0519 + 0.3664i & 0.2870 - 0.1498i & 0.7408 - 0.3329i \end{bmatrix}$$

$$\tilde{\Theta}_{14} = \begin{bmatrix} 0.8365 - 0.2221i & 0.1578 - 0.1409i & 0.3648 - 0.2126i & 0.0768 - 0.1482i \\ -0.1409 - 0.1578i & 0.8295 - 0.3201i & 0.0078 + 0.3392i & -0.2173 + 0.0483i \\ -0.4083 - 0.1076i & 0.2454 + 0.2344i & 0.5836 - 0.2602i & 0.5461 - 0.0121i \\ 0.1591 - 0.0504i & 0.1195 - 0.1878i & -0.5461 + 0.0121i & 0.7319 + 0.2976i \end{bmatrix}$$

$$\tilde{\Theta}_{15} = \begin{bmatrix} 0.8661 - 0.0634i & 0.1783 - 0.1981i & 0.1869 - 0.1391i & 0.3348 - 0.0924i \\ -0.0140 - 0.2661i & 0.8627 + 0.1724i & -0.0912 + 0.3357i & -0.1839 - 0.0098i \\ -0.0570 - 0.2259i & 0.0442 + 0.3451i & 0.7395 - 0.3638i & -0.1868 + 0.3326i \\ -0.3447 - 0.0427i & 0.0613 + 0.1737i & 0.3326 + 0.1868i & 0.7356 - 0.3985i \end{bmatrix}$$

$$\tilde{\Theta}_{16} = \begin{bmatrix} 1.0000 + 0.0000i & -0.0000 - 0.0000i & 0.0000 - 0.0000i & -0.0000 - 0.0000i \\ 0.0000 - 0.0000i & 0.8750 + 0.3307i & -0.0000 + 0.0000i & 0.1250 - 0.3307i \\ -0.0000 - 0.0000i & 0.0000 + 0.0000i & 1.0000 + 0.0000i & 0.0000 + 0.0000i \\ 0.0000 - 0.0000i & 0.1250 - 0.3307i & -0.0000 + 0.0000i & 0.8750 + 0.3307i \end{bmatrix}$$

(4) Time correlation coefficient=0.8

$$\tilde{\Theta}_1 = \begin{bmatrix} 0.9061 + 0.0305i & 0.1493 + 0.2433i & 0.1747 + 0.1833i & 0.1762 + 0.0374i \\ -0.0665 + 0.2776i & 0.7742 - 0.1303i & -0.0710 - 0.4276i & 0.3006 + 0.1544i \\ -.1025 + 0.2315i & 0.0980 - 0.4222i & 0.8156 + 0.2516i & -0.0559 - 0.1279i \\ -0.1771 + 0.0329i & -0.2577 + 0.2187i & 0.1279 - 0.0559i & 0.8324 - 0.3755i \end{bmatrix}$$

$$\tilde{\Theta}_2 = \begin{bmatrix} 0.8719 + 0.2173i & 0.2025 + 0.1950i & 0.2785 + 0.1658i & 0.0839 + 0.0389i \\ -0.1950 + 0.2025i & 0.9136 - 0.2637i & -0.0693 + 0.0285i & 0.1003 - 0.0342i \\ -0.3142 + 0.0797i & -0.0692 - 0.0288i & 0.8520 + 0.0152i & 0.3953 + 0.0831i \\ 0.0868 - 0.0318i & -0.0951 - 0.0467i & -0.3953 - 0.0831i & 0.8408 + 0.3317i \end{bmatrix}$$

$$\tilde{\Theta}_3 = \begin{bmatrix} 0.8347 + 0.3475i & 0.2127 + 0.1663i & 0.0722 + 0.0879i & 0.2225 + 0.2171i \\ -0.2680 + 0.0329i & 0.8381 - 0.2409i & 0.2158 + 0.2220i & -0.0742 + 0.2555i \\ -0.0331 - 0.1089i & -0.1225 + 0.2844i & 0.7956 - 0.3950i & -0.1683 + 0.2717i \\ -0.2857 + 0.1225i & 0.0292 + 0.2645i & 0.2717 + 0.1683i & 0.7982 - 0.3056i \end{bmatrix}$$

-continued $$\tilde{\Theta}_4 = \begin{matrix} 0.9121+0.1709i & -0.0579+0.0181i & -0.1731+0.1580i & -0.2253+0.1716i \\ 0.0579-0.0181i & 0.9634-0.0444i & 0.0684+0.0811i & -0.1580-0.1731i \\ 0.1580+0.1731i & -0.0811+0.0684i & 0.9634-0.0444i & -0.0181-0.0579i \\ 0.1716+0.2253i & 0.1731-0.1580i & -0.0181-0.0579i & 0.9121+0.1709i \end{matrix}$$

$$\tilde{\Theta}_5 = \begin{matrix} 0.8538+0.3377i & -0.1584+0.0349i & -0.1532+0.2848i & 0.1122+0.1161i \\ 0.1367+0.0873i & 0.9471+0.2461i & -0.0829-0.0467i & -0.0751+0.0368i \\ -0.0325+0.3217i & 0.0749-0.0587i & 0.8560+0.3376i & -0.1516-0.1290i \\ -0.0643+0.1481i & 0.0834-0.0053i & 0.1290-0.1516i & 0.9401-0.2089i \end{matrix}$$

$$\tilde{\Theta}_6 = \begin{matrix} 0.7827+0.3953i & -0.2172+0.1880i & 0.0981+0.3107i & -0.1753+0.1085i \\ 0.1880+0.2172i & 0.7316+0.3629i & -0.3274-0.1530i & 0.1718-0.3006i \\ -0.1503+0.2890i & 0.3397-0.1233i & 0.7784+0.2530i & 0.3055-0.0093i \\ 0.2007+0.0472i & -0.0911-0.3340i & -0.3055+0.0093i & 0.8010+0.3203i \end{matrix}$$

$$\tilde{\Theta}_7 = \begin{matrix} 0.7427+0.3047i & -0.2373+0.4414i & -0.2724-0.0816i & -0.0575+0.1423i \\ 0.1443+0.4799i & 0.7294-0.1502i & 0.1663-0.0600i & 0.2742+0.2963i \\ 0.1796-0.2204i & -0.1307+0.1190i & 0.8017-0.4491i & -0.0856+0.1900i \\ -0.1076+0.1094i & -0.1688+0.3667i & 0.1900+0.0856i & 0.8024-0.3553i \end{matrix}$$

$$\tilde{\Theta}_8 = \begin{matrix} 0.7539-0.1575i & -0.0536-0.2148i & -0.3518-0.0133i & -0.4823-0.0343i \\ -0.0536-0.2148i & 0.8418-0.4250i & 0.2212-0.0077i & -0.0843+0.0746i \\ 0.3518+0.0133i & -0.2212+0.0077i & 0.9031+0.0111i & -0.0956+0.0463i \\ 0.4823+0.0343i & 0.0843-0.0746i & -0.0956+0.0463i & 0.8152+0.2786i \end{matrix}$$

$$\tilde{\Theta}_9 = \begin{matrix} 0.7749-0.3638i & -0.1686-0.2951i & -0.2431+0.0595i & 0.0045-0.2984i \\ 0.0894-0.3279i & 0.9034-0.1063i & 0.1533+0.0703i & -0.1249+0.1137i \\ 0.1480+0.2018i & -0.1147-0.1237i & 0.7967+0.4475i & -0.1340-0.2365i \\ -0.1101-0.2774i & 0.0573+0.1589i & 0.2365-0.1340i & 0.8308-0.3439i \end{matrix}$$

$$\tilde{\Theta}_{10} = \begin{matrix} 0.7840-0.3922i & -0.1783-0.1615i & 0.1003-0.3192i & -0.2183-0.1185i \\ 0.1615-0.1783i & 0.8762+0.1420i & -0.2677+0.1389i & -0.1293-0.2157i \\ -0.1548-0.2966i & 0.2875+0.0911i & 0.7726-0.2428i & 0.3756+0.0169i \\ 0.2382-0.0705i & 0.0611-0.2439i & -0.3756-0.0167i & 0.8030+0.2983i \end{matrix}$$

$$\tilde{\Theta}_{11} = \begin{matrix} 0.7587-0.3211i & -0.2921-0.1972i & -0.0856-0.3275i & 0.0816-0.2752i \\ 0.3460-0.0672i & 0.7606+0.4499i & -0.2714+0.0813i & 0.0872-0.0839i \\ 0.0463-0.3353i & 0.1789+0.2196i & 0.7978-0.3017i & -0.1393+0.2412i \\ -0.2231-0.1807i & -0.0484+0.1109i & 0.2412+0.1393i & 0.7966-0.4369i \end{matrix}$$

$$\tilde{\Theta}_{12} = \begin{matrix} 0.8790-0.3390i & 0.2102+0.0057i & -0.0699-0.1039i & -0.1152-0.1981i \\ -0.2102-0.0057i & 0.8450-0.1652i & 0.2257-0.2291i & 0.2922-0.1605i \\ 0.1039-0.0699i & -0.2291-0.2257i & 0.9312-0.0238i & -0.0920+0.0687i \\ 0.1981-0.1152i & -0.1605-0.2922i & -0.0920+0.0687i & 0.7995+0.4289i \end{matrix}$$

$$\tilde{\Theta}_{13} = \begin{matrix} 0.8349-0.3496i & 0.2377-0.1773i & 0.0750-0.0873i & 0.1987-0.2001i \\ -0.2934-0.0427i & 0.7567-0.3309i & 0.2358-0.2508i & 0.0836+0.3232i \\ -0.0359+0.1094i & -0.1414-0.3138i & 0.7954+0.3920i & -0.1444-0.2471i \\ -0.2609-0.1070i & -0.0464+0.3305i & 0.2471-0.1444i & 0.7973-0.3024i \end{matrix}$$

$$\tilde{\Theta}_{14} = \begin{matrix} 0.8755-0.1985i & 0.1391-0.1435i & 0.3282-0.1666i & 0.0437-0.1291i \\ -0.1435-0.1391i & 0.8807-0.2794i & -0.0274+0.2719i & -0.1769+0.0193i \\ -0.3499-0.1143i & 0.1729+0.2116i & 0.7221-0.2043i & 0.4759+0.0145i \\ 0.1222-0.0604i & 0.1114-0.1387i & -0.4759-0.0145i & 0.8040+0.2769i \end{matrix}$$

-continued $$\tilde{\Theta}_{15} = \begin{matrix} 0.8932-0.0588i & 0.1525-0.1826i & 0.1603-0.1344i & 0.3032-0.0797i \\ -0.0213-0.2370i & 0.8916+0.1554i & -0.0808+0.3037i & -0.1595+0.0042i \\ -0.0628-0.1995i & 0.0416+0.3115i & 0.7983-0.3274i & -0.1792+0.2846i \\ -0.3106-0.0424i & 0.0649+0.1458i & 0.2846+0.1792i & 0.7970-0.3576i \end{matrix}$$

$$\tilde{\Theta}_{16} = \begin{matrix} 1.0000+0.0000i & -0.0000-0.0000i & 0.0000-0.0000i & -0.0000-0.0000i \\ 0.0000-0.0000i & 0.9000+0.3000i & -0.0000+0.0000i & 0.1000-0.3000i \\ -0.0000-0.0000i & 0.0000+0.0000i & 1.0000+0.0000i & 0.0000+0.0000i \\ 0.0000-0.0000i & 0.1000-0.3000i & -0.0000+0.0000i & 0.9000+0.3000i \end{matrix}$$

(5) Time correlation coefficient=0.85

$$\tilde{\Theta}_{1} = \begin{matrix} 0.9341+0.0385i & 0.1010+0.2000i & 0.1363+0.1602i & 0.1759+0.0248i \\ -0.0700+0.2129i & 0.8726-0.0511i & -0.0394-0.3477i & 0.2098+0.1391i \\ -0.0958+0.1873i & 0.0966-0.3363i & 0.8715+0.2348i & -0.0787-0.1118i \\ -0.1720+0.0444i & -0.2088+0.1406i & 0.1118-0.0787i & 0.8915-0.3028i \end{matrix}$$

$$\tilde{\Theta}_{2} = \begin{matrix} 0.9066+0.1882i & 0.1796+0.1707i & 0.2440+0.1328i & 0.0542+0.0339i \\ -0.1707+0.1796i & 0.9393-0.2014i & -0.0669-0.0075i & 0.0976-0.0408i \\ -0.2665+0.0786i & -0.0420-0.0526i & 0.8983+0.0333i & 0.3270+0.0571i \\ 0.0623-0.0143i & -0.0978-0.0401i & -0.3270-0.0571i & 0.8883+0.2923i \end{matrix}$$

$$\tilde{\Theta}_{3} = \begin{matrix} 0.8824+0.2999i & 0.1875+0.1338i & 0.0605+0.0599i & 0.1964+0.1805i \\ -0.2272+0.0379i & 0.8808-0.2134i & 0.1787+0.1963i & -0.0571+0.2208i \\ -0.0329-0.0785i & -0.1129+0.2402i & 0.8577-0.3379i & -0.1528+0.2217i \\ -0.2419+0.1123i & 0.0345+0.2325i & 0.2217+0.1528i & 0.5844-0.2666i \end{matrix}$$

$$\tilde{\Theta}_{4} = \begin{matrix} 0.9402+0.1846i & -0.0267+0.0077i & -0.1395+0.1192i & -0.1782+0.1257i \\ 0.0267-0.0077i & 0.9758-0.0208i & 0.0784+0.0819i & -0.1192-0.1395i \\ 0.1192+0.1395i & -0.0819+0.0784i & 0.9758-0.0208i & -0.0077-0.0267i \\ 0.1257+0.1782i & 0.1395-0.1192i & -0.0077-0.0267i & 0.9402+0.1846i \end{matrix}$$

$$\tilde{\Theta}_{5} = \begin{matrix} 0.8928+0.2846i & -0.1482+0.0375i & -0.1213+0.2579i & 0.0913+0.0949i \\ 0.1313+0.0782i & 0.9596+0.2077i & -0.0799-0.0488i & -0.0545+0.0291i \\ -0.0134+0.2846i & 0.0757-0.0551i & 0.8936+0.2888i & -0.1275-0.1084i \\ -0.0528+0.1207i & 0.0614-0.0060i & 0.1084-0.1275i & 0.9544-0.1998i \end{matrix}$$

$$\tilde{\Theta}_{6} = \begin{matrix} 0.8675+0.2988i & -0.2010+0.1717i & 0.1003+0.2058i & -0.1676+0.0884i \\ 0.1717+0.2010i & 0.8142+0.3010i & -0.2740-0.1115i & 0.1386-0.2641i \\ -0.0746+0.2164i & 0.2726-0.1149i & 0.8762+0.1535i & 0.2622-0.0104i \\ 0.1810+0.0561i & -0.0887-0.2848i & -0.2622+0.0104i & 0.8538+0.2779i \end{matrix}$$

$$\tilde{\Theta}_{7} = \begin{matrix} 0.8573+0.2257i & -0.1676+0.3493i & -0.2151-0.0787i & -0.0231+0.1052i \\ 0.1284+0.3655i & 0.8405-0.1350i & 0.1263-0.0258i & 0.2213+0.2443i \\ 0.1550-0.1686i & -0.1068+0.0722i & 0.8688-0.3764i & -0.0841+0.1655i \\ -0.0616+0.0883i & -0.1410+0.2979i & 0.1655+0.0841i & 0.8654-0.3106i \end{matrix}$$

$$\tilde{\Theta}_{8} = \begin{matrix} 0.8559-0.0878i & -0.0092-0.1402i & -0.2963-0.0139i & -0.3876-0.0415i \\ -0.0092-0.1402i & 0.9066-0.3353i & 0.2051-0.0136i & -0.0489+0.0367i \\ 0.2963+0.0139i & -0.2051+0.0136i & 0.9294+0.0100i & -0.0643+0.0424i \\ 0.3876+0.0415i & 0.0489-0.0367i & -0.0643+0.0424i & 0.8787+0.2574i \end{matrix}$$

$$\tilde{\Theta}_{9} = \begin{matrix} 0.8825-0.2527i & -0.1175-0.2395i & -0.1973+0.0629i & 0.0295-0.2061i \\ 0.0863-0.2524i & 0.9370-0.0866i & 0.1241+0.0443i & -0.1010+0.1260i \\ 0.1336+0.1582i & -0.0977-0.0884i & 0.8627+0.3779i & -0.1255-0.1919i \\ -0.0517-0.2017i & 0.0778+0.1415i & 0.1919-0.1255i & 0.8952-0.2769i \end{matrix}$$

$$\tilde{\Theta}_{10} = \begin{matrix} 0.8691 - 0.2954i & -0.1678 - 0.1464i & 0.1028 - 0.2120i & -0.2068 - 0.0972i \\ 0.1464 - 0.1678i & 0.9064 + 0.1296i & -0.2292 + 0.1074i & -0.1064 - 0.1915i \\ -0.0772 - 0.2226i & 0.2380 + 0.0862i & 0.8714 - 0.1478i & 0.3144 + 0.0203i \\ 0.2149 - 0.0775i & 0.0601 - 0.2107i & -0.3144 - 0.0203i & 0.8549 + 0.2640i \end{matrix}$$

$$\tilde{\Theta}_{11} = \begin{matrix} 0.8340 - 0.2790i & -0.2492 - 0.1516i & -0.0781 - 0.2825i & 0.0809 - 0.2215i \\ 0.2834 - 0.0691i & 0.8444 + 0.3743i & -0.2174 + 0.0813i & 0.0717 - 0.0530i \\ 0.0360 - 0.2908i & 0.1583 + 0.1697i & 0.8564 - 0.2666i & -0.1265 + 0.1993i \\ -0.1737 - 0.1595i & -0.0459 + 0.0764i & 0.1993 + 0.1265i & 0.8624 - 0.3701i \end{matrix}$$

$$\tilde{\Theta}_{12} = \begin{matrix} 0.9257 - 0.2621i & 0.1257 + 0.0242i & -0.0905 - 0.0973i & -0.1150 - 0.1648i \\ -0.1257 - 0.0242i & 0.9189 - 0.0744i & 0.1796 - 0.1674i & 0.2323 - 0.1396i \\ 0.0973 - 0.0905i & -0.1674 - 0.1796i & 0.9565 - 0.0072i & -0.0618 + 0.0585i \\ 0.1648 - 0.1150i & -0.1396 - 0.2323i & -0.0618 + 0.0585i & 0.8637 + 0.3646i \end{matrix}$$

$$\tilde{\Theta}_{13} = \begin{matrix} 0.8828 - 0.3013i & 0.2078 - 0.1404i & 0.0625 - 0.0595i & 0.1766 - 0.1684i \\ -0.2462 - 0.0477i & 0.8277 - 0.2864i & 0.1942 - 0.2195i & 0.0726 + 0.2806i \\ -0.0350 + 0.0789i & -0.1285 - 0.2634i & 0.8573 + 0.3358i & -0.1329 - 0.2032i \\ -0.2232 - 0.0987i & -0.0403 + 0.2870i & 0.2032 - 0.1329i & 0.8525 - 0.2660i \end{matrix}$$

$$\tilde{\Theta}_{14} = \begin{matrix} 0.9108 - 0.1712i & 0.1237 - 0.14041 & 0.2787 - 0.1260 & 0.0168 - 0.1110i \\ -0.1404 - 0.1237i & 0.9221 - 0.2312i & -0.0433 + 0.2025i & -0.1357 + 0.0004i \\ -0.2862 - 0.1080i & 0.1126 + 0.1738i & 0.8308 - 0.1386i & 0.3917 + 0.02681i \\ 0.0904 - 0.0666i & 0.0957 - 0.0962i & -0.3917 - 0.0268i & 0.8670 + 0.2513i \end{matrix}$$

$$\tilde{\Theta}_{15} = \begin{matrix} 0.9202 - 0.0539i & 0.1248 - 0.1626i & 0.1330 - 0.1267i & 0.2648 - 0.0661i \\ -0.0267 - 0.2032i & 0.9201 + 0.1347i & -0.0686 + 0.2650i & -0.1340 + 0.0164i \\ -0.0662 - 0.1713i & 0.0380 + 0.2711i & 0.8549 - 0.2832i & -0.1632 + 0.2315i \\ -0.2700 - 0.0403i & 0.0664 + 0.1175i & 0.2315 + 0.1632i & 0.8558 - 0.3076i \end{matrix}$$

$$\tilde{\Theta}_{16} = \begin{matrix} 1.0000 + 0.0000i & -0.0000 - 0.0000i & -0.0000 - 0.0000i & 0.0000 - 0.0000i \\ 0.0000 - 0.0000i & 0.9250 + 0.2634i & 0.0000 + 0.0000i & 0.0750 - 0.2634i \\ 0.0000 - 0.0000i & -0.0000 + 0.0000i & 1.0000 + 0.0000i & -0.0000 + 0.0000i \\ 0.0000 - 0.0000i & 0.0750 - 0.2634i & 0.0000 + 0.0000i & 0.9250 + 0.2634i \end{matrix}$$

(6) Time correlation coefficient=0.9

$$\tilde{\Theta}_{1} = \begin{matrix} 0.9567 + 0.0417i & 0.0684 + 0.1542i & 0.1036 + 0.1320i & 0.1613 + 0.0201i \\ -0.0607 + 0.1574i & 0.9322 + 0.0029i & -0.0257 - 0.2653i & 0.1414 + 0.1076i \\ -0.0823 + 0.1462i & 0.0777 - 0.2549i & 0.9183 + 0.2037i & -0.0831 - 0.0956i \\ -0.1567 + 0.0431i & -0.1535 + 0.0894i & 0.0956 - 0.0831i & 0.9337 - 0.2327i \end{matrix}$$

$$\tilde{\Theta}_{2} = \begin{matrix} 0.9396 + 0.1527i & 0.1496 + 0.1411i & 0.2002 + 0.0990i & 0.0269 + 0.0316i \\ -0.1411 + 0.1496i & 0.9601 - 0.1555i & -0.0529 - 0.0251i & 0.0827 - 0.0380i \\ -0.2116 + 0.0715i & -0.0196 - 0.0552i & 0.9374 + 0.0301i & 0.2570 + 0.0326i \\ 0.0414 + 0.0033i & -0.0853 - 0.0316i & -0.2570 - 0.0326i & 0.9309 + 0.2374i \end{matrix}$$

$$\tilde{\Theta}_{3} = \begin{matrix} 0.9270 + 0.2411i & 0.1542 + 0.0992i & 0.0476 + 0.0346i & 0.1618 + 0.1392i \\ -0.1791 + 0.0389i & 0.9221 - 0.1792i & 0.1375 + 0.1618i & -0.0412 + 0.1927i \\ -0.0308 - 0.0502i & -0.0969 + 0.1890i & 0.9140 - 0.2683i & -0.1277 + 0.1667i \\ -0.1905 + 0.0962i & 0.0356 + 0.1938i & 0.1667 + 0.1277i & 0.9076 - 0.2188i \end{matrix}$$

-continued $$\tilde{\Theta}_4 = \begin{bmatrix} 0.9604+0.1704i & -0.0114+0.0036i & -0.1093+0.0930i & -0.1359+0.0969i \\ 0.0114-0.0036i & 0.9839-0.0091i & 0.0741+0.0750i & -0.0930-0.1093i \\ 0.0930+0.1093i & -0.0750+0.0741i & 0.9839-0.0091i & -0.0036-0.0114i \\ 0.0969+0.1359i & 0.1093-0.0930i & -0.0036-0.0114i & 0.9604+0.1704i \end{bmatrix}$$

$$\tilde{\Theta}_5 = \begin{bmatrix} 0.9301+0.2281i & -0.1266+0.0364i & -0.0870+0.2160i & 0.0718+0.0782i \\ 0.1153+0.0638i & 0.9717+0.1710i & -0.0708-0.0456i & -0.0410+0.0214i \\ 0.0023+0.2329i & 0.0692-0.0479i & 0.9301+0.2341i & -0.1037-0.0895i \\ -0.0448+0.0963i & 0.0460-0.0041i & 0.0895-0.1037i & 0.9681-0.1749i \end{bmatrix}$$

$$\tilde{\Theta}_6 = \begin{bmatrix} 0.9239+0.2135i & -0.1679+0.1484i & 0.0788+0.1302i & -0.1501+0.0700i \\ 0.1484+0.1679i & 0.8870+0.2301i & -0.2150-0.0813i & 0.1032-0.2157i \\ -0.0364+0.1478i & 0.2095-0.0946i & 0.9337+0.0799i & 0.2139-0.0078i \\ 0.1556+0.0567i & -0.0796-0.2255i & -0.2139+0.0078i & 0.9046+0.2265i \end{bmatrix}$$

$$\tilde{\Theta}_7 = \begin{bmatrix} 0.9319+0.1518i & -0.1110+0.2491i & -0.1561-0.0682i & -0.0041+0.0721i \\ 0.0976+0.2546i & 0.9190-0.1100i & 0.0859-0.0053i & 0.1625+0.1876i \\ 0.1227-0.1181i & -0.0773+0.0378i & 0.9244-0.2914i & -0.0789+0.1342i \\ -0.0313+0.0650i & -0.1111+0.2219i & 0.1342+0.0789i & 0.9192-0.2529i \end{bmatrix}$$

$$\tilde{\Theta}_8 = \begin{bmatrix} 0.9222-0.0386i & 0.0068-0.0794i & -0.2353-0.0095i & -0.2918-0.0321i \\ 0.0068-0.0794i & 0.9475-0.2510i & 0.1789-0.0132i & -0.0229+0.0158i \\ 0.2353+0.0095i & -0.1789+0.0132i & 0.9538+0.0073i & -0.0384+0.0335i \\ 0.2918+0.0321i & 0.0229-0.0158i & -0.0384+0.0335i & 0.9286+0.2197i \end{bmatrix}$$

$$\tilde{\Theta}_9 = \begin{bmatrix} 0.9446-0.1610i & -0.0810-0.1798i & -0.1478+0.0594i & 0.0299-0.1293i \\ 0.0699-0.1844i & 0.9625-0.0688i & 0.0910+0.0229i & -0.0815+0.1209i \\ 0.1114+0.1138i & -0.0753-0.0560i & 0.9201+0.2943i & -0.1084-0.1446i \\ -0.0218-0.1309i & 0.0805+0.1215i & 0.1446.-01084i & 0.9396-0.2135i \end{bmatrix}$$

$$\tilde{\Theta}_{10} = \begin{bmatrix} 0.9250-0.2107i & -0.1449-0.1273i & 0.0807-0.1338i & -0.1800-0.0778i \\ 0.1273-0.1449i & 0.9360+0.1128i & -0.1854+0.0814i & -0.0832-0.1614i \\ -0.0375-0.1517i & 0.1886+0.0735i & 0.9310-0.0770i & 0.2485+0.0158i \\ 0.1823-0.0723i & 0.0553-0.1730i & -0.2485-0.0158i & 0.9047+0.2194i \end{bmatrix}$$

$$\tilde{\Theta}_{11} = \begin{bmatrix} 0.9006-0.2267i & -0.1948-0.1068i & -0.0646-0.2283i & 0.0718-0.1632i \\ 0.2133-0.0622i & 0.9135+0.2858i & -0.1600+0.0722i & 0.0549-0.0275i \\ 0.0277-0.2357i & 0.1279+0.1202i & 0.9104-0.2221i & -0.1069+0.1526i \\ -0.1234-0.1288i & -0.0402+0.0464i & 0.1526+0.1069i & 0.9197-0.2865i \end{bmatrix}$$

$$\tilde{\Theta}_{12} = \begin{bmatrix} 0.9550-0.2020i & 0.0700+0.0209i & -0.0886-0.0854i & -0.1024-0.1278i \\ -0.0700-0.0209i & 0.9582-0.0280i & 0.1337-0.1239i & 0.1703-0.1161i \\ 0.0854-0.0886i & -0.1239-0.1337i & 0.9739-0.0005i & -0.0366+0.0425i \\ 0.1278-0.1024i & -0.1161-0.1703i & -0.0366+0.0425i & 0.9197+0.2859i \end{bmatrix}$$

$$\tilde{\Theta}_{13} = \begin{bmatrix} 0.9274-0.2418i & 0.1685-0.1020i & 0.0488-0.0343i & 0.1475-0.1320i \\ -0.1913-0.0470i & 0.8936-0.2315i & 0.1478-0.1782i & 0.0584+0.2282i \\ -0.0320+0.0504i & -0.1081-0.2047i & 0.9136+0.2671i & -0.1133-0.1548i \\ -0.1784-0.0857i & -0.0333+0.2332i & 0.1548-0.1133i & 0.9054-0.2207i \end{bmatrix}$$

$$\tilde{\Theta}_{14} = \begin{bmatrix} 0.9423-0.1401i & 0.1080-0.1272i & 0.2190-0.0917i & -0.0019-0.0903i \\ -0.1272-0.1080i & 0.9538-0.1788i & -0.0429+0.1382i & -0.0972-0.0097i \\ -0.2197-0.0900i & 0.0674+0.1280i & 0.9094-0.0778i & 0.2982+0.0256i \\ 0.0625-0.0652i & 0.0756-0.0619i & -0.2982-0.0256i & 0.9202+0.2141i \end{bmatrix}$$

$$\tilde{\Theta}_{15} = \begin{matrix} 0.9469 - 0.0481i & 0.0945 - 0.1362i & 0.1041 - 0.1137i & 0.2171 - 0.0514i \\ -0.0295 - 0.1632i & 0.9480 + 0.1088i & -0.0542 + 0.2172i & -0.1063 + 0.0254i \\ -0.0652 - 0.1397i & 0.0330 + 0.2214i & 0.9082 - 0.2293i & -0.1367 + 0.1734i \\ -0.2203 - 0.0356i & 0.0641 + 0.0885i & 0.1734 + 0.1367i & 0.9103 - 0.2466i \end{matrix}$$

$$\tilde{\Theta}_{16} = \begin{matrix} 1.0000 + 0.0000i & -0.0000 - 0.0000i & 0.0000 - 0.0000i & 0.0000 - 0.0000i \\ 0 - 0.0000i & 0.9500 + 0.2179i & 0.0000 + 0.0000i & 0.0500 - 0.2179i \\ 0 - 0.0000i & 0.0000 + 0.0000i & 1.0000 + 0.0000i & -0.0000 + 0.0000i \\ -0.0000 - 0.0000i & 0.0500 - 0.2179i & 0.0000 + 0.0000i & 0.9500 + 0.2179i \end{matrix}$$

15

(7) Time correlation coefficient=0.95

$$\tilde{\Theta}_1 = \begin{matrix} 09774 + 0.0378i & 0.0428 + 0.1040i & 0.0703 + 0.0960i & 0.1267 + 0.0174i \\ -0.0433 + 0.1038i & 0.9715 + 0.0287i & -0.0195 - 0.1746i & 0.0851 + 0.0679i \\ -0.0618 + 0.1017i & 0.0488 - 0.1688i & 0.9603 + 0.1510i & -0.0692 - 0.0715i \\ -0.1237 + 0.0325i & -0.0953 + 0.0526i & 0.0715 - 0.0692i & 0.9679 - 0.1580i \end{matrix}$$

$$\tilde{\Theta}_2 = \begin{matrix} 0.9705 + 0.1072i & 0.1078 + 0.1019i & 0.1407 + 0.1631i & 0.0045 + 0.0292i \\ -0.1019 + 0.1078i & 0.9798 - 0.1081i & -0.0338 - 0.0309i & 0.0585 - 0.0282i \\ -0.1441 + 0.0548i & -0.0021 - 0.0457i & 0.9713 + 0.0172i & 0.1737 + 0.0129i \\ 0.0238 + 0.0175i & -0.0613 - 0.0214i & -0.1737 - 0.0129i & 09683 + 0.1642i \end{matrix}$$

$$\tilde{\Theta}_3 = \begin{matrix} 0.9669 + 0.1648i & 0.1083 + 0.0611i & 0.0323 + 0.0131i & 0.1140 + 0.0905i \\ -0.1198 + 0.0334i & 0.9619 - 0.1319i & 0.0895 + 0.1140i & -0.0264 + 0.1418i \\ -0.0248 - 0.0245i & -0.0710 + 0.1263i & 0.9624 - 0.1805i & -0.0895 + 0.1049i \\ -0.1272 + 0.0707i & 0.0299 + 0.1411i & 0.1049 + 0.0895i & 0.9565 - 0.1554i \end{matrix}$$

$$\tilde{\Theta}_4 = \begin{matrix} 09794 0.1331i & -0.0034 + 0.0013i & -0.0760 + 0.0666i & -0.0903 + 0.0691i \\ 0.0034 - 0.0013i & 0.9913 - 0.0028i & 0.0595 + 0.0596i & -0.0666 - 0.07601i \\ 0.0666 + 0.0760i & -0.0596 + 0.0595i & 0.9913 - 0.0028i & -0.0013 - 0.0034i \\ 0.0691 + 0.0903i & 0.0760 - 0.0666i & -0.0013 - 0.0034i & 0.9794 + 0.1331i \end{matrix}$$

$$\tilde{\Theta}_5 = \begin{matrix} 0.9660 + 0.1576i & -0.0934 + 0.0306i & -0.0508 + 0.1548i & 0.0496 + 0.0585i \\ 0.0876 + 0.0444i & 0.9845 + 0.1253i & -0.0552 - 0.0370i & -0.0282 + 0.0130i \\ 0.0123 + 0.1624i & 0.0553 - 0.0368i & 0.9656 + 0.1638i & -0.0742 - 0.0662i \\ -0.0351 + 0.0682i & 0.0310 - 0.0012i & 0.0662 - 0.0742i & 0.9826 - 0.1330i \end{matrix}$$

$$\tilde{\Theta}_6 = \begin{matrix} 0.9658 + 0.1329i & -0.1178 + 0.1097i & 0.0472 + 0.0730i & -0.1166 + 0.0496i \\ 0.1097 + 0.1178i & 0.9496 + 0.1469i & -0.1458 - 0.0542i & 0.0652 - 0.1494i \\ -0.0183 + 0.0850i & 0.1414 - 0.0648i & 0.9716 + 0.0302i & 0.1527 - 0.0038i \\ 0.1175 + 0.0473i & -0.0596 - 0.1517i & -0.1527 + 0.0038i & 0.9533 + 0.1593i \end{matrix}$$

$$\tilde{\Theta}_7 = \begin{matrix} 0.9765 + 0.0860i & -0.0629 + 0.1474i & -0.0954 - 0.0494i & 0.0034 + 0.0423i \\ 0.0597 + 0.1487i & 0.9703 - 0.0737i & 0.0476 + 0.0032i & 0.0995 + 0.1236i \\ 0.0821 - 0.0693i & -0.0452 + 0.0152i & 0.9681 - 0.1906i & -0.0644 + 0.0917i \\ -0.0130 + 0.0404i & -0.0761 + 0.1392i & 0.0917 + 0.0644i & 0.9643 - 0.1749i \end{matrix}$$

$$\tilde{\Theta}_8 = \begin{matrix} 0.9678 - 0.0104i & 0.0076 - 0.0333i & -0.1621 - 0.0037i & -0.1885 - 0.0160i \\ 0.0076 - 0.0333i & 0.9761 - 0.1656i & 0.1357 - 0.0085i & -0.0069 + 0.0046i \\ 0.1621 + 0.0037i & -0.1357 + 0.0085i & 0.9770 + 0.0034i & -0.0169 + 0.0195i \\ 0.1885 + 0.0160i & 0.0069 - 0.0046i & -0.0169 + 0.0195i & 0.9687 + 0.1586i \end{matrix}$$

$$\tilde{\Theta}_9 = \begin{matrix} 0.9802-0.0878i & -0.0504-0.1161i & -0.0931+0.0463i & 0.0188-0.0664i \\ 0.0464-0.1177i & 0.9827-0.0501i & 0.0540+0.0074i & -0.0596+0.0958i \\ 0.0784+0.0683i & -0.0472-0.0272i & 0.9666+0.1925i & -0.0792-0.0927i \\ -0.0080-0.0685i & 0.0657+0.0917i & 0.0927-0.0792i & 0.9726-0.1473i \end{matrix}$$

$$\tilde{\Theta}_{10} = \begin{matrix} 0.9661-0.1316i & -0.1066-0.0970i & 0.0481-0.0743i & -0.1330-0.0548i \\ 0.0970-0.1066i & 0.9664+0.0872i & -0.1309+0.0552i & -0.0566-0.1195i \\ -0.0186-0.0865i & 0.1316+0.0535i & 0.9706-0.0291i & 0.1700+0.0081i \\ 0.1328-0.0553i & 0.0445-0.1246i & -0.1700-0.0081i & 0.9530+0.1571i \end{matrix}$$

$$\tilde{\Theta}_{11} = \begin{matrix} 0.9567-0.1574i & -0.1273-0.0627i & -0.0433-0.1588i & 0.0524-0.1000i \\ 0.1343-0.1456i & 0.9657+0.1828i & -0.0985-0.0525i & 0.0357-0.0086i \\ 0.0207-0.1633i & 0.0862+0.0709i & 0.9588-0.1596i & -0.0775+0.0984i \\ -0.0723-0.0867i & -0.0297+0.0216i & 0.0984+0.0775i & 0.9664-0.1907i \end{matrix}$$

$$\tilde{\Theta}_{12} = \begin{matrix} 0.9781-0.1416i & 0.0301+0.0113i & -0.0701-0.649i & -0.0764-0.0849i \\ -0.0301-0.0113i & 0.9833-0.0066i & 0.0864-0.0825i & 0.1049-0.0828i \\ 0.0649-0.0701i & -0.0825-0.0864i & 0.9878+0.0009i & -0.0159-+0.0226i \\ 0.0849-0.0764i & -0.0828-0.1049i & -0.0159+0.0226i & 0.9658+0.1886i \end{matrix}$$

$$\tilde{\Theta}_{13} = \begin{matrix} 0.9672-0.1650i & 0.1156-0.0615i & 0.0328-0.0130i & 0.1064-0.0876i \\ -0.1252-0.0383i & 0.9521-0.1597i & 0.0944-0.1225i & 0.0392+0.1593i \\ -0.0253+0.0246i & -0.0771-0.1341i & 0.9622+0.1801i & -0.0819-0.0994i \\ -0.1217-0.0648i & -0.0247+0.1622i & 0.0994-0.0819i & 0.9552-0.1582i \end{matrix}$$

$$\tilde{\Theta}_{14} = \begin{matrix} 0.9714-0.1011i & 0.0849-0.0985i & 0.1470-0.0596i & -0.0115-0.0628i \\ -0.0985-0.0849i & 0.9786-0.1196i & -0.0308+0.0794i & -0.0607-0.0128i \\ -0.1461-0.0619i & 0.0344+0.0779i & 0.9640-0.0304i & 0.1928+0.0150i \\ 0.0363-0.0525i & 0.0520-0.0338i & -0.1928-0.0150i & 0.9645+0.1561i \end{matrix}$$

$$\tilde{\Theta}_{15} = \begin{matrix} 0.9733-0.0393i & 0.0598-0.0987i & 0.0711-0.0896i & 0.1534-0.0344i \\ -0.0275-0.1121i & 0.9748+0.0743i & -0.0361+0.1534i & -0.0732+0.0282i \\ -0.0555-0.1000i & 0.0254+0.1556i & 0.9569-0.1597i & -0.0955+0.1083i \\ -0.1549-0.0269i & 0.0541+0.0569i & 0.1083+0.0955i & 0.9590-0.1688i \end{matrix}$$

$$\tilde{\Theta}_{16} = \begin{matrix} 1.0000+0.0000i & -0.0000-0.0000i & 0.0000-0.0000i & 0.0000-0.0000i \\ 0.0000-0.0000i & 0.9750+0.1561i & -0.0000+0.0000i & 0.0250-0.1561i \\ -0.0000-0.0000i & 0.0000+0.0000i & 1.0000-0.0000i & -0.0000+0.0000i \\ -0.0000-0.0000i & 0.0250-0.1561i & 0.0000+0.0000i & 0.9750+0.1561i \end{matrix}$$

2) Where the number of feedback bits B=4, $\{\Theta\}=\{\Theta_1, \ldots, \Theta_{2^B}\}$ includes diagonal unitary matrices, and the second scheme, that is, the above Equation 16 is used, examples of the codebook $\{\tilde{\Theta}\}=\{\tilde{\Theta}_1, \ldots, \tilde{\Theta}_{2^B}\}$ that is updated according to the time correlation coefficient may follow as:

(1) Time correlation coefficient=0

$$\tilde{\Theta}_1 = \begin{matrix} 0.9239+0.3827i & 0 & 0 & 0 \\ 0 & 0.3827+0.9239i & 0 & 0 \\ 0 & 0 & 0.0000+1.0000i & 0 \\ 0 & 0 & 0 & -1.0000+0.0000i \end{matrix}$$

$$\tilde{\Theta}_2 = \begin{matrix} 0.7071+0.7071i & 0 & 0 & 0 \\ 0 & -0.7071+0.7071i & 0 & 0 \\ 0 & 0 & -1.0000+0.0000i & 0 \\ 0 & 0 & 0 & 1.0000+0.0000i \end{matrix}$$

-continued $$\tilde{\Theta}_3 = \begin{pmatrix} 0.3827 + 0.9239i & 0 & 0 & 0 \\ 0 & -0.9239 - 0.3827i & 0 & 0 \\ 0 & 0 & -0.0000 - 1.0000i & 0 \\ 0 & 0 & 0 & -1.0000 + 0.0000i \end{pmatrix}$$

$$\tilde{\Theta}_4 = \begin{pmatrix} -0.0000 + 1.0000i & 0 & 0 & 0 \\ 0 & -0.0000 - 1.0000i & 0 & 0 \\ 0 & 0 & 1.0000 - 0.0000i & 0 \\ 0 & 0 & 0 & 1.0000 - 0.0000i \end{pmatrix}$$

$$\tilde{\Theta}_5 = \begin{pmatrix} -0.3827 + 0.9239i & 0 & 0 & 0 \\ 0 & 0.9239 - 0.3827i & 0 & 0 \\ 0 & 0 & 0.0000 + 1.0000i & 0 \\ 0 & 0 & 0 & -1.0000 + 0.0000i \end{pmatrix}$$

$$\tilde{\Theta}_6 = \begin{pmatrix} -0.7071 + 0.7071i & 0 & 0 & 0 \\ 0 & 0.7071 + 0.7071i & 0 & 0 \\ 0 & 0 & -1.0000 + 0.0000i & 0 \\ 0 & 0 & 0 & 1.0000 - 0.0000i \end{pmatrix}$$

$$\tilde{\Theta}_7 = \begin{pmatrix} -0.9239 + 0.3827i & 0 & 0 & 0 \\ 0 & -0.3827 + 0.9239i & 0 & 0 \\ 0 & 0 & -0.0000 - 1.0000i & 0 \\ 0 & 0 & 0 & -1.0000 + 0.0000i \end{pmatrix}$$

$$\tilde{\Theta}_8 = \begin{pmatrix} -1.0000 - 0.0000i & 0 & 0 & 0 \\ 0 & -1.0000 + 0.0000i & 0 & 0 \\ 0 & 0 & 1.0000 - 0.0000i & 0 \\ 0 & 0 & 0 & 1.0000 - 0.0000i \end{pmatrix}$$

$$\tilde{\Theta}_9 = \begin{pmatrix} -0.9239 - 0.3827i & 0 & 0 & 0 \\ 0 & -0.3827 - 0.9239i & 0 & 0 \\ 0 & 0 & 0.0000 + 1.0000i & 0 \\ 0 & 0 & 0 & -1.0000 + 0.0000i \end{pmatrix}$$

$$\tilde{\Theta}_{10} = \begin{pmatrix} -0.7071 - 0.7071i & 0 & 0 & 0 \\ 0 & 0.7071 - 0.7071i & 0 & 0 \\ 0 & 0 & -1.0000 + 0.0000i & 0 \\ 0 & 0 & 0 & 1.0000 - 0.0000i \end{pmatrix}$$

$$\tilde{\Theta}_{11} = \begin{pmatrix} -0.3827 - 0.9239i & 0 & 0 & 0 \\ 0 & 0.9239 + 0.3827i & 0 & 0 \\ 0 & 0 & -0.0000 - 1.0000i & 0 \\ 0 & 0 & 0 & -1.0000 + 0.0000i \end{pmatrix}$$

$$\tilde{\Theta}_{12} = \begin{pmatrix} 0.0000 - 1.0000i & 0 & 0 & 0 \\ 0 & 0.0000 + 1.0000i & 0 & 0 \\ 0 & 0 & 1.0000 - 0.0000i & 0 \\ 0 & 0 & 0 & 1.0000 - 0.0000i \end{pmatrix}$$

$$\tilde{\Theta}_{13} = \begin{pmatrix} 0.3827 - 0.9239i & 0 & 0 & 0 \\ 0 & -0.9239 + 0.3827i & 0 & 0 \\ 0 & 0 & 0.0000 + 1.0000i & 0 \\ 0 & 0 & 0 & -1.0000 + 0.0000i \end{pmatrix}$$

-continued $$\tilde{\Theta}_{14} = \begin{bmatrix} 0.7071 - 0.7071i & 0 & 0 & 0 \\ 0 & -0.7071 - 0.7071i & 0 & 0 \\ 0 & 0 & -1.0000 + 0.0000i & 0 \\ 0 & 0 & 0 & 1.0000 - 0.0000i \end{bmatrix}$$

$$\tilde{\Theta}_{15} = \begin{bmatrix} 0.9239 - 0.3827i & 0 & 0 & 0 \\ 0 & 0.3827 - 0.9239i & 0 & 0 \\ 0 & 0 & -0.0000 - 1.0000i & 0 \\ 0 & 0 & 0 & -1.0000 + 0.0000i \end{bmatrix}$$

$$\tilde{\Theta}_{16} = \begin{bmatrix} 1.0000 + 0.0000i & 0 & 0 & 0 \\ 0 & 1.0000 - 0.0000i & 0 & 0 \\ 0 & 0 & 1.0000 - 0.0000i & 0 \\ 0 & 0 & 0 & 1.0000 - 0.0000i \end{bmatrix}$$

(2) Time correlation coefficient=0.7

$$\tilde{\Theta}_1 = \begin{bmatrix} 0.9804 + 0.1970i & 0 & 0 & 0 \\ 0 & 0.8277 + 0.5611i & 0 & 0 \\ 0 & 0 & 0.7000 + 0.7141i & 0 \\ 0 & 0 & 0 & -1.0000 + 0.0000i \end{bmatrix}$$

$$\tilde{\Theta}_2 = \begin{bmatrix} 0.9223 + 0.3865i & 0 & 0 & 0 \\ 0 & 0.3603 + 0.9328i & 0 & 0 \\ 0 & 0 & -1.0000 + 0.0000i & 0 \\ 0 & 0 & 0 & 1.0000 - 0.0000i \end{bmatrix}$$

$$\tilde{\Theta}_3 = \begin{bmatrix} 0.8277 + 0.5611i & 0 & 0 & 0 \\ 0 & 0.1456 - 0.9893i & 0 & 0 \\ 0 & 0 & 0.7000 - 0.7141i & 0 \\ 0 & 0 & 0 & -1.0000 + 0.0000i \end{bmatrix}$$

$$\tilde{\Theta}_4 = \begin{bmatrix} 0.7000 + 0.7141i & 0 & 0 & 0 \\ 0 & 0.7000 - 0.7141i & 0 & 0 \\ 0 & 0 & 1.0000 - 0.0000i & 0 \\ 0 & 0 & 0 & 1.0000 - 0.0000i \end{bmatrix}$$

$$\tilde{\Theta}_5 = \begin{bmatrix} 0.5431 + 0.8397i & 0 & 0 & 0 \\ 0 & 0.9804 - 0.1970i & 0 & 0 \\ 0 & 0 & 0.7000 + 0.7141i & 0 \\ 0 & 0 & 0 & -1.0000 + 0.0000i \end{bmatrix}$$

$$\tilde{\Theta}_6 = \begin{bmatrix} 0.3603 + 0.9328i & 0 & 0 & 0 \\ 0 & 0.9223 + 0.3865i & 0 & 0 \\ 0 & 0 & -1.0000 + 0.000i & 0 \\ 0 & 0 & 0 & 1.0000 - 0.0000i \end{bmatrix}$$

$$\tilde{\Theta}_7 = \begin{bmatrix} 0.1456 + 0.9893i & 0 & 0 & 0 \\ 0 & 0.5431 + 0.8397i & 0 & 0 \\ 0 & 0 & 0.7000 - 0.7141i & 0 \\ 0 & 0 & 0 & -1.0000 + 0.0000i \end{bmatrix}$$

$$\tilde{\Theta}_8 = \begin{bmatrix} -1.0000 - 0.0000i & 0 & 0 & 0 \\ 0 & -1.0000 + 0.0000i & 0 & 0 \\ 0 & 0 & 1.0000 - 0.0000i & 0 \\ 0 & 0 & 0 & 1.0000 - 0.0000i \end{bmatrix}$$

-continued $$\tilde{\Theta}_9 = \begin{pmatrix} 0.1456 - 0.9893i & 0 & 0 & 0 \\ 0 & 0.5431 - 0.8397i & 0 & 0 \\ 0 & 0 & 0.7000 + 0.7141i & 0 \\ 0 & 0 & 0 & -1.0000 + 0.0000i \end{pmatrix}$$

$$\tilde{\Theta}_{10} = \begin{pmatrix} 0.3603 - 0.9328i & 0 & 0 & 0 \\ 0 & 0.9223 - 0.3865i & 0 & 0 \\ 0 & 0 & -1.0000 + 0.0000i & 0 \\ 0 & 0 & 0 & 1.0000 - 0.0000i \end{pmatrix}$$

$$\tilde{\Theta}_{11} = \begin{pmatrix} 0.5431 - 0.8397i & 0 & 0 & 0 \\ 0 & 0.9804 + 0.1970i & 0 & 0 \\ 0 & 0 & 0.7000 - 0.7141i & 0 \\ 0 & 0 & 0 & -1.000 + 0.0000i \end{pmatrix}$$

$$\tilde{\Theta}_{12} = \begin{pmatrix} 0.7000 - 0.7141i & 0 & 0 & 0 \\ 0 & 0.7000 + 0.7141i & 0 & 0 \\ 0 & 0 & 1.0000 - 0.0000i & 0 \\ 0 & 0 & 0 & 1.0000 - 0.0000i \end{pmatrix}$$

$$\tilde{\Theta}_{13} = \begin{pmatrix} 0.8277 - 0.5611i & 0 & 0 & 0 \\ 0 & 0.1456 + 0.9893i & 0 & 0 \\ 0 & 0 & 0.7000 + 0.7141i & 0 \\ 0 & 0 & 0 & -1.0000 + 0.0000i \end{pmatrix}$$

$$\tilde{\Theta}_{14} = \begin{pmatrix} 0.9223 - 0.3865i & 0 & 0 & 0 \\ 0 & 0.3603 - 0.9328i & 0 & 0 \\ 0 & 0 & -1.0000 + 0.0000i & 0 \\ 0 & 0 & 0 & 1.0000 - 0.0000i \end{pmatrix}$$

$$\tilde{\Theta}_{15} = \begin{pmatrix} 0.9804 - 0.1970i & 0 & 0 & 0 \\ 0 & 0.8277 - 0.5611i & 0 & 0 \\ 0 & 0 & 0.7000 - 0.7141i & 0 \\ 0 & 0 & 0 & -1.0000 + 0.0000i \end{pmatrix}$$

$$\tilde{\Theta}_{16} = \begin{pmatrix} 1.0000 + 0.0000i & 0 & 0 & 0 \\ 0 & 1.0000 - 0.0000i & 0 & 0 \\ 0 & 0 & 1.0000 - 0.0000i & 0 \\ 0 & 0 & 0 & 1.0000 - 0.0000i \end{pmatrix}$$

(3) Time correlation coefficient=0.75

$$\tilde{\Theta}_1 = \begin{pmatrix} 0.9831 + 0.1828i & 0 & 0 & 0 \\ 0 & 0.8540 + 0.5203i & 0 & 0 \\ 0 & 0 & 0.7500 + 0.6614i & 0 \\ 0 & 0 & 0 & 1.0000 + 0.0000i \end{pmatrix}$$

$$\tilde{\Theta}_2 = \begin{pmatrix} 0.9335 + 0.3586i & 0 & 0 & 0 \\ 0 & 0.5167 + 0.8561i & 0 & 0 \\ 0 & 0 & 1.0000 + 0.0000i & 0 \\ 0 & 0 & 0 & 1.0000 - 0.0000i \end{pmatrix}$$

$$\tilde{\Theta}_3 = \begin{pmatrix} 0.8540 + 0.5203i & 0 & 0 & 0 \\ 0 & 0.4811 - 0.8767i & 0 & 0 \\ 0 & 0 & 0.7500 - 0.6614i & 0 \\ 0 & 0 & 0 & 1.0000 + 0.0000i \end{pmatrix}$$

$$\tilde{\Theta}_4 = \begin{pmatrix} 0.7500 + 0.6614i & 0 & 0 & 0 \\ 0 & 0.7500 - 0.6614i & 0 & 0 \\ 0 & 0 & 1.0000 - 0.0000i & 0 \\ 0 & 0 & 0 & 1.0000 - 0.0000i \end{pmatrix}$$

$$\tilde{\Theta}_5 = \begin{pmatrix} 0.6309+0.7759i & 0 & 0 & 0 \\ 0 & 0.9831-0.1828i & 0 & 0 \\ 0 & 0 & 0.7500+0.6614i & 0 \\ 0 & 0 & 0 & 1.0000+0.0000i \end{pmatrix}$$

$$\tilde{\Theta}_6 = \begin{pmatrix} 0.5167+0.8561i & 0 & 0 & 0 \\ 0 & 0.9335+0.3586i & 0 & 0 \\ 0 & 0 & 1.0000+0.0000i & 0 \\ 0 & 0 & 0 & 1.0000-0.0000i \end{pmatrix}$$

$$\tilde{\Theta}_7 = \begin{pmatrix} 0.4811+0.8767i & 0 & 0 & 0 \\ 0 & 0.6309+0.7759i & 0 & 0 \\ 0 & 0 & 0.7500-0.6614i & 0 \\ 0 & 0 & 0 & 1.0000+0.0000i \end{pmatrix}$$

$$\tilde{\Theta}_8 = \begin{pmatrix} 1.0000-0.0000i & 0 & 0 & 0 \\ 0 & 1.0000+0.0000i & 0 & 0 \\ 0 & 0 & 1.0000-0.0000i & 0 \\ 0 & 0 & 0 & 1.0000-0.0000i \end{pmatrix}$$

$$\tilde{\Theta}_9 = \begin{pmatrix} 0.4811-0.8767i & 0 & 0 & 0 \\ 0 & 0.6309-0.7759i & 0 & 0 \\ 0 & 0 & 0.7500+0.6614i & 0 \\ 0 & 0 & 0 & 1.0000+0.0000i \end{pmatrix}$$

$$\tilde{\Theta}_{10} = \begin{pmatrix} 0.5167-0.8561i & 0 & 0 & 0 \\ 0 & 0.9335-0.3586i & 0 & 0 \\ 0 & 0 & 1.0000+0.0000i & 0 \\ 0 & 0 & 0 & 1.0000-0.0000i \end{pmatrix}$$

$$\tilde{\Theta}_{11} = \begin{pmatrix} 0.6309-0.7759i & 0 & 0 & 0 \\ 0 & 0.9831+0.1828i & 0 & 0 \\ 0 & 0 & 0.7500-0.6614i & 0 \\ 0 & 0 & 0 & 1.0000+0.0000i \end{pmatrix}$$

$$\tilde{\Theta}_{12} = \begin{pmatrix} 0.7500-0.6614i & 0 & 0 & 0 \\ 0 & 0.7500+0.6614i & 0 & 0 \\ 0 & 0 & 1.000-0.0000i & 0 \\ 0 & 0 & 0 & 1.0000-0.0000i \end{pmatrix}$$

$$\tilde{\Theta}_{13} = \begin{pmatrix} 0.8540-0.5203i & 0 & 0 & 0 \\ 0 & 0.4811+0.8767i & 0 & 0 \\ 0 & 0 & 0.7500+0.6614i & 0 \\ 0 & 0 & 0 & 1.000+0.0000i \end{pmatrix}$$

$$\tilde{\Theta}_{14} = \begin{pmatrix} 0.9335-0.3586i & 0 & 0 & 0 \\ 0 & 0.5167-0.8561i & 0 & 0 \\ 0 & 0 & 1.0000+0.0000i & 0 \\ 0 & 0 & 0 & 1.0000-0.0000i \end{pmatrix}$$

$$\tilde{\Theta}_{15} = \begin{pmatrix} 0.9831-0.1828i & 0 & 0 & 0 \\ 0 & 0.8540-0.5203i & 0 & 0 \\ 0 & 0 & 0.7500-0.6614i & 0 \\ 0 & 0 & 0 & 1.0000+0.0000i \end{pmatrix}$$

$$\tilde{\Theta}_{16} = \begin{pmatrix} 1.0000+0.0000i & 0 & 0 & 0 \\ 0 & 1.0000-0.0000i & 0 & 0 \\ 0 & 0 & 1.0000-0.0000i & 0 \\ 0 & 0 & 0 & 1.0000-0.0000i \end{pmatrix}$$

(4) Time correlation coefficient=0.8

$$\tilde{\Theta}_1 = \begin{pmatrix} 0.9859+0.1672i & 0 & 0 & 0 \\ 0 & 0.8805+0.4740i & 0 & 0 \\ 0 & 0 & 0.8000+0.6000i & 0 \\ 0 & 0 & 0 & 1.0000+0.0000i \end{pmatrix}$$

$$\tilde{\Theta}_2 = \begin{pmatrix} 0.9449+0.3274i & 0 & 0 & 0 \\ 0 & 0.6630+0.7486i & 0 & 0 \\ 0 & 0 & 1.0000+0.0000i & 0 \\ 0 & 0 & 0 & 1.0000-0.0000i \end{pmatrix}$$

$$\tilde{\Theta}_3 = \begin{pmatrix} 0.8805+0.4740i & 0 & 0 & 0 \\ 0 & 0.7306-0.6828i & 0 & 0 \\ 0 & 0 & 0.8000-0.6000i & 0 \\ 0 & 0 & 0 & 1.0000+0.0000i \end{pmatrix}$$

$$\tilde{\Theta}_4 = \begin{pmatrix} 0.8000+0.6000i & 0 & 0 & 0 \\ 0 & 0.8000-0.6000i & 0 & 0 \\ 0 & 0 & 1.0000-0.0000i & 0 \\ 0 & 0 & 0 & 1.0000-0.0000i \end{pmatrix}$$

$$\tilde{\Theta}_5 = \begin{pmatrix} 0.7171+0.6969i & 0 & 0 & 0 \\ 0 & 0.9859-0.1672i & 0 & 0 \\ 0 & 0 & 0.8000+0.6000i & 0 \\ 0 & 0 & 0 & 1.0000-0.0000i \end{pmatrix}$$

-continued $$\tilde{\Theta}_6 = \begin{pmatrix} 0.6630+0.7486i & 0 & 0 & 0 \\ 0 & 0.9449+0.3274i & 0 & 0 \\ 0 & 0 & 1.0000+0.0000i & 0 \\ 0 & 0 & 0 & 1.0000-0.0000i \end{pmatrix}$$

$$\tilde{\Theta}_7 = \begin{pmatrix} 0.7306+0.6828i & 0 & 0 & 0 \\ 0 & 0.7171+0.6969i & 0 & 0 \\ 0 & 0 & 0.8000-0.6000i & 0 \\ 0 & 0 & 0 & 1.0000+0.0000i \end{pmatrix}$$

$$\tilde{\Theta}_8 = \begin{pmatrix} 1.0000-0.0000i & 0 & 0 & 0 \\ 0 & 1.0000+0.0000i & 0 & 0 \\ 0 & 0 & 1.0000-0.0000i & 0 \\ 0 & 0 & 0 & 1.0000-0.0000i \end{pmatrix}$$

$$\tilde{\Theta}_9 = \begin{pmatrix} 0.7306-0.6828i & 0 & 0 & 0 \\ 0 & 0.7171-0.6969i & 0 & 0 \\ 0 & 0 & 0.8000+0.6000i & 0 \\ 0 & 0 & 0 & 1.0000+0.0000i \end{pmatrix}$$

$$\tilde{\Theta}_{10} = \begin{pmatrix} 0.6630-0.7486i & 0 & 0 & 0 \\ 0 & 0.9449-0.3274i & 0 & 0 \\ 0 & 0 & 1.0000+0.0000i & 0 \\ 0 & 0 & 0 & 1.0000-0.0000i \end{pmatrix}$$

$$\tilde{\Theta}_{11} = \begin{pmatrix} 0.7171-0.6969i & 0 & 0 & 0 \\ 0 & 0.9859+0.1672i & 0 & 0 \\ 0 & 0 & 0.8000-0.6000i & 0 \\ 0 & 0 & 0 & 1.0000+0.0000i \end{pmatrix}$$

$$\tilde{\Theta}_{12} = \begin{pmatrix} 0.8000-0.6000i & 0 & 0 & 0 \\ 0 & 0.8000+0.6000i & 0 & 0 \\ 0 & 0 & 1.0000-0.0000i & 0 \\ 0 & 0 & 0 & 1.0000-0.0000i \end{pmatrix}$$

$$\tilde{\Theta}_{13} = \begin{pmatrix} 0.8805-0.4740i & 0 & 0 & 0 \\ 0 & 0.7306+0.6828i & 0 & 0 \\ 0 & 0 & 0.8000+0.6000i & 0 \\ 0 & 0 & 0 & 1.0000+0.0000i \end{pmatrix}$$

$$\tilde{\Theta}_{14} = \begin{pmatrix} 0.9449-0.3274i & 0 & 0 & 0 \\ 0 & 0.6630-0.7486i & 0 & 0 \\ 0 & 0 & 1.0000+0.0000i & 0 \\ 0 & 0 & 0 & 1.0000-0.0000i \end{pmatrix}$$

$$\tilde{\Theta}_{15} = \begin{pmatrix} 0.9859-0.1672i & 0 & 0 & 0 \\ 0 & 0.8805-0.4740i & 0 & 0 \\ 0 & 0 & 0.8000-0.6000i & 0 \\ 0 & 0 & 0 & 1.0000+0.0000i \end{pmatrix}$$

$$\tilde{\Theta}_{16} = \begin{pmatrix} 1.0000+0.0000i & 0 & 0 & 0 \\ 0 & 1.0000-0.0000i & 0 & 0 \\ 0 & 0 & 1.0000-0.0000i & 0 \\ 0 & 0 & 0 & 1.0000-0.0000i \end{pmatrix}$$

(5) Time correlation coefficient=0.85

$$\tilde{\Theta}_1 = \begin{pmatrix} 0.9888+0.1491i & 0 & 0 & 0 \\ 0 & 0.9075+0.4200i & 0 & 0 \\ 0 & 0 & 0.8500+0.5268i & 0 \\ 0 & 0 & 0 & 1.0000+0.0000i \end{pmatrix}$$

$$\tilde{\Theta}_2 = \begin{pmatrix} 0.9566+0.2915i & 0 & 0 & 0 \\ 0 & 0.7885+0.6151i & 0 & 0 \\ 0 & 0 & 1.0000+0.0000i & 0 \\ 0 & 0 & 0 & 1.0000-0.0000i \end{pmatrix}$$

$$\tilde{\Theta}_3 = \begin{pmatrix} 0.9075+0.4200i & 0 & 0 & 0 \\ 0 & 0.8744-0.4852i & 0 & 0 \\ 0 & 0 & 0.8500-0.5268i & 0 \\ 0 & 0 & 0 & 1.0000+0.0000i \end{pmatrix}$$

$$\tilde{\Theta}_4 = \begin{pmatrix} 0.8500+0.5268i & 0 & 0 & 0 \\ 0 & 0.8500-0.5268i & 0 & 0 \\ 0 & 0 & 1.0000-0.0000i & 0 \\ 0 & 0 & 0 & 1.0000-0.0000i \end{pmatrix}$$

$$\tilde{\Theta}_5 = \begin{pmatrix} 0.7998+0.6003i & 0 & 0 & 0 \\ 0 & 0.9888-0.1491i & 0 & 0 \\ 0 & 0 & 0.8500+0.5268i & 0 \\ 0 & 0 & 0 & 1.0000+0.0000i \end{pmatrix}$$

$$\tilde{\Theta}_6 = \begin{pmatrix} 0.7885+0.6151i & 0 & 0 & 0 \\ 0 & 0.9566+.02915i & 0 & 0 \\ 0 & 0 & 1.0000+0.0000i & 0 \\ 0 & 0 & 0 & 1.0000-0.0000i \end{pmatrix}$$

$$\tilde{\Theta}_7 = \begin{pmatrix} 0.8744+0.4852i & 0 & 0 & 0 \\ 0 & 0.7998+0.6003i & 0 & 0 \\ 0 & 0 & 0.8500-0.5268i & 0 \\ 0 & 0 & 0 & 1.0000+0.0000i \end{pmatrix}$$

$$\tilde{\Theta}_8 = \begin{pmatrix} 1.0000-0.0000i & 0 & 0 & 0 \\ 0 & 1.0000+0.0000i & 0 & 0 \\ 0 & 0 & 1.0000-0.0000i & 0 \\ 0 & 0 & 0 & 1.0000-0.0000i \end{pmatrix}$$

$$\tilde{\Theta}_9 = \begin{pmatrix} 0.8744-0.4852i & 0 & 0 & 0 \\ 0 & 0.7998-0.6003i & 0 & 0 \\ 0 & 0 & 0.8500+0.5268i & 0 \\ 0 & 0 & 0 & 1.0000+0.0000i \end{pmatrix}$$

$$\tilde{\Theta}_{10} = \begin{pmatrix} 0.7885-0.6151i & 0 & 0 & 0 \\ 0 & 0.9566-0.29151i & 0 & 0 \\ 0 & 0 & 1.0000+0.0000i & 0 \\ 0 & 0 & 0 & 1.0000-0.0000i \end{pmatrix}$$

$$\tilde{\Theta}_{11} = \begin{pmatrix} 0.7998-0.6003i & 0 & 0 & 0 \\ 0 & 0.9888+0.1491i & 0 & 0 \\ 0 & 0 & 0.8500-0.5268i & 0 \\ 0 & 0 & 0 & 1.0000+0.0000i \end{pmatrix}$$

$$\tilde{\Theta}_{12} = \begin{pmatrix} 0.8500-0.5268i & 0 & 0 & 0 \\ 0 & 0.8500+0.5268i & 0 & 0 \\ 0 & 0 & 1.0000-0.0000i & 0 \\ 0 & 0 & 0 & 1.0000-0.0000i \end{pmatrix}$$

$$\tilde{\Theta}_{13} = \begin{pmatrix} 0.9075-0.4200i & 0 & 0 & 0 \\ 0 & 0.8744+0.4852i & 0 & 0 \\ 0 & 0 & 0.8500+0.5268i & 0 \\ 0 & 0 & 0 & 1.0000+0.0000i \end{pmatrix}$$

$$\tilde{\Theta}_{14} = \begin{pmatrix} 0.9566-0.2915i & 0 & 0 & 0 \\ 0 & 0.7885-0.6151i & 0 & 0 \\ 0 & 0 & 1.0000+0.0000i & 0 \\ 0 & 0 & 0 & 1.0000-0.0000i \end{pmatrix}$$

$$\tilde{\Theta}_{15} = \begin{pmatrix} 0.9888-0.1491i & 0 & 0 & 0 \\ 0 & 0.9075-0.4200i & 0 & 0 \\ 0 & 0 & 0.8500-0.5268i & 0 \\ 0 & 0 & 0 & 1.0000+0.0000i \end{pmatrix}$$

$$\tilde{\Theta}_{16} = \begin{pmatrix} 1.0000+0.0000i & 0 & 0 & 0 \\ 0 & 1.0000-0.0000i & 0 & 0 \\ 0 & 0 & 1.0000-0.0000i & 0 \\ 0 & 0 & 0 & 1.0000-0.0000i \end{pmatrix}$$

(6) Time correlation coefficient=0.9

$$\tilde{\Theta}_1 = \begin{pmatrix} 0.9919+0.1270i & 0 & 0 & 0 \\ 0 & 0.9356+0.3532i & 0 & 0 \\ 0 & 0 & 0.9000+0.4359i & 0 \\ 0 & 0 & 0 & 1.0000+0.0000i \end{pmatrix}$$

$$\tilde{\Theta}_2 = \begin{pmatrix} 0.9690+0.2472i & 0 & 0 & 0 \\ 0 & 0.8869+0.4619i & 0 & 0 \\ 0 & 0 & 1.0000+0.0000i & 0 \\ 0 & 0 & 0 & 1.0000-0.0000i \end{pmatrix}$$

$$\tilde{\Theta}_3 = \begin{pmatrix} 0.9356+0.3532i & 0 & 0 & 0 \\ 0 & 0.9481-0.3180i & 0 & 0 \\ 0 & 0 & 0.9000-0.4359i & 0 \\ 0 & 0 & 0 & 1.0000+0.0000i \end{pmatrix}$$

$$\tilde{\Theta}_4 = \begin{pmatrix} 0.9000+0.4359i & 0 & 0 & 0 \\ 0 & 0.9000-0.4359i & 0 & 0 \\ 0 & 0 & 1.0000-0.0000i & 0 \\ 0 & 0 & 0 & 1.0000-0.0000i \end{pmatrix}$$

$$\tilde{\Theta}_5 = \begin{pmatrix} 0.8765+0.4814i & 0 & 0 & 0 \\ 0 & 0.9919-0.1270i & 0 & 0 \\ 0 & 0 & 0.9000+0.4359i & 0 \\ 0 & 0 & 0 & 1.0000+0.0000i \end{pmatrix}$$

$$\tilde{\Theta}_6 = \begin{pmatrix} 0.8869+0.4619i & 0 & 0 & 0 \\ 0 & 0.9690+.02472i & 0 & 0 \\ 0 & 0 & 1.0000+0.0000i & 0 \\ 0 & 0 & 0 & 1.0000-0.0000i \end{pmatrix}$$

$\tilde{\Theta}_7 =$
$$\begin{pmatrix} 0.9481 + 0.3180i & 0 & 0 & 0 \\ 0 & 0.8765 + 0.4814i & 0 & 0 \\ 0 & 0 & 0.9000 - 0.4359i & 0 \\ 0 & 0 & 0 & 1.0000 + 0.0000i \end{pmatrix}$$

$\tilde{\Theta}_8 =$
$$\begin{pmatrix} 1.0000 - 0.0000i & 0 & 0 & 0 \\ 0 & 1.0000 + 0.0000i & 0 & 0 \\ 0 & 0 & 1.0000 - 0.0000i & 0 \\ 0 & 0 & 0 & 1.0000 - 0.0000i \end{pmatrix}$$

$\tilde{\Theta}_9 =$
$$\begin{pmatrix} 0.9481 - 0.3180i & 0 & 0 & 0 \\ 0 & 0.8765 - 0.4814i & 0 & 0 \\ 0 & 0 & 0.9000 + 0.4359i & 0 \\ 0 & 0 & 0 & 1.0000 + 0.0000i \end{pmatrix}$$

$\tilde{\Theta}_{10} =$
$$\begin{pmatrix} 0.8869 - 0.4619i & 0 & 0 & 0 \\ 0 & 0.9690 - 0.2472i & 0 & 0 \\ 0 & 0 & 1.0000 + 0.0000i & 0 \\ 0 & 0 & 0 & 1.0000 - 0.0000i \end{pmatrix}$$

$\tilde{\Theta}_{11} =$
$$\begin{pmatrix} 0.8765 - 0.4814i & 0 & 0 & 0 \\ 0 & 0.9919 + 0.1270i & 0 & 0 \\ 0 & 0 & 0.9000 - 0.4359i & 0 \\ 0 & 0 & 0 & 1.0000 + 0.0000i \end{pmatrix}$$

$\tilde{\Theta}_{12} =$
$$\begin{pmatrix} 0.9000 - 0.4359i & 0 & 0 & 0 \\ 0 & 0.9000 + 0.4359i & 0 & 0 \\ 0 & 0 & 1.0000 - 0.0000i & 0 \\ 0 & 0 & 0 & 1.0000 - 0.0000i \end{pmatrix}$$

$\tilde{\Theta}_{13} =$
$$\begin{pmatrix} 0.9356 - 0.3532i & 0 & 0 & 0 \\ 0 & 0.9481 + 0.3180i & 0 & 0 \\ 0 & 0 & 0.9000 + 0.4359i & 0 \\ 0 & 0 & 0 & 1.0000 + 0.0000i \end{pmatrix}$$

$\tilde{\Theta}_{14} =$
$$\begin{pmatrix} 0.9690 - 0.2472i & 0 & 0 & 0 \\ 0 & 0.8869 - 0.4619i & 0 & 0 \\ 0 & 0 & 1.0000 + 0.0000i & 0 \\ 0 & 0 & 0 & 1.0000 - 0.0000i \end{pmatrix}$$

$\tilde{\Theta}_{15} =$
$$\begin{pmatrix} 0.9919 - 0.1270i & 0 & 0 & 0 \\ 0 & 0.9356 - 0.3532i & 0 & 0 \\ 0 & 0 & 0.9000 - 0.4359i & 0 \\ 0 & 0 & 0 & 1.0000 + 0.0000i \end{pmatrix}$$

$\tilde{\Theta}_{16} =$
$$\begin{pmatrix} 1.0000 + 0.0000i & 0 & 0 & 0 \\ 0 & 1.0000 - 0.0000i & 0 & 0 \\ 0 & 0 & 1.0000 - 0.0000i & 0 \\ 0 & 0 & 0 & 1.0000 - 0.0000i \end{pmatrix}$$

(7) Time correlation coefficient=0.95

$\tilde{\Theta}_1 =$
$$\begin{pmatrix} 0.9954 + 0.0960i & 0 & 0 & 0 \\ 0 & 0.9655 + 0.2604i & 0 & 0 \\ 0 & 0 & 0.9500 + 0.3122i & 0 \\ 0 & 0 & 0 & 1.0000 + 0.0000i \end{pmatrix}$$

$\tilde{\Theta}_2 =$
$$\begin{pmatrix} 0.9827 + 0.1853i & 0 & 0 & 0 \\ 0 & 0.9571 + 0.2898i & 0 & 0 \\ 0 & 0 & 1.0000 + 0.0000i & 0 \\ 0 & 0 & 0 & 1.0000 - 0.0000i \end{pmatrix}$$

$\tilde{\Theta}_3 =$
$$\begin{pmatrix} 0.9655 + 0.2604i & 0 & 0 & 0 \\ 0 & 0.9841 - 0.1778i & 0 & 0 \\ 0 & 0 & 0.9500 - 0.3122i & 0 \\ 0 & 0 & 0 & 1.0000 + 0.0000i \end{pmatrix}$$

$\tilde{\Theta}_4 =$
$$\begin{pmatrix} 0.9500 + 0.3122i & 0 & 0 & 0 \\ 0 & 0.9500 - 0.3122i & 0 & 0 \\ 0 & 0 & 1.0000 - 0.0000i & 0 \\ 0 & 0 & 0 & 1.0000 - 0.0000i \end{pmatrix}$$

$\tilde{\Theta}_5 =$
$$\begin{pmatrix} 0.9446 + 0.3281i & 0 & 0 & 0 \\ 0 & 0.9954 - 0.0960i & 0 & 0 \\ 0 & 0 & 0.9500 + 0.3122i & 0 \\ 0 & 0 & 0 & 1.0000 + 0.0000i \end{pmatrix}$$

$\tilde{\Theta}_6 =$
$$\begin{pmatrix} 0.9571 + 0.2898i & 0 & 0 & 0 \\ 0 & 0.9827 + 0.1853i & 0 & 0 \\ 0 & 0 & 1.0000 + 0.0000i & 0 \\ 0 & 0 & 0 & 1.0000 - 0.0000i \end{pmatrix}$$

$\tilde{\Theta}_7 =$
$$\begin{pmatrix} 0.9841 + 0.1778i & 0 & 0 & 0 \\ 0 & 0.9446 + 0.3281i & 0 & 0 \\ 0 & 0 & 0.9500 - 0.3122i & 0 \\ 0 & 0 & 0 & 1.0000 + 0.0000i \end{pmatrix}$$

-continued $$\tilde{\Theta}_8 = \begin{pmatrix} 1.0000 - 0.0000i & 0 & 0 & 0 \\ 0 & 1.0000 + 0.0000i & 0 & 0 \\ 0 & 0 & 1.0000 - 0.0000i & 0 \\ 0 & 0 & 0 & 1.0000 - 0.0000i \end{pmatrix}$$

$$\tilde{\Theta}_9 = \begin{pmatrix} 0.9841 - 0.1778i & 0 & 0 & 0 \\ 0 & 0.9446 - 0.3281i & 0 & 0 \\ 0 & 0 & 0.9500 + 0.3122i & 0 \\ 0 & 0 & 0 & 1.0000 + 0.0000i \end{pmatrix}$$

$$\tilde{\Theta}_{10} = \begin{pmatrix} 0.9571 - 0.2898i & 0 & 0 & 0 \\ 0 & 0.9827 - 0.1853i & 0 & 0 \\ 0 & 0 & 1.0000 + 0.0000i & 0 \\ 0 & 0 & 0 & 1.0000 - 0.0000i \end{pmatrix}$$

$$\tilde{\Theta}_{11} = \begin{pmatrix} 0.9446 - 0.3281i & 0 & 0 & 0 \\ 0 & 0.9954 + 0.0960i & 0 & 0 \\ 0 & 0 & 0.9500 - 0.3122i & 0 \\ 0 & 0 & 0 & 1.0000 + 0.0000i \end{pmatrix}$$

$$\tilde{\Theta}_{12} = \begin{pmatrix} 0.9500 - 0.3122i & 0 & 0 & 0 \\ 0 & 0.9500 + 0.3122i & 0 & 0 \\ 0 & 0 & 1.0000 - 0.0000i & 0 \\ 0 & 0 & 0 & 1.0000 - 0.0000i \end{pmatrix}$$

$$\tilde{\Theta}_{13} = \begin{pmatrix} 0.9655 - 0.2604i & 0 & 0 & 0 \\ 0 & 0.9841 + 0.1778i & 0 & 0 \\ 0 & 0 & 0.9500 + 0.3122i & 0 \\ 0 & 0 & 0 & 1.0000 + 0.0000i \end{pmatrix}$$

$$\tilde{\Theta}_{14} = \begin{pmatrix} 0.9827 - 0.1853i & 0 & 0 & 0 \\ 0 & 0.9571 - 0.2898i & 0 & 0 \\ 0 & 0 & 1.0000 + 0.0000i & 0 \\ 0 & 0 & 0 & 1.0000 - 0.0000i \end{pmatrix}$$

$$\tilde{\Theta}_{15} = \begin{pmatrix} 0.9954 - 0.0960i & 0 & 0 & 0 \\ 0 & 0.9655 - 0.2604i & 0 & 0 \\ 0 & 0 & 0.9500 - 0.3122i & 0 \\ 0 & 0 & 0 & 1.0000 + 0.0000i \end{pmatrix}$$

$$\tilde{\Theta}_{16} = \begin{pmatrix} 1.0000 + 0.0000i & 0 & 0 & 0 \\ 0 & 1.0000 - 0.0000i & 0 & 0 \\ 0 & 0 & 1.0000 - 0.0000i & 0 \\ 0 & 0 & 0 & 1.0000 - 0.0000i \end{pmatrix}$$

3) Where $N_t=2$, the number of feedback bits $B=3$, $\{\theta\}=\{\Theta_1, \ldots, \Theta_{2^B}\}$ includes full unitary matrices, and the first scheme, that is, the above Equation 14 or the above Equation 15 is used, examples of the codebook $\{\tilde{\theta}\}=\{\tilde{\Theta}_1, \ldots, \tilde{\Theta}_{2^B}\}$ that is updated according to the time correlation coefficient may follow as:

(1) Time correlation coefficient=0

$$\tilde{\Theta}_1 = \begin{pmatrix} -0.0136 + 0.6753i & 0.7368 - 0.0288i \\ -0.7276 + 0.1198i & -0.1489 - 0.6588i \end{pmatrix}$$

$$\tilde{\Theta}_2 = \begin{pmatrix} -0.6021 + 0.6871i & 0.0081 + 0.4065i \\ -0.0729 + 0.4000i & -0.4847 - 0.7744i \end{pmatrix}$$

$$\tilde{\Theta}_3 = \begin{pmatrix} -0.0877 - 0.9095i & 0.3790 + 0.1464i \\ -0.3929 - 0.1035i & -0.6041 + 0.6856i \end{pmatrix}$$

$$\tilde{\Theta}_4 = \begin{pmatrix} -0.7424 + 0.3706i & 0.2022 - 0.5202i \\ 0.3856 - 0.4035i & 0.0213 - 0.8295i \end{pmatrix}$$

$$\tilde{\Theta}_5 = \begin{pmatrix} -0.2839 + 0.0675i & 0.7744 + 0.5614i \\ 0.6104 + 0.7363i & -0.2582 - 0.1359i \end{pmatrix}$$

$$\tilde{\Theta}_6 = \begin{pmatrix} -0.4786 + 0.1916i & 0.8547 + 0.0614i \\ -0.0827 + 0.8529i & -0.2692 + 0.4397i \end{pmatrix}$$

$$\tilde{\Theta}_7 = \begin{pmatrix} -0.1309 - 0.8846i & -0.4081 - 0.1838i \\ 0.1516 + 0.4211i & -0.8718 - 0.1992i \end{pmatrix}$$

$$\tilde{\Theta}_8 = \begin{pmatrix} -0.0707 + 0.9650i & -0.0601 - 0.2455i \\ -0.1422 + 0.2090i & -0.2711 + 0.9288i \end{pmatrix}$$

(2) Time correlation coefficient=0.7

$$\tilde{\Theta}_1 = \begin{pmatrix} 0.6945 + 0.4645i & 0.5495 + 0.0057i \\ -0.5460 + 0.0624i & 0.6429 - 0.5336i \end{pmatrix}$$

$$\tilde{\Theta}_2 = \begin{pmatrix} 0.4276 + 0.7949i & 0.0251 + 0.4298i \\ -0.0609 + 0.4262i & 0.4926 - 0.7563i \end{pmatrix}$$

$$\tilde{\Theta}_3 = \begin{pmatrix} 0.6647 - 0.6524i & 0.3554 + 0.0784i \\ -0.3619 - 0.0386i & 0.4228 + 0.8299i \end{pmatrix}$$

$$\tilde{\Theta}_4 = \begin{pmatrix} 0.2975 + 0.7951i & 0.0529 - 0.5259i \\ 0.2498 - 0.4658i & 0.6908 - 0.4934i \end{pmatrix}$$

$$\tilde{\Theta}_5 = \begin{pmatrix} 0.5853 + 0.1239i & -0.6188 + 0.5091i \\ 0.5481 + 0.5845i & 0.5964 - 0.0475i \end{pmatrix}$$

$$\tilde{\Theta}_6 = \begin{pmatrix} 0.3849 - 0.3268i & 0.7954 + 0.3352i \\ -0.3550 + 0.7868i & 0.5044 - 0.0223i \end{pmatrix}$$

$$\tilde{\Theta}_7 = \begin{pmatrix} 0.5859 - 0.7498i & -0.0341 - 0.3057i \\ -0.1961 + 0.2370i & -0.0789 - 0.9482i \end{pmatrix}$$

$$\tilde{\Theta}_8 = \begin{pmatrix} 0.6661 + 0.7343i & -0.1167 - 0.0590i \\ 0.0342 + 0.1262i & 0.5844 + 0.8009i \end{pmatrix}$$

(3) Time correlation coefficient=0.75

$$\tilde{\Theta}_1 = \begin{pmatrix} 0.7458 + 0.4303i & 0.5085 + 0.0094i \\ -0.5057 + 0.0537i & 0.7054 - 0.4937i \end{pmatrix}$$

$$\tilde{\Theta}_2 = \begin{pmatrix} 0.5543 + 0.7317i & 0.0282 + 0.3957i \\ -0.0511 + 0.3934i & 0.5959 - 0.6982i \end{pmatrix}$$

$$\tilde{\Theta}_3 = \frac{0.7233 - 0.6044i \quad 0.3287 + 0.0596i}{-0.3332 - 0.0229i \quad 0.5528 + 0.7635i}$$

$$\tilde{\Theta}_4 = \frac{0.5082 + 0.7201i \quad 0.0038 - 0.4725i}{0.1840 - 0.4352i \quad 0.7523 - 0.4592i}$$

$$\tilde{\Theta}_5 = \frac{0.6624 + 0.1139i \quad -0.5658 + 0.4776i}{0.5132 + 0.5337i \quad 0.6707 - 0.0446i}$$

$$\tilde{\Theta}_6 = \frac{0.6176 - 0.2742i \quad 0.6233 + 0.3935i}{-0.4090 + 0.6132i \quad 0.6758 - 0.0011i}$$

$$\tilde{\Theta}_7 = \frac{0.7615 - 0.6455i \quad -0.0299 + 0.0507i}{0.0573 - 0.0137i \quad 0.8405 - 0.5387i}$$

$$\tilde{\Theta}_8 = \frac{0.7257 + 0.6795i \quad -0.1001 - 0.0397i}{0.0375 + 0.1009i \quad 0.6637 + 0.7402i}$$

(4) Time correlation coefficient=0.8

$$\tilde{\Theta}_1 = \frac{0.7970 + 0.3909i \quad 0.4602 + 0.0124i}{-0.4582 + 0.0447i \quad 0.7676 - 0.4459i}$$

$$\tilde{\Theta}_2 = \frac{0.6756 + 0.6474i \quad 0.0295 + 0.3516i}{-0.0410 + 0.3504i \quad 0.6965 - 0.6248i}$$

$$\tilde{\Theta}_3 = \frac{0.7814 - 0.5487i \quad 0.2943 + 0.0417i}{-0.2971 - 0.0089i \quad 0.6767 + 0.6736i}$$

$$\tilde{\Theta}_4 = \frac{0.6909 + 0.5994i \quad -0.0321 - 0.4029i}{0.1242 - 0.3846i \quad 0.8105 - 0.4238i}$$

$$\tilde{\Theta}_5 = \frac{0.7385 + 0.1002i \quad -0.5038 + 0.4367i}{0.4685 + 0.4745i \quad 0.7440 - 0.0426i}$$

$$\tilde{\Theta}_6 = \frac{0.7863 - 0.1721i \quad 0.4547 + 0.3811i}{-0.3923 + 0.4451i \quad 0.8033 + 0.0521i}$$

$$\tilde{\Theta}_7 = \frac{0.8203 - 0.5564i \quad -0.0878 + 0.0991i}{0.1323 - 0.0058i \quad 0.9488 - 0.2868i}$$

$$\tilde{\Theta}_8 = \frac{0.7847 + 0.6142i \quad -0.0801 - 0.0229i}{0.0366 + 0.0749i \quad 0.7416 + 0.6657i}$$

(5) Time correlation coefficient=0.85

$$\tilde{\Theta}_1 = \frac{0.8482 + 0.3441i \quad 0.4025 + 0.0144i}{-0.4012 + 0.0355i \quad 0.8290 - 0.3881i}$$

$$\tilde{\Theta}_2 = \frac{0.7852 + 0.5424i \quad 0.0283 + 0.2973i}{-0.0314 + 0.2970i \quad 0.7907 - 0.5344i}$$

$$\tilde{\Theta}_3 = \frac{0.8386 - 0.4823i \quad 0.2519 + 0.0263i}{-0.2532 + 0.0017i \quad 0.7877 + 0.5616i}$$

$$\tilde{\Theta}_4 = \frac{0.8263 + 0.4568i \quad -0.0498 - 0.3256i}{0.0784 - 0.3200i \quad 0.8635 - 0.3820i}$$

$$\tilde{\Theta}_5 = \frac{0.8121 + 0.0827i \quad -0.4314 + 0.3840i}{0.4112 + 0.4056i \quad 0.8153 - 0.0411i}$$

$$\tilde{\Theta}_6 = \frac{0.8840 - 0.0781i \quad 0.3266 + 0.3253i}{-0.3334 + 0.3184i \quad 0.8821 + 0.0966i}$$

$$\tilde{\Theta}_7 = \frac{0.8670 - 0.4787i \quad -0.1019 + 0.0943i}{0.1386 + 0.0077i \quad 0.9730 - 0.1841i}$$

$$\tilde{\Theta}_8 = \frac{0.8424 + 0.5356i \quad -0.0576 - 0.0100i}{0.0311 + 0.0495i \quad 0.8162 + 0.5748i}$$

(6) Time correlation coefficient=0.9

$$\tilde{\Theta}_1 = \frac{0.8991 + 0.2860i \quad 0.3310 + 0.0149i}{-0.3303 + 0.0262i \quad 0.8889 - 0.3164i}$$

$$\tilde{\Theta}_2 = \frac{0.8780 + 0.4179i \quad 0.0241 + 0.2322i}{-0.0225 + 0.2323i \quad 0.8751 - 0.4239i}$$

$$\tilde{\Theta}_3 = \frac{0.8945 - 0.3994i \quad 0.2004 + 0.0145i}{-0.2008 + 0.0077i \quad 0.8804 + 0.4295i}$$

$$\tilde{\Theta}_4 = \frac{0.9156 + 0.3141i \quad -0.0505 - 0.2460i}{0.0473 - 0.2466i \quad 0.9114 - 0.3260i}$$

$$\tilde{\Theta}_5 = \frac{0.8817 + 0.0616i \quad -0.3454 + 0.3154i}{0.3371 + 0.3243i \quad 0.8830 - 0.0386i}$$

$$\tilde{\Theta}_6 = \frac{0.9394 - 0.0135i \quad 0.2318 + 0.2523i}{-0.2580 + 0.2254i \quad 0.9323 + 0.1162i}$$

$$\tilde{\Theta}_7 = \frac{0.9118 - 0.3918i \quad -0.0969 + 0.0762i}{0.1222 + 0.0167i \quad 0.9847 - 0.1234i}$$

$$\tilde{\Theta}_8 = \frac{0.8980 + 0.4387i \quad -0.0340 - 0.0017i}{0.0215 + 0.0264i \quad 0.8856 + 0.4632i}$$

(7) Time correlation coefficient=0.95

$$\tilde{\Theta}_1 = \frac{0.9498 + 0.2064i \quad 0.2347 + 0.0128i}{-0.2345 + 0.0164i \quad 0.9465 - 0.2211i}$$

$$\tilde{\Theta}_2 = \frac{0.9505 + 0.2699i \quad 0.0165 + 0.1528i}{-0.0142 + 0.1530i \quad 0.9463 - 0.2844i}$$

$$\tilde{\Theta}_3 = \frac{0.9485 - 0.2861i \quad 0.1357 + 0.0067i}{-0.1357 + 0.0083i \quad 0.9519 + 0.2747i}$$

$$\tilde{\Theta}_4 = \frac{0.9699 + 0.1789i \quad -0.0374 - 0.1609i}{0.0269 - 0.1630i \quad 0.9561 - 0.2419i}$$

$$\tilde{\Theta}_5 = \frac{0.9454 + 0.0369i \quad -0.2368 + 0.2209i}{0.2358 + 0.2220i \quad 0.9456 - 0.0325i}$$

$$\tilde{\Theta}_6 = \frac{0.9744 + 0.0209i \quad 0.1499 + 0.1665i}{-0.1702 + 0.1457i \quad 0.9688 + 0.1056i}$$

$$\tilde{\Theta}_7 = \frac{0.9560 - 0.2786i \quad -0.0767 + 0.0503i}{0.0894 + 0.0201i \quad 0.9929 - 0.0752i}$$

-continued
$$\tilde{\Theta}_8 = \begin{matrix} 0.9508+0.3097i & -0.0117+0.0012i \\ 0.0087+0.0079i & 0.9478+0.3187i \end{matrix}$$

In addition to the aforementioned examples, $\{\tilde{\theta}\}=\{\tilde{\Theta}_1,\ldots,\tilde{\Theta}_{2^B}\}$ may be variously calculated according to various time coefficients, the number of feedback bits, the number of transmit antennas of the base station, or $\{\theta\}=\{\Theta_1,\ldots,\Theta_{2^B}\}$. Further descriptions related thereto will be omitted herein for conciseness.

FIG. 3 is a flowchart illustrating a MIMO communication method according to an exemplary embodiment. It is understood that one or more apparatuses described above, for example, a base station, may carry out one or more of the operations of FIG. 3.

Referring to FIG. 3, a pre-designed codebook may be stored, for example, in a memory, in operation S310. The exemplary design scheme of the codebook has been described above. A base station or a user terminal may store and use the same codebook.

A state of a channel that is formed between the base station and the user terminal may be recognized in operation S320.

For example, the base station may transmit a well-known pilot signal to the user terminal and the user terminal may estimate a channel formed between the base station and the user terminal using the pilot signal. A channel state of the estimated channel may be expressed as channel information. The channel information may include channel state information, channel quality information, or channel direction information. The channel information may be fed back from the user terminal to the base station. The base station may recognize the channel state based on the fed back channel information.

A transmission rank may be adaptively determined in operation S330. For example, the transmission rank may be adaptively determined according to an achievable total data transmission rate, a state of channels of users/user terminals, or data desired by the users/user terminals.

In operation S340, a precoding matrix may be determined by considering the channel information and the transmission rank based on a plurality of matrices that is included in the codebook. For example, a matrix may be selected from the plurality of matrices based on the channel information. The size of the selected matrix may be adjusted according to the transmission rank and thereby be used as the precoding matrix.

Data streams may be precoded using the determined precoding matrix in operation S350.

FIG. 4 is a flowchart illustrating a MIMO communication method according to another embodiment. It is understood that one or more apparatuses described above, for example, a base station, may carry out one or more of the operations of FIG. 4.

Referring to FIG. 4, a pre-designed codebook may be stored, for example, in a memory, in operation S410.

A channel state of a channel that is formed between a user and a base station may be recognized in operation S420. For example, a base station may recognize the channel state based on channel information that is fed back from a user terminal.

A time correlation coefficient of the channel may be recognized in operation S430. The user terminal may calculate the time correlation coefficient of the channel and quantize the calculated time correlation coefficient. The user terminal may feed back the quantized value to the base station.

The codebook may be updated according to a time correlation coefficient (p) of a channel that is formed between at least one user and the base station, in operation S440. Schemes of updating the codebook have been described above and thus further descriptions related thereto will be omitted.

A precoding matrix may be generated using the updated codebook in operation S450. For example, where the updated codebook is $\{\tilde{\theta}\}=\{\tilde{\Theta}_1,\ldots,\tilde{\Theta}_{2^B}\}$, and a previously used precoding matrix is $F_{\tau-1}$, a currently used precoding matrix may be generated using $F_\tau = \tilde{\Theta}_i F_{\tau-1}$.

Data streams may be precoded using the generated precoding matrix in operation S460.

According to certain embodiments described above, it is possible to improve a data transmission rate using a codebook that is optimized according to a channel environment, a transmission rank, and/or a number of feedback bits.

The methods described above including a MIMO communication method may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage or recording medium may be distributed among computer systems connected through a network and computer-readable instructions or codes may be stored and executed in a decentralized manner.

A computer or a computing system may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. Where the computer or the computing system is a mobile apparatus, a battery may be additionally provided to supply operation voltage of the computer of the computing system. It will be apparent to those of ordinary skill in the art that the computer or the computing system may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station for a single user multiple input multiple output (MIMO) communication system, the base station comprising:

a memory where a codebook including codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1},$ and $C_{16,1}$ is stored; and a precoder to precode a data stream to be transmitted using the codebook, wherein the codeword matrices are defined by the following table:

| $C_{1,1} =$ | $C_{2,1} =$ | $C_{3,1} =$ | $C_{4,1} =$ |
|---|---|---|---|
| 0.5000 | −0.5000 | −0.5000 | 0.5000 |
| −0.5000 | −0.5000 | 0.5000 | 0 − 0.5000i |
| 0.5000 | 0.5000 | 0.5000 | 0.5000 |
| −0.5000 | 0.5000 | −0.5000 | 0 − 0.5000i |
| $C_{5,1} =$ | $C_{6,1} =$ | $C_{7,1} =$ | $C_{8,1} =$ |
| −0.5000 | −0.5000 | 0.5000 | 0.5000 |
| 0 − 0.5000i | 0 + 0.5000i | 0.5000 | 0 + 0.5000i |
| 0.5000 | 0.5000 | 0.5000 | 0.5000 |
| 0 + 0.5000i | 0 − 0.5000i | 0.5000 | 0 + 0.5000i |
| $C_{9,1} =$ | $C_{10,1} =$ | $C_{11,1} =$ | $C_{12,1} =$ |
| 0.5000 | 0.5000 | 0.5000 | 0.5000 |
| 0.5000 | 0 + 0.5000i | −0.5000 | 0 − 0.5000i |
| 0.5000 | −0.5000 | 0.5000 | −0.5000 |
| −0.5000 | 0 + 0.5000i | 0.5000 | 0 − 0.5000i |
| $C_{13,1} =$ | $C_{14,1} =$ | $C_{15,1} =$ | $C_{16,1} =$ |
| 0.5000 | 0.5000 | 0.5000 | 0.5000 |
| 0.3536 + 0.3536i | −0.3536 + 0.3536i | −0.3536 − 0.3536i | 0.3536 − 0.3536i |
| 0 + 0.5000i | 0 − 0.5000i | 0 + 0.5000i | 0 − 0.5000i |
| −0.3536 + 0.3536i | 0.3536 + 0.3536i | 0.3536 − 0.3536i | −0.3536 − 0.3536i. |

2. The base station of claim 1, wherein the precoder calculates a precoding matrix based on at least one codeword matrix among the codeword matrices, and precodes the data stream using the precoding matrix.

3. The base station of claim 1, further comprising:

an information receiver to receive feedback information from a terminal, wherein the precoder precodes the data stream using the feedback information and the codebook.

4. The base station of claim 3, wherein the precoder calculates a precoding matrix based on a codeword matrix corresponding to the feedback information among the codeword matrices, and precodes the data stream using the precoding matrix.

5. The base station of claim 3, wherein the feedback information includes index information of a codeword matrix preferred by the terminal among the codeword matrices.

6. The base station of claim 1, further comprising four transmit antennas, wherein the codebook is used for transmission rank 1.

7. A base station for a multi-user MIMO communication system, the base station comprising:

a memory where a codebook including codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1},$ and $C_{16,1}$ is stored; and a precoder to precode at least one data stream to be transmitted using the codebook, wherein the codeword matrices are defined by the following table:

| $C_{1,1} =$ | $C_{2,1} =$ | $C_{3,1} =$ | $C_{4,1} =$ |
|---|---|---|---|
| 0.5000 | −0.5000 | −0.5000 | 0.5000 |
| −0.5000 | −0.5000 | 0.5000 | 0 − 0.5000i |
| 0.5000 | 0.5000 | 0.5000 | 0.5000 |
| −0.5000 | 0.5000 | −0.5000 | 0 − 0.5000i |
| $C_{5,1} =$ | $C_{6,1} =$ | $C_{7,1} =$ | $C_{8,1} =$ |
| −0.5000 | −0.5000 | 0.5000 | 0.5000 |
| 0 − 0.5000i | 0 + 0.5000i | 0.5000 | 0 + 0.5000i |
| 0.5000 | 0.5000 | 0.5000 | 0.5000 |
| 0 + 0.5000i | 0 − 0.5000i | 0.5000 | 0 + 0.5000i |
| $C_{9,1} =$ | $C_{10,1} =$ | $C_{11,1} =$ | $C_{12,1} =$ |
| 0.5000 | 0.5000 | 0.5000 | 0.5000 |
| 0.5000 | 0 + 0.5000i | −0.5000 | 0 − 0.5000i |
| 0.5000 | −0.5000 | 0.5000 | −0.5000 |
| −0.5000 | 0 + 0.5000i | 0.5000 | 0 − 0.5000i |
| $C_{13,1} =$ | $C_{14,1} =$ | $C_{15,1} =$ | $C_{16,1} =$ |
| 0.5000 | 0.5000 | 0.5000 | 0.5000 |
| 0.3536 + 0.3536i | −0.3536 + 0.3536i | −0.3536 − 0.3536i | 0.3536 − 0.3536i |
| 0 + 0.5000i | 0 − 0.5000i | 0 + 0.5000i | 0 − 0.5000i |
| −0.3536 + 0.3536i | 0.3536 + 0.3536i | 0.3536 − 0.3536i | −0.3536 − 0.3536i. |

8. The base station of claim 7, further comprising:

an information receiver to receive feedback information from at least two terminals, wherein the precoder precodes the at least one data stream using at least one of the feedback information received from the at least two terminals, and the codebook.

9. A terminal for a MIMO communication system, the terminal comprising:

a memory where a codebook including codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1},$ and $C_{16,1}$ is stored; and a feedback unit to feed back, to a base station, feedback information associated with a preferred codeword matrix among the codeword matrices, wherein the codeword matrices are defined by the following table:

| $C_{1,1} =$ | $C_{2,1} =$ | $C_{3,1} =$ | $C_{4,1} =$ |
|---|---|---|---|
| 0.5000 | −0.5000 | −0.5000 | 0.5000 |
| −0.5000 | −0.5000 | 0.5000 | 0 − 0.5000i |
| 0.5000 | 0.5000 | 0.5000 | 0.5000 |
| −0.5000 | 0.5000 | −0.5000 | 0 − 0.5000i |
| $C_{5,1} =$ | $C_{6,1} =$ | $C_{7,1} =$ | $C_{8,1} =$ |
| −0.5000 | −0.5000 | 0.5000 | 0.5000 |
| 0 − 0.5000i | 0 + 0.5000i | 0.5000 | 0 + 0.5000i |
| 0.5000 | 0.5000 | 0.5000 | 0.5000 |
| 0 + 0.5000i | 0 − 0.5000i | 0.5000 | 0 + 0.5000i |
| $C_{9,1} =$ | $C_{10,1} =$ | $C_{11,1} =$ | $C_{12,1} =$ |
| 0.5000 | 0.5000 | 0.5000 | 0.5000 |
| 0.5000 | 0 + 0.5000i | −0.5000 | 0 − 0.5000i |
| 0.5000 | −0.5000 | 0.5000 | −0.5000 |
| −0.5000 | 0 + 0.5000i | 0.5000 | 0 − 0.5000i |
| $C_{13,1} =$ | $C_{14,1} =$ | $C_{15,1} =$ | $C_{16,1} =$ |
| 0.5000 | 0.5000 | 0.5000 | 0.5000 |
| 0.3536 + 0.3536i | −0.3536 + 0.3536i | −0.3536 − 0.3536i | 0.3536 − 0.3536i |
| 0 + 0.5000i | 0 − 0.5000i | 0 + 0.5000i | 0 − 0.5000i |
| −0.3536 + 0.3536i | 0.3536 + 0.3536i | 0.3536 − 0.3536i | −0.3536 − 0.3536i. |

10. The terminal of claim 9, further comprising:

a channel estimation unit to estimate a channel between the base station and the terminal, wherein the feedback unit feeds back, to the base station, the feedback information determined based on the estimated channel.

11. A non-transitory information storage medium having stored therein a codebook used by a base station and at least one terminal of a MIMO communication system,
wherein the codebook includes codeword matrices $C_{1,1}$, $C_{2,1}$, $C_{3,1}$, $C_{4,1}$, $C_{5,1}$, $C_{6,1}$, $C_{7,1}$, $C_{8,1}$, $C_{9,1}$, $C_{10,1}$, $C_{11,1}$, $C_{12,1}$, $C_{13,1}$, $C_{14,1}$, $C_{15,1}$, and $C_{16,1}$, and the codeword matrices are defined by the following table:

13. The method of claim 12, wherein the precoding comprises:
calculating a precoding matrix based on at least one codeword matrix among the codeword matrices; and
precoding the data stream using the precoding matrix.

14. The method of claim 12, further comprising:
receiving feedback information from a terminal,
wherein the precoding comprises precoding the data stream using the feedback information and the codebook.

| | | | | | | | |
|---|---|---|---|---|---|---|---|
| $C_{1,1}=$ | 0.5000 | $C_{2,1}=$ | −0.5000 | $C_{3,1}=$ | −0.5000 | $C_{4,1}=$ | 0.5000 |
| | −0.5000 | | −0.5000 | | 0.5000 | | 0 − 0.5000i |
| | 0.5000 | | 0.5000 | | 0.5000 | | 0.5000 |
| | −0.5000 | | 0.5000 | | −0.5000 | | 0 − 0.5000i |
| $C_{5,1}=$ | −0.5000 | $C_{6,1}=$ | −0.5000 | $C_{7,1}=$ | 0.5000 | $C_{8,1}=$ | 0.5000 |
| | 0 − 0.5000i | | 0 + 0.5000i | | 0.5000 | | 0 + 0.5000i |
| | 0.5000 | | 0.5000 | | 0.5000 | | 0.5000 |
| | 0 + 0.5000i | | 0 − 0.5000i | | 0.5000 | | 0 + 0.5000i |
| $C_{9,1}=$ | 0.5000 | $C_{10,1}=$ | 0.5000 | $C_{11,1}=$ | 0.5000 | $C_{12,1}=$ | 0.5000 |
| | 0.5000 | | 0 + 0.5000i | | −0.5000 | | 0 − 0.5000i |
| | 0.5000 | | −0.5000 | | 0.5000 | | −0.5000 |
| | −0.5000 | | 0 + 0.5000i | | 0.5000 | | 0 − 0.5000i |
| $C_{13,1}=$ | 0.5000 | $C_{14,1}=$ | 0.5000 | $C_{15,1}=$ | 0.5000 | $C_{16,1}=$ | 0.5000 |
| | 0.3536 + 0.3536i | | −0.3536 + 0.3536i | | −0.3536 − 0.3536i | | 0.3536 − 0.3536i |
| | 0 + 0.5000i | | 0 − 0.5000i | | 0 + 0.5000i | | 0 − 0.5000i |
| | −0.3536 + 0.3536i | | 0.3536 + 0.3536i | | 0.3536 − 0.3536i | | −0.3536 − 0.3536i. |

12. A precoding method of a base station for a single user MIMO communication system, the method comprising:
accessing a memory where a codebook including codeword matrices $C_{1,1}$, $C_{2,1}$, $C_{3,1}$, $C_{4,1}$, $C_{5,1}$, $C_{6,1}$, $C_{7,1}$, $C_{8,1}$, $C_{9,1}$, $C_{10,1}$, $C_{11,1}$, $C_{12,1}$, $C_{13,1}$, $C_{14,1}$, $C_{15,1}$, and $C_{16,1}$ is stored; and
precoding a data stream to be transmitted using the codebook,
wherein the codeword matrices are defined by the following table:

15. A precoding method of a base station for a multi-user MIMO communication system, the method comprising:
accessing a memory where a codebook including codeword matrices $C_{1,1}$, $C_{2,1}$, $C_{3,1}$, $C_{4,1}$, $C_{5,1}$, $C_{6,1}$, $C_{7,1}$, $C_{8,1}$, $C_{9,1}$, $C_{10,1}$, $C_{11,1}$, $C_{12,1}$, $C_{13,1}$, $C_{14,1}$, $C_{15,1}$, and $C_{16,1}$ is stored; and
precoding at least one data stream to be transmitted using the codebook,
wherein the codeword matrices are defined by the following table:

| | | | | | | | |
|---|---|---|---|---|---|---|---|
| $C_{1,1}=$ | 0.5000 | $C_{2,1}=$ | −0.5000 | $C_{3,1}=$ | −0.5000 | $C_{4,1}=$ | 0.5000 |
| | −0.5000 | | −0.5000 | | 0.5000 | | 0 − 0.5000i |
| | 0.5000 | | 0.5000 | | 0.5000 | | 0.5000 |
| | −0.5000 | | 0.5000 | | −0.5000 | | 0 − 0.5000i |
| $C_{5,1}=$ | −0.5000 | $C_{6,1}=$ | −0.5000 | $C_{7,1}=$ | 0.5000 | $C_{8,1}=$ | 0.5000 |
| | 0 − 0.5000i | | 0 + 0.5000i | | 0.5000 | | 0 + 0.5000i |
| | 0.5000 | | 0.5000 | | 0.5000 | | 0.5000 |
| | 0 + 0.5000i | | 0 − 0.5000i | | 0.5000 | | 0 + 0.5000i |
| $C_{9,1}=$ | 0.5000 | $C_{10,1}=$ | 0.5000 | $C_{11,1}=$ | 0.5000 | $C_{12,1}=$ | 0.5000 |
| | 0.5000 | | 0 + 0.5000i | | −0.5000 | | 0 − 0.5000i |
| | 0.5000 | | −0.5000 | | 0.5000 | | −0.5000 |
| | −0.5000 | | 0 + 0.5000i | | 0.5000 | | 0 − 0.5000i |
| $C_{13,1}=$ | 0.5000 | $C_{14,1}=$ | 0.5000 | $C_{15,1}=$ | 0.5000 | $C_{16,1}=$ | 0.5000 |
| | 0.3536 + 0.3536i | | −0.3536 + 0.3536i | | −0.3536 − 0.3536i | | 0.3536 − 0.3536i |
| | 0 + 0.5000i | | 0 − 0.5000i | | 0 + 0.5000i | | 0 − 0.5000i |
| | −0.3536 + 0.3536i | | 0.3536 + 0.3536i | | 0.3536 − 0.3536i | | −0.3536 − 0.3536i. |

| | | | | | | | |
|---|---|---|---|---|---|---|---|
| $C_{1,1} =$ | 0.5000<br>−0.5000<br>0.5000<br>−0.5000 | $C_{2,1} =$ | −0.5000<br>−0.5000<br>0.5000<br>0.5000 | $C_{3,1} =$ | −0.5000<br>0.5000<br>0.5000<br>−0.5000 | $C_{4,1} =$ | 0.5000<br>0 − 0.5000i<br>0.5000<br>0 − 0.5000i |
| $C_{5,1} =$ | −0.5000<br>0 − 0.5000i<br>0.5000<br>0 + 0.5000i | $C_{6,1} =$ | −0.5000<br>0 + 0.5000i<br>0.5000<br>0 − 0.5000i | $C_{7,1} =$ | 0.5000<br>0.5000<br>0.5000<br>0.5000 | $C_{8,1} =$ | 0.5000<br>0 + 0.5000i<br>0.5000<br>0 + 0.5000i |
| $C_{9,1} =$ | 0.5000<br>0.5000<br>0.5000<br>−0.5000 | $C_{10,1} =$ | 0.5000<br>0 + 0.5000i<br>−0.5000<br>0 + 0.5000i | $C_{11,1} =$ | 0.5000<br>−0.5000<br>0.5000<br>0.5000 | $C_{12,1} =$ | 0.5000<br>0 − 0.5000i<br>−0.5000<br>0 − 0.5000i |
| $C_{13,1} =$ | 0.5000<br>0.3536 + 0.3536i<br>0 + 0.5000i<br>−0.3536 + 0.3536i | $C_{14,1} =$ | 0.5000<br>−0.3536 + 0.3536i<br>0 − 0.5000i<br>0.3536 + 0.3536i | $C_{15,1} =$ | 0.5000<br>−0.3536 − 0.3536i<br>0 + 0.5000i<br>0.3536 − 0.3536i | $C_{16,1} =$ | 0.5000<br>0.3536 − 0.3536i<br>0 − 0.5000i<br>−0.3536 − 0.3536i. |

16. A method of a terminal for a MIMO communication system, the method comprising:

accessing a memory where a codebook including codeword matrices $C_{1,1}, C_{2,1}, C_{3,1}, C_{4,1}, C_{5,1}, C_{6,1}, C_{7,1}, C_{8,1}, C_{9,1}, C_{10,1}, C_{11,1}, C_{12,1}, C_{13,1}, C_{14,1}, C_{15,1},$ and $C_{16,1}$ is stored; and feeding back, to a base station, feedback information associated with a preferred codeword matrix among the codeword matrices, wherein the codeword matrices are defined by the following table:

| | | | | | | | |
|---|---|---|---|---|---|---|---|
| $C_{1,1} =$ | 0.5000<br>−0.5000<br>0.5000<br>−0.5000 | $C_{2,1} =$ | −0.5000<br>−0.5000<br>0.5000<br>0.5000 | $C_{3,1} =$ | −0.5000<br>0.5000<br>0.5000<br>−0.5000 | $C_{4,1} =$ | 0.5000<br>0 − 0.5000i<br>0.5000<br>0 − 0.5000i |
| $C_{5,1} =$ | −0.5000<br>0 − 0.5000i<br>0.5000<br>0 + 0.5000i | $C_{6,1} =$ | −0.5000<br>0 + 0.5000i<br>0.5000<br>0 − 0.5000i | $C_{7,1} =$ | 0.5000<br>0.5000<br>0.5000<br>0.5000 | $C_{8,1} =$ | 0.5000<br>0 + 0.5000i<br>0.5000<br>0 + 0.5000i |
| $C_{9,1} =$ | 0.5000<br>0.5000<br>0.5000<br>−0.5000 | $C_{10,1} =$ | 0.5000<br>0 + 0.5000i<br>−0.5000<br>0 + 0.5000i | $C_{11,1} =$ | 0.5000<br>−0.5000<br>0.5000<br>0.5000 | $C_{12,1} =$ | 0.5000<br>0 − 0.5000i<br>−0.5000<br>0 − 0.5000i |
| $C_{13,1} =$ | 0.5000<br>0.3536 + 0.3536i<br>0 + 0.5000i<br>−0.3536 + 0.3536i | $C_{14,1} =$ | 0.5000<br>−0.3536 + 0.3536i<br>0 − 0.5000i<br>0.3536 + 0.3536i | $C_{15,1} =$ | 0.5000<br>−0.3536 − 0.3536i<br>0 + 0.5000i<br>0.3536 − 0.3536i | $C_{16,1} =$ | 0.5000<br>0.3536 − 0.3536i<br>0 − 0.5000i<br>−0.3536 − 0.3536i. |

17. The method of claim 16, further comprising:

estimating a channel between the base station and the terminal; and generating the feedback information based on the estimated channel.

\* \* \* \* \*